(12) United States Patent
Bekoscke et al.

(10) Patent No.: US 10,532,626 B2
(45) Date of Patent: *Jan. 14, 2020

(54) STABILITY CONTROL SYSTEM

(71) Applicant: INVACARE CORPORATION, Elyria, OH (US)

(72) Inventors: Robert Bekoscke, Medina, OH (US); Damon Jurkiewicz, Lakewood, OH (US); Gerald Fought, Columbia Station, OH (US)

(73) Assignee: Invacare Corporation, Elyria, OH (US)

(*) Notice: Subject to any disclaimer, the term of this patent is extended or adjusted under 35 U.S.C. 154(b) by 32 days.

This patent is subject to a terminal disclaimer.

(21) Appl. No.: 15/822,967

(22) Filed: Nov. 27, 2017

(65) Prior Publication Data
US 2018/0170141 A1 Jun. 21, 2018

Related U.S. Application Data

(60) Continuation of application No. 15/146,260, filed on May 4, 2016, now Pat. No. 9,827,823, which is a
(Continued)

(51) Int. Cl.
B60G 21/04 (2006.01)
A61G 5/04 (2013.01)
(Continued)

(52) U.S. Cl.
CPC .............. B60G 21/04 (2013.01); A61G 5/043 (2013.01); A61G 5/06 (2013.01); A61G 5/10 (2013.01);
(Continued)

(58) Field of Classification Search
CPC .... B60G 21/005; B60G 21/04; B60G 17/005; B60G 2300/24; B60G 2300/402; B60G 2204/4605; B60G 2204/46; A61G 5/10; A61G 5/043; A61G 5/06; A61G 5/1089; A61G 5/1078; A61G 2005/1078; Y10S 180/907
See application file for complete search history.

(56) References Cited

U.S. PATENT DOCUMENTS 865,514 A 9/1907 Mullenmeister
1,116,086 A 11/1914 Lewis
(Continued)

FOREIGN PATENT DOCUMENTS

CA 2254372 5/2000
CN 1138825 A 12/1996
(Continued)

OTHER PUBLICATIONS

Response to Office Action from Control No. 90/007,491 dated Sep. 11, 2006.
(Continued)

Primary Examiner — Drew J Brown
(74) Attorney, Agent, or Firm — Calfee, Halter & Griswold LLP

(57) ABSTRACT

Embodiments of a suspension for a vehicle is provided. The suspension includes, for example, a frame and a locking assembly. The locking assembly inhibits tipping of a frame of the vehicle when tipping of the frame is detected.

7 Claims, 51 Drawing Sheets

Related U.S. Application Data division of application No. 14/566,899, filed on Dec. 11, 2014, now Pat. No. 9,346,335, which is a division of application No. 12/524,476, filed as application No. PCT/US2008/053242 on Feb. 7, 2008, now Pat. No. 8,910,975.

(60) Provisional application No. 60/901,513, filed on Feb. 14, 2007.

(51) Int. Cl.

| | | |
|---|---|---|
| *A61G 5/06* | (2006.01) | |
| *B60G 17/005* | (2006.01) | |
| *A61G 5/10* | (2006.01) | |
| *B60G 21/00* | (2006.01) | |

(52) U.S. Cl.
CPC .......... *A61G 5/1078* (2016.11); *A61G 5/1089* (2016.11); *B60G 17/005* (2013.01); *B60G 21/005* (2013.01); *B60G 2204/46* (2013.01); *B60G 2204/4605* (2013.01); *B60G 2300/24* (2013.01); *B60G 2300/402* (2013.01); *Y10S 180/907* (2013.01)

(56) References Cited

U.S. PATENT DOCUMENTS

| | | |
|---|---|---|
| 1,151,414 A | 8/1915 | Steinbach |
| 1,773,254 A | 9/1930 | Becker |
| 1,973,627 A | 9/1934 | Harter |
| 2,398,211 A | 4/1946 | du Pont |
| 2,427,482 A | 9/1947 | Wiessman |
| 2,767,995 A | 10/1956 | Stout |
| 2,949,153 A | 8/1960 | Hickman |
| 2,986,200 A | 5/1961 | Nobile |
| 3,104,112 A | 9/1963 | Crail |
| 3,174,176 A | 3/1965 | Olson |
| 3,191,990 A | 6/1965 | Rugg et al. |
| 3,195,670 A | 7/1965 | Dunn |
| 3,210,092 A | 10/1965 | Kraus et al. |
| 3,282,605 A | 11/1966 | Nihlean et al. |
| 3,314,672 A | 4/1967 | Persson |
| 3,506,079 A | 4/1970 | Madler et al. |
| 3,573,877 A | 4/1971 | Locke |
| 3,580,591 A | 5/1971 | Coffey |
| 3,589,700 A | 6/1971 | Ruet et al. |
| 3,592,282 A | 7/1971 | Soileau |
| 3,602,522 A | 8/1971 | Zamotin |
| 3,618,968 A | 11/1971 | Greer |
| 3,627,157 A | 12/1971 | Blatchly |
| 3,661,228 A | 5/1972 | Glasser |
| 3,664,450 A | 5/1972 | Udden et al. |
| 3,682,462 A | 8/1972 | Papousek |
| 3,689,103 A | 9/1972 | Meulendyk |
| 3,709,313 A | 1/1973 | James |
| 3,848,883 A | 11/1974 | Breacain |
| 3,862,751 A | 1/1975 | Schwaller |
| 3,876,012 A | 4/1975 | Regier |
| 3,881,773 A | 5/1975 | Rodaway |
| 3,883,153 A | 5/1975 | Singh et al. |
| 3,893,529 A | 7/1975 | Karchak, Jr. et al. |
| 3,901,337 A | 8/1975 | Cragg |
| 3,901,527 A | 8/1975 | Danziger et al. |
| 3,905,437 A | 9/1975 | Kaiho et al. |
| 3,917,312 A | 11/1975 | Rodaway |
| 3,930,551 A | 1/1976 | Cragg |
| 3,952,822 A | 4/1976 | Udden et al. |
| 3,953,054 A | 4/1976 | Udden et al. |
| 3,976,152 A | 8/1976 | Bell |
| 4,078,817 A | 3/1978 | Ferguson et al. |
| 4,108,449 A | 8/1978 | Rhodes |
| 4,118,020 A | 10/1978 | Myers |
| 4,119,163 A | 10/1978 | Ball |
| 4,128,137 A | 12/1978 | Booth |
| 4,190,263 A | 2/1980 | Powers |
| 4,222,449 A | 9/1980 | Feliz |
| 4,245,847 A | 1/1981 | Knott |
| 4,247,125 A | 1/1981 | Rayment |
| 4,264,085 A | 4/1981 | Volin |
| 4,310,167 A | 1/1982 | McLaurin |
| 4,333,681 A | 6/1982 | Nelson |
| 4,337,958 A | 7/1982 | Witt et al. |
| 4,341,278 A | 7/1982 | Meyer |
| 4,375,295 A | 3/1983 | Volin |
| 4,387,325 A | 6/1983 | Klimo |
| 4,405,142 A | 9/1983 | Whetstine |
| 4,436,320 A | 3/1984 | Brudermann et al. |
| 4,437,678 A | 3/1984 | Schultz |
| 4,455,029 A | 6/1984 | Taylor |
| 4,455,031 A | 6/1984 | Hosaka |
| 4,456,295 A | 6/1984 | Francu |
| 4,483,407 A | 11/1984 | Iwamoto et al. |
| 4,500,102 A | 2/1985 | Haury et al. |
| 4,513,832 A | 4/1985 | Engman |
| 4,515,385 A | 5/1985 | Christian |
| 4,542,918 A | 9/1985 | Singleton |
| 4,545,593 A | 10/1985 | Farnam |
| 4,545,616 A | 10/1985 | Booth |
| 4,556,229 A | 12/1985 | Bihler et al. |
| 4,565,385 A | 1/1986 | Morford |
| 4,592,570 A | 6/1986 | Nassiri |
| RE32,242 E | 9/1986 | Minnebraker |
| 4,618,155 A | 10/1986 | Jayne |
| 4,641,848 A | 2/1987 | Ayers |
| 4,655,471 A | 4/1987 | Peek |
| 4,687,068 A | 8/1987 | Pagett |
| 4,720,223 A | 1/1988 | Neights et al. |
| 4,721,321 A | 1/1988 | Haury et al. |
| 4,721,322 A | 1/1988 | Hawkins |
| 4,730,842 A | 3/1988 | Summers et al. |
| 4,736,983 A | 4/1988 | Furbee |
| 4,759,418 A | 7/1988 | Goldenfeld et al. |
| 4,763,910 A | 8/1988 | Brandli et al. |
| 4,805,712 A | 2/1989 | Singleton |
| 4,805,925 A | 2/1989 | Haury et al. |
| 4,811,966 A | 3/1989 | Singleton |
| 4,823,900 A | 4/1989 | Farnam |
| 4,826,194 A | 5/1989 | Sakita |
| 4,840,394 A | 6/1989 | Bickler |
| 4,861,056 A | 8/1989 | Duffy, Jr. et al. |
| 4,862,983 A | 9/1989 | Kreft |
| 4,886,294 A | 12/1989 | Nahachewski |
| 4,905,972 A | 3/1990 | Scowen |
| 4,919,441 A | 4/1990 | Marier et al. |
| 4,926,952 A | 5/1990 | Farman |
| 4,934,626 A | 6/1990 | Kimura |
| 4,951,766 A | 8/1990 | Basedow et al. |
| 4,962,942 A | 10/1990 | Barnett et al. |
| 4,967,864 A | 11/1990 | Boyer et al. |
| 4,989,890 A | 2/1991 | Lockard et al. |
| 5,020,816 A | 6/1991 | Mulholland |
| 5,042,607 A | 8/1991 | Falkenson et al. |
| 5,044,647 A | 9/1991 | Patterson |
| 5,044,648 A | 9/1991 | Knapp |
| 5,076,390 A | 12/1991 | Haskins |
| 5,076,602 A | 12/1991 | Robertson et al. |
| 5,113,959 A | 5/1992 | Mastov et al. |
| 5,123,495 A | 6/1992 | Littlejohn et al. |
| 5,125,468 A | 6/1992 | Coker |
| 5,137,295 A | 8/1992 | Peek |
| 5,156,226 A | 10/1992 | Boyer et al. |
| 5,176,393 A | 1/1993 | Robertson et al. |
| 5,180,025 A | 1/1993 | Yeh et al. |
| 5,180,275 A | 1/1993 | Czech et al. |
| 5,181,133 A | 1/1993 | Lipton |
| 5,181,733 A | 1/1993 | Tague |
| 5,183,133 A | 2/1993 | Roy et al. |
| 5,197,559 A | 3/1993 | Garin, III et al. |
| 5,203,610 A | 4/1993 | Miller |
| 5,209,509 A | 5/1993 | Gay et al. |
| 5,222,567 A | 6/1993 | Broadhead et al. |
| 5,228,709 A | 7/1993 | Kao |
| 5,230,522 A | 7/1993 | Gehlsen et al. |

(56) References Cited

U.S. PATENT DOCUMENTS

| | | |
|---|---|---|
| 5,241,876 A | 9/1993 | Mathis |
| 5,248,007 A | 9/1993 | Watkins et al. |
| 5,290,055 A | 3/1994 | Treat, Jr. |
| 5,294,141 A | 3/1994 | Mentessi et al. |
| 5,297,021 A | 3/1994 | Koerlin et al. |
| 5,301,964 A | 4/1994 | Papac |
| 5,316,328 A | 5/1994 | Bussinger |
| 5,341,533 A | 8/1994 | Seitz |
| 5,351,774 A | 10/1994 | Okamoto |
| 5,366,037 A | 11/1994 | Richey |
| 5,372,211 A | 12/1994 | Wilcox et al. |
| 5,403,031 A | 4/1995 | Gottschalk et al. |
| 5,419,571 A | 5/1995 | Vaughan |
| 5,435,404 A | 7/1995 | Garin, III |
| 5,447,317 A | 9/1995 | Gehlsen et al. |
| 5,464,271 A | 11/1995 | McFarland |
| 5,467,838 A | 11/1995 | Wu |
| 5,482,261 A | 1/1996 | Ortega |
| 5,485,140 A | 1/1996 | Bussin |
| 5,489,139 A | 2/1996 | McFarland |
| 5,513,875 A | 5/1996 | Tahara et al. |
| 5,518,081 A | 5/1996 | Thibodeau |
| 5,531,284 A | 7/1996 | Okamoto |
| 5,540,297 A | 7/1996 | Meier |
| 5,562,172 A | 10/1996 | Mick |
| 5,564,512 A | 10/1996 | Scheulderman |
| 5,575,348 A | 11/1996 | Goertzen et al. |
| 5,611,555 A | 3/1997 | Vidal |
| 5,628,377 A | 5/1997 | LaGloan |
| 5,701,122 A | 12/1997 | Canedy |
| 5,727,802 A | 3/1998 | Garven, Jr. et al. |
| 5,727,809 A | 3/1998 | Ordelman et al. |
| 5,762,155 A | 6/1998 | Scheulderman |
| 5,772,048 A | 6/1998 | Sopcisak |
| 5,772,226 A | 6/1998 | Bobichon |
| 5,772,237 A | 6/1998 | Finch et al. |
| D397,645 S | 9/1998 | Schaffner |
| 5,833,248 A | 11/1998 | Eguchi |
| 5,848,658 A | 12/1998 | Pulver |
| 5,851,018 A | 12/1998 | Curran et al. |
| 5,851,019 A | 12/1998 | Gill et al. |
| 5,853,059 A | 12/1998 | Goertzen et al. |
| D404,693 S | 1/1999 | Schaffner et al. |
| 5,855,387 A | 1/1999 | Gill et al. |
| 5,899,475 A | 5/1999 | Verhaeg et al. |
| 5,904,214 A | 5/1999 | Lin |
| 5,921,532 A | 7/1999 | Pierce et al. |
| 5,944,131 A | 8/1999 | Schaffner et al. |
| 5,954,351 A | 9/1999 | Koschinat |
| 5,957,474 A | 9/1999 | Mundy et al. |
| 5,964,473 A | 10/1999 | Degonda et al. |
| 5,988,304 A | 11/1999 | Behrents |
| 5,996,716 A | 12/1999 | Montiglio et al. |
| 6,003,624 A | 12/1999 | Jorgensen et al. |
| 6,029,763 A | 2/2000 | Swisher |
| 6,041,876 A | 3/2000 | Pulver et al. |
| 6,047,979 A | 4/2000 | Kraft et al. |
| 6,062,600 A | 5/2000 | Kamen et al. |
| 6,068,280 A | 5/2000 | Torres |
| 6,070,898 A | 6/2000 | Dickie et al. |
| 6,073,951 A | 6/2000 | Jindra et al. |
| 6,079,698 A | 6/2000 | Patterson et al. |
| 6,079,725 A | 6/2000 | Lazaros |
| D429,665 S | 8/2000 | Dickie |
| 6,095,271 A | 8/2000 | Dickie et al. |
| 6,129,165 A | 10/2000 | Schaffner et al. |
| 6,131,679 A | 10/2000 | Pulver et al. |
| 6,135,222 A | 10/2000 | Furukawa |
| 6,161,856 A | 12/2000 | Peterson |
| 6,168,178 B1 | 1/2001 | Garven, Jr. et al. |
| 6,176,335 B1 | 1/2001 | Schaffner et al. |
| 6,179,076 B1 | 1/2001 | Fernie et al. |
| 6,186,252 B1 | 2/2001 | Schaffner et al. |
| 6,196,343 B1 | 3/2001 | Strautnieks |
| 6,199,647 B1 | 3/2001 | Schaffner et al. |
| 6,206,119 B1 | 3/2001 | Wu |
| 6,209,670 B1 | 4/2001 | Fernie et al. |
| 6,217,114 B1 | 4/2001 | Degonda |
| 6,225,894 B1 | 5/2001 | Kyrtsos |
| 6,234,263 B1 | 5/2001 | Boivin et al. |
| 6,234,507 B1 | 5/2001 | Dickie et al. |
| 6,241,275 B1 | 6/2001 | Slagerman |
| 6,264,218 B1 | 7/2001 | Slagerman |
| 6,279,927 B1 | 8/2001 | Nishihira et al. |
| 6,312,000 B1 | 11/2001 | Pauls et al. |
| 6,322,089 B1 | 11/2001 | Dantele et al. |
| 6,341,657 B1 | 1/2002 | Hopely et al. |
| 6,341,671 B1 | 1/2002 | Ebersole |
| 6,347,688 B1 | 2/2002 | Hall et al. |
| 6,357,793 B1 | 3/2002 | Dickie et al. |
| 6,375,209 B1 | 4/2002 | Schlangen |
| 6,394,738 B1 | 5/2002 | Springer |
| 6,405,816 B1 | 6/2002 | Kamen et al. |
| 6,425,597 B1 | 7/2002 | Peterson |
| 6,428,020 B1 | 8/2002 | Steadman |
| 6,428,029 B1 | 8/2002 | Barclay |
| 6,429,541 B2 | 8/2002 | Takenaka et al. |
| 6,454,286 B1 | 9/2002 | Hosino |
| 6,460,641 B1 | 10/2002 | Kral |
| 6,460,869 B1 | 10/2002 | Tremouilles |
| 6,494,474 B1 | 12/2002 | Kramer, Jr. |
| 6,533,305 B1 | 3/2003 | Falk |
| 6,533,306 B2 | 3/2003 | Watkins |
| 6,543,564 B1 | 4/2003 | Kamen et al. |
| 6,543,798 B2 | 4/2003 | Schaffner et al. |
| 6,554,086 B1 | 4/2003 | Goertzen et al. |
| 6,568,030 B1 | 5/2003 | Watanabe et al. |
| 6,581,711 B1 | 6/2003 | Tuluie |
| 6,588,799 B1 | 7/2003 | Sanchez |
| 6,601,863 B1 | 8/2003 | Mentessi et al. |
| 6,640,916 B2 | 11/2003 | Schaffner et al. |
| 6,684,969 B1 | 2/2004 | Flowers et al. |
| 6,688,437 B2 | 2/2004 | Usherovich |
| 6,702,306 B1 | 3/2004 | Ockwell |
| 6,712,369 B2 | 3/2004 | Wu |
| 6,715,845 B2 | 4/2004 | Kamen et al. |
| D491,115 S | 6/2004 | Taylor |
| 6,776,430 B2 | 8/2004 | White et al. |
| 6,851,711 B2 | 2/2005 | Goertzen et al. |
| 6,857,490 B2 | 2/2005 | Quigg |
| 6,923,278 B2 | 8/2005 | Mulhern et al. |
| 6,923,280 B2 | 8/2005 | Goertzen et al. |
| 6,935,448 B2 | 8/2005 | Goertzen et al. |
| 6,938,923 B2 | 9/2005 | Mulhern et al. |
| 7,021,641 B2 | 4/2006 | Wu |
| 7,040,429 B2 | 5/2006 | Molnar et al. |
| 7,055,634 B2 | 6/2006 | Molnar |
| 7,066,290 B2 | 6/2006 | Fought |
| 7,083,195 B2 | 8/2006 | Goertzen et al. |
| 7,100,716 B2 | 9/2006 | Engels et al. |
| 7,175,193 B2 | 2/2007 | Wu |
| 7,219,755 B2 | 5/2007 | Goertzen et al. |
| 7,219,924 B2 | 5/2007 | Mulhern et al. |
| 7,232,008 B2 | 6/2007 | Levi et al. |
| 7,234,554 B2 | 6/2007 | Mulhern et al. |
| 7,264,272 B2 | 9/2007 | Mulhern et al. |
| 7,273,118 B2 | 9/2007 | Huang |
| 7,293,801 B2 | 11/2007 | Bertrand et al. |
| 7,316,282 B2 | 1/2008 | Mulhern et al. |
| 7,370,876 B2 | 5/2008 | Hsu et al. |
| 7,374,002 B2 | 5/2008 | Fought |
| 7,380,824 B2 | 6/2008 | Chen et al. |
| 7,389,835 B2 | 6/2008 | Mulhern et al. |
| 7,398,842 B2 | 7/2008 | Fontecchio et al. |
| 7,413,038 B2 | 8/2008 | Mulhern et al. |
| 7,461,897 B2 | 12/2008 | Kruse et al. |
| 7,472,767 B2 | 1/2009 | Molnar |
| 7,490,683 B2 | 2/2009 | Schaffner |
| 7,506,709 B2 | 3/2009 | Kiwak et al. |
| 7,516,984 B2 | 4/2009 | Tang |
| 7,556,109 B2 | 7/2009 | Chen et al. |
| 7,597,163 B2 | 10/2009 | Goertzen et al. |
| 7,735,591 B2 | 6/2010 | Puskar-Pasewicz et al. |
| 7,766,106 B2 | 8/2010 | Puskar-Pasewicz et al. |

(56) References Cited

U.S. PATENT DOCUMENTS

| | | |
|---|---|---|
| 7,775,307 B2 | 8/2010 | Cheng |
| 7,828,310 B2 | 11/2010 | Vreeswijk et al. |
| D632,229 S | 2/2011 | Kruse |
| 7,882,909 B2 | 2/2011 | Pearlman et al. |
| 7,896,394 B2 | 3/2011 | Jackson et al. |
| 8,037,953 B2 | 10/2011 | Puskar-Pasewicz et al. |
| 8,113,531 B2 | 2/2012 | Zhou |
| 8,118,321 B2 | 2/2012 | Hunziker et al. |
| 8,172,015 B2 | 5/2012 | Molnar |
| 8,172,016 B2 | 5/2012 | Goertzen et al. |
| 8,177,257 B2 | 5/2012 | Dugas et al. |
| 8,186,463 B2 | 5/2012 | Hunziker et al. |
| 8,210,556 B2 | 7/2012 | Zhou et al. |
| 8,272,461 B2 | 9/2012 | Bekoscke et al. |
| 8,286,738 B2 | 10/2012 | Cheng |
| 8,297,388 B2 | 10/2012 | Lindenkamp et al. |
| 8,573,341 B2 | 11/2013 | Fought et al. |
| 8,794,359 B2 | 8/2014 | Bekoske |
| 8,910,975 B2 | 12/2014 | Bekoscke et al. |
| 9,010,470 B2 | 4/2015 | Cuson et al. |
| 9,308,143 B2 | 4/2016 | Bekoscke |
| 9,346,335 B2 | 5/2016 | Bekoscke et al. |
| 9,370,455 B2 | 6/2016 | Molnar |
| 9,987,177 B2 | 6/2018 | Goertzen et al. |
| 2001/0011613 A1 | 8/2001 | Schaffner et al. |
| 2001/0013437 A1 | 8/2001 | Husted et al. |
| 2002/0023787 A1 | 2/2002 | Kamen et al. |
| 2002/0088657 A1 | 7/2002 | Brett et al. |
| 2002/0175027 A1 | 11/2002 | Usherovich |
| 2003/0030243 A1 | 2/2003 | Engels |
| 2003/0075365 A1 | 4/2003 | Fought |
| 2003/0122332 A1 | 7/2003 | Engels et al. |
| 2003/0168264 A1 | 9/2003 | Goertzen et al. |
| 2003/0168265 A1 | 9/2003 | Goertzen et al. |
| 2003/0201632 A1 | 10/2003 | Mulhern et al. |
| 2003/0205420 A1 | 11/2003 | Mulhern et al. |
| 2004/0004342 A1 | 1/2004 | Mulhern et al. |
| 2004/0032119 A1 | 2/2004 | Tran et al. |
| 2004/0060748 A1 | 4/2004 | Molnar |
| 2004/0084230 A1 | 5/2004 | Grymko et al. |
| 2004/0094944 A1 | 5/2004 | Goertzen et al. |
| 2004/0144580 A1 | 7/2004 | Wu |
| 2004/0150204 A1 | 8/2004 | Goertzen et al. |
| 2004/0159476 A1 | 8/2004 | Molnar |
| 2004/0168839 A1 | 9/2004 | Wu |
| 2004/0188152 A1 | 9/2004 | Schaffner |
| 2004/0232683 A1 | 11/2004 | Mulhern |
| 2004/0262859 A1 | 12/2004 | Turturiello |
| 2005/0034903 A1 | 2/2005 | Wu |
| 2005/0077694 A1 | 4/2005 | Levi et al. |
| 2005/0077714 A1 | 4/2005 | Mulhern et al. |
| 2005/0077715 A1 | 4/2005 | Mulhern et al. |
| 2005/0127631 A1 | 6/2005 | Schaffner |
| 2005/0151360 A1 | 7/2005 | Bertrand et al. |
| 2005/0206124 A1 | 9/2005 | Levi |
| 2005/0206149 A1 | 9/2005 | Mulhern et al. |
| 2005/0225040 A1 | 10/2005 | Goertzen et al. |
| 2005/0225041 A1 | 10/2005 | Longino |
| 2006/0021806 A1 | 2/2006 | Goertzen et al. |
| 2006/0076747 A1 | 4/2006 | Pauls et al. |
| 2006/0076748 A1 | 4/2006 | Pauls et al. |
| 2006/0082117 A1 | 4/2006 | Turturiellox |
| 2006/0086554 A1 | 4/2006 | Jackson et al. |
| 2006/0201723 A1 | 9/2006 | Hsu et al. |
| 2006/0213705 A1 | 9/2006 | Molnar |
| 2006/0244249 A1 | 11/2006 | Goertzen et al. |
| 2006/0249317 A1 | 11/2006 | Fought |
| 2006/0255581 A1 | 11/2006 | Goertzen et al. |
| 2006/0266565 A1 | 11/2006 | Fontecchio et al. |
| 2007/0018418 A1 | 1/2007 | Huang |
| 2007/0023209 A1 | 2/2007 | Wu |
| 2007/0039766 A1 | 2/2007 | Jackson et al. |
| 2007/0080003 A1 | 4/2007 | Koerlin et al. |
| 2007/0095582 A1 | 5/2007 | Stuijt et al. |
| 2007/0107955 A1 | 5/2007 | Puskar-Pasewicz et al. |
| 2007/0181353 A1 | 8/2007 | Puskar-Pasewicz et al. |
| 2007/0209848 A1 | 9/2007 | Tang |
| 2008/0053720 A1 | 3/2008 | Chen et al. |
| 2008/0083573 A1 | 4/2008 | Tseng |
| 2008/0087481 A1 | 4/2008 | Grymko et al. |
| 2008/0157513 A1 | 7/2008 | Cheng |
| 2008/0208394 A1 | 8/2008 | Fought |
| 2009/0091092 A1 | 4/2009 | Molnar |
| 2009/0121532 A1 | 5/2009 | Kruse et al. |
| 2009/0145677 A1 | 6/2009 | Zhou |
| 2009/0295119 A1 | 12/2009 | Bloswich |
| 2010/0004820 A1 | 1/2010 | Bekoscke et al. |
| 2010/0013172 A1 | 1/2010 | Goertzen |
| 2010/0065346 A1 | 3/2010 | Porcheron |
| 2010/0084209 A1 | 4/2010 | Bekoscke et al. |
| 2010/0102529 A1 | 4/2010 | Lindenkamp et al. |
| 2010/0301576 A1 | 12/2010 | Dugas et al. |
| 2011/0083913 A1 | 4/2011 | Cuson et al. |
| 2011/0215540 A1 | 9/2011 | Hunziker |
| 2012/0217070 A1 | 8/2012 | Goertzen |
| 2012/0217713 A1 | 8/2012 | Molnar |
| 2012/0299262 A1 | 11/2012 | Bekoscke |
| 2013/0207364 A1 | 8/2013 | Bekoscke et al. |
| 2015/0196438 A1 | 7/2015 | Mulhern |
| 2016/0287456 A1 | 10/2016 | Bekoscke et al. |
| 2016/0318367 A1 | 11/2016 | Bekoscke |
| 2018/0028379 A1 | 2/2018 | Bekoske |

FOREIGN PATENT DOCUMENTS

| | | |
|---|---|---|
| CN | 1839779 A | 10/2006 |
| CN | 101636139 A | 1/2010 |
| DE | 152186 | 9/1903 |
| DE | 2256934 | 5/1973 |
| DE | 1399822 | 8/1977 |
| DE | 19806500 | 3/2002 |
| DE | 10136368 | 5/2003 |
| DE | 10136369 | 5/2003 |
| EP | 18101 | 10/1980 |
| EP | 127929 | 12/1984 |
| EP | 268960 | 6/1988 |
| EP | 312969 | 4/1989 |
| EP | 339500 | 11/1989 |
| EP | 369791 | 5/1990 |
| EP | 419085 | 3/1991 |
| EP | 445171 | 9/1991 |
| EP | 511113 | 10/1992 |
| EP | 677285 | 10/1995 |
| EP | 702945 | 3/1996 |
| EP | 829247 | 3/1998 |
| EP | 841052 | 5/1998 |
| EP | 908165 | 4/1999 |
| EP | 908166 | 4/1999 |
| EP | 927551 | 7/1999 |
| EP | 988848 | 3/2000 |
| EP | 1147969 | 10/2001 |
| EP | 1279391 | 1/2003 |
| EP | 1279392 | 1/2003 |
| EP | 1434545 | 7/2004 |
| EP | 1479362 | 11/2004 |
| EP | 1513479 | 3/2005 |
| EP | 1522292 | 4/2005 |
| EP | 1522295 | 4/2005 |
| EP | 1582189 | 10/2005 |
| EP | 2226048 | 9/2010 |
| EP | 2111204 | 4/2011 |
| FR | 27505 | 7/1924 |
| FR | 2215054 | 8/1974 |
| FR | 2399822 | 3/1979 |
| FR | 2455886 | 12/1980 |
| FR | 2498925 | 8/1982 |
| FR | 2738147 | 7/1997 |
| FR | 2749502 | 12/1997 |
| FR | 2858764 | 2/2005 |
| GB | 151915 | 10/1920 |
| GB | 154369 | 12/1920 |
| GB | 265885 | 2/1927 |
| GB | 474349 | 10/1937 |
| GB | 841175 | 7/1960 |

(56) References Cited

FOREIGN PATENT DOCUMENTS

| | | |
|---|---|---|
| GB | 1503910 | 3/1978 |
| GB | 2040237 | 8/1980 |
| GB | 2061197 | 5/1981 |
| GB | 2141980 | 1/1985 |
| GB | 2224980 | 5/1990 |
| JP | 57-186589 | 11/1982 |
| JP | 03-011978 | 12/1989 |
| JP | 04-158864 | 6/1992 |
| JP | 07-328073 | 12/1995 |
| JP | 08-038552 | 2/1996 |
| JP | 410248877 | 9/1998 |
| JP | 11059506 | 3/1999 |
| JP | 2000 102569 | 4/2000 |
| JP | 2000 288032 | 10/2000 |
| JP | 2001 070347 | 3/2001 |
| JP | 2001 104391 | 4/2001 |
| JP | 2001 212181 | 8/2001 |
| JP | 2001 258948 | 9/2001 |
| JP | 2001 327545 | 11/2001 |
| JP | 2002 143223 | 5/2002 |
| JP | 2002 165841 | 6/2002 |
| JP | 2004 202264 | 7/2004 |
| SE | 431393 | 11/1983 |
| WO | 82/00445 | 2/1982 |
| WO | 84/04451 | 11/1984 |
| WO | 87/06205 | 4/1987 |
| WO | 89/06117 | 7/1989 |
| WO | 90/05515 | 5/1990 |
| WO | 90/06097 | 6/1990 |
| WO | 92/09463 | 6/1992 |
| WO | 93/24342 | 12/1993 |
| WO | 94/13241 | 6/1994 |
| WO | 94/15567 | 7/1994 |
| WO | 96/15752 | 5/1996 |
| WO | 97/44206 | 11/1997 |
| WO | 98/46184 | 10/1998 |
| WO | 99/17700 | 4/1999 |
| WO | 00/08910 | 2/2000 |
| WO | 00/09356 | 2/2000 |
| WO | 00/12040 | 3/2000 |
| WO | 00/54718 | 9/2000 |
| WO | 00/66060 | 11/2000 |
| WO | 01/01914 | 1/2001 |
| WO | 02/34190 | 5/2002 |
| WO | 03/030800 | 4/2003 |
| WO | 03/034969 | 5/2003 |
| WO | 03/049664 | 6/2003 |
| WO | 04/16451 | 6/2003 |
| WO | 03/101364 | 12/2003 |
| WO | 04/16451 | 2/2004 |
| WO | 04/37569 | 5/2004 |
| WO | 07/11668 | 1/2007 |
| WO | 07/22387 A2 | 2/2007 |
| WO | 07/79346 | 7/2007 |
| WO | 08/124953 | 3/2008 |
| WO | 08/84462 | 7/2008 |
| WO | 08/97879 | 8/2008 |
| WO | 08/100759 | 8/2008 |

OTHER PUBLICATIONS

Office Action dated Sep. 21, 2006 from Control No. 90/007,491.
Response from Control No. 90/007,491 dated Nov. 9, 2006.
Notice of Appeal from Control No. 90/007,491 dated Nov. 9, 2006.
Advisory Action from Control No. 90/007,491 dated Nov. 22, 2006.
Appeal Brief from Control No. 90/007,491 dated Jan. 16, 2007.
Advisory Action from Control No. 90/007,491 dated Apr. 20, 2007.
Amended Appeal Brief from Control No. 90/007,491 dated Jun. 29, 2007.
Examiner's Answer from Control No. 90/007,491 dated Sep. 24, 2007.
Reply Brief from Control No. 90/007,491 dated Nov. 21, 2007.
Supplemental Examiner's Answer from Control No. 90/007,491 dated Dec. 18, 2007.
Request for Oral Hearing from Control No. 90/007,491 dated Feb. 19, 2008.
Reply Brief from Control No. 90/007,491 dated Feb. 19, 2008.
Office communication from Control No. 90/007,491 dated Mar. 14, 2008.
Office communication from Control No. 90/007,491 dated Jul. 3, 2008.
Notice of Hearing from Control No. 90/007,491 dated Aug. 22, 2008.
Hearing Attendance Confirmation from Control No. 90/007,491 dated Sep. 17, 2008.
Record of Oral Hearing from Control No. 90/007,491 dated Nov. 13, 2008.
Decision on Appeal from Control No. 90/007,491 dated Nov. 19, 2008.
Amendment for U.S. Appl. No. 09/698,481 dated Mar. 27, 2002.
Complaint for Patent Infringement Demand for Jury Trial, Case No. 1:06CV0517.
Request for Reexamination of U.S. Pat. No. 6,196,343, filed Apr. 28, 2006, 17 pgs.
Affidavit, executed Apr. 3, 2006 by Mark Sullivan, Invacare Corporation Vice President of Rehab submitted in reexamination Control No. 90/007,491, 5 pgs.
Affidavit, executed Apr. 3, 2006 by Gerold Goertzen Invacare Corporation Director of Research & Development submitted in reexamination Control No. 90/007,491, 7 pgs.
Office Action from U.S. Appl. No. 08/228,584 dated Apr. 14, 1995.
Response from U.S. Appl. No. 08/228,584 dated Jul. 6, 1995.
Office Action from U.S. Appl. No. 08/228,584 dated Sep. 28, 1995.
Interview Summary from U.S. Appl. No. 08/228,584 dated Nov. 30, 1995.
Response from U.S. Appl. No. 08/228,584 dated Dec. 28, 1995.
Office Action from U.S. Appl. No. 08/228,584 dated Mar. 29, 1996.
Response from U.S. Appl. No. 08/228,584 dated Jun. 3, 1996.
Notice of Allowance from U.S. Appl. No. 08/228,584 dated Jun. 24, 1996.
Office Action from U.S. Appl. No. 08/694,484 dated Dec. 2, 1996.
Response from U.S. Appl. No. 08/694,484 dated Apr. 2, 1997.
Office Action from U.S. Appl. No. 08/694,484 dated Jul. 7, 1997.
Office Action from U.S. Appl. No. 08/694,484 dated Dec. 3, 1997.
Response from U.S. Appl. No. 08/694,484 dated May 4, 1998.
Notice of Allowance from U.S. Appl. No. 08/694,484 dated Jul. 31, 1998.
Office Action from U.S. Appl. No. 09/191,332 dated Jan. 19, 2000.
Response from U.S. Appl. No. 09/191,332 dated Apr. 18, 2000.
Notice of Allowance from U.S. Appl. No. 09/191,332 dated Jul. 3, 2000.
Notice of Allowance from U.S. Appl. No. 09/426,369 dated Oct. 20, 2000.
Office Action from U.S. Appl. No. 09/607,468 dated Sep. 26, 2001.
Response from U.S. Appl. No. 09/607,468 dated Dec. 21, 2001.
Office Action from U.S. Appl. No. 09/607,468 dated Apr. 18, 2002.
Response from U.S. Appl. No. 09/607,468 dated Jun. 21, 2002.
Notice of Allowance from U.S. Appl. No. 09/607,468 dated Jun. 28, 2002.
U.S. Patent Office Action from U.S. Appl. No. 09/698,481 dated Nov. 27, 2001.
Response from U.S. Appl. No. 09/698,481 dated Mar. 27, 2002.
U.S. Patent Office Action from U.S. Appl. No. 09/698,481 dated Jun. 27, 2002.
Amendment from U.S. Appl. No. 15/159,264 dated Apr. 26, 2018.
Final Office Action from U.S. Appl. No. 15/159,264 dated Aug. 10, 2018.
Office Action from U.S. Appl. No. 15/447,988 dated Aug. 7, 2018.
Amendment from U.S. Appl. No. 15/447,988 dated Nov. 7, 2018.
Notice of Allowance from U.S. Appl. No. 15/447,988 dated Dec. 14, 2018.
Ex Parte Quayle Action from U.S. Appl. No. 15/645,749 dated Aug. 7, 2018.
Response to Ex Parte Quayle Action from U.S. Appl. No. 15/645,749 dated Oct. 24, 2018.
Notice of Allowance from U.S. Appl. No. 15/645,749 dated Feb. 26, 2019.

(56) References Cited

OTHER PUBLICATIONS

Office Action from U.S. Appl. No. 08/694,484 dated Feb. 10, 1998.
"Bounder Plus Power Wheelchair: Convention "Tubular" Style Frame"; http://www.wheelchairs.com/plus.htm, Accessed on the World Wide Web on Dec. 17, 2003, p. 1-4.
Response from U.S. Appl. No. 09/698,481 dated Oct. 29, 2002.
U.S. Patent Office Advisory Action from U.S. Appl. No. 09/698,481 dated Nov. 13, 2002.
Supplemental Amendment after Final from U.S. Appl. No. 09/698,481 dated Nov. 27, 2002.
Notice of Allowance from U.S. Appl. No. 09/698,481 dated Dec. 12, 2002.
Office Action from U.S. Appl. No. 09/712,547 dated May 23, 2001.
Response from U.S. Appl. No. 09/712,547 dated Aug. 23, 2001.
Office Action from U.S. Appl. No. 09/712,547 dated Oct. 30, 2001.
Response from U.S. Appl. No. 09/712,547 dated Jan. 28, 2002.
Notice of Allowance from U.S. Appl. No. 09/712,547 dated Mar. 11, 2002.
Office Action from U.S. Appl. No. 09/974,348 dated Feb. 27, 2003.
Response from U.S. Appl. No. 09/974,348 dated Jul. 28, 2003.
Office Action from U.S. Appl. No. 09/974,348 dated Oct. 22, 2003.
Interview Record from U.S. Appl. No. 09/974,348 dated Oct. 28, 2003.
Response from U.S. Appl. No. 09/974,348 dated Jan. 26, 2004.
Advisory Action from U.S. Appl. No. 09/974,348 dated Feb. 27, 2004.
Response from U.S. Appl. No. 09/974,348 dated Apr. 16, 2004.
Notice of Allowance from U.S. Appl. No. 09/974,348 dated May 11, 2004.
Notice of Allowance from U.S. Appl. No. 09/974,348 dated May 20, 2005.
Office Action from related U.S. Appl. No. 10/044,826, dated Apr. 29, 2003.
Response from U.S. Appl. No. 10/044,826 dated Oct. 29, 2003.
Notice of Abandonment from U.S. Appl. No. 10/044,826 dated Nov. 18, 2003.
Response from U.S. Appl. No. 10/044,826 dated Jan. 20, 2004.
Response from U.S. Appl. No. 10/044,826 dated Aug. 16, 2004.
Notice of Allowability from U.S. Appl. No. 10/044,826 dated Jun. 14, 2005.
Notice of Allowance from U.S. Appl. No. 10/044,826 dated Apr. 3, 2006.
U.S. Patent Office Action from U.S. Appl. No. 10/390,133 dated Aug. 8, 2003.
Response from U.S. Appl. No. 10/390,133 dated Feb. 11, 2004.
U.S. Patent Office Action from U.S. Appl. No. 10/390,133 dated Jun. 16, 2004.
Response from U.S. Appl. No. 10/390,133 dated Dec. 20, 2004.
Supplemental Notice of Allowance from U.S. Appl. No. 10/390,133 dated Mar. 30, 2005.
Notice of Allowance from U.S. Appl. No. 10/390,133 dated Jan. 11, 2005.
U.S. Patent Office Action from U.S. Appl. No. 10/390,386 dated Aug. 8, 2003.
Response from U.S. Appl. No. 10/390,386 dated Nov. 11, 2003.
U.S. Patent Office Action from U.S. Appl. No. 10/390,386 dated Jan. 28, 2004.
Response from U.S. Appl. No. 10/390,386 dated May 28, 2004.
U.S. Patent Office Action from U.S. Appl. No. 10/390,386 dated Oct. 12, 2004.
Response from U.S. Appl. No. 10/390,386 dated Mar. 16, 2005.
Notice of Allowance from U.S. Appl. No. 10/390,386 dated Apr. 7, 2005.
Notice of Allowance from U.S. Appl. No. 10/643,010 dated Sep. 30, 2004.
Office Action from U.S. Appl. No. 10/695,045 dated Feb. 22, 2005.
Response from U.S. Appl. No. 10/695,045 dated Jul. 25, 2005.
Office Action from U.S. Appl. No. 10/695,045 dated Oct. 20, 2005.
Response from U.S. Appl. No. 10/695,045 dated Jan. 17, 2006.
Notice of Allowance from U.S. Appl. No. 10/695,045 dated Apr. 11, 2006.
Office Action from U.S. Appl. No. 10/762,977 dated Jan. 18, 2005.
Response from U.S. Appl. No. 10/762,977 dated May 18, 2005.
Office Action from U.S. Appl. No. 10/762,977 dated Aug. 11, 2005.
Response from U.S. Appl. No. 10/762,977 dated Oct. 3, 2005.
Office Action from U.S. Appl. No. 10/762,977 dated Oct. 25, 2005.
Notice of Allowance from U.S. Appl. No. 10/762,977 dated Feb. 23, 2006.
Notice of Allowance from U.S. Appl. No. 11/077,483 dated Aug. 9, 2007.
Office Action from U.S. Appl. No. 11/145,477 dated Mar. 28, 2006.
Office Action from U.S. Appl. No. 11/145,477 dated Sep. 8, 2006.
Response from U.S. Appl. No. 11/145,477 dated Dec. 12, 2006.
Notice of Allowance from U.S. Appl. No. 11/145,477 dated Jan. 8, 2007.
U.S. Patent Office Action from U.S. Appl. No. 11/209,001 dated Jul. 25, 2006.
Office Action from U.S. Appl. No. 11/209,001 dated Nov. 8, 2006.
Notice of Abandonment from U.S. Appl. No. 11/209,001 dated Jul. 10, 2007.
Office Action from U.S. Appl. No. 11/429,687 dated Apr. 9, 2008.
Response from U.S. Appl. No. 11/429,687 dated Jun. 17, 2008.
Notice of Allowance from U.S. Appl. No. 11/429,687 dated Sep. 8, 2008.
Office Action from U.S. Appl. No. 11/472,509 dated May 4, 2007.
Interview Summary from U.S. Appl. No. 11/472,509 dated Aug. 3, 2007.
Response from U.S. Appl. No. 11/472,509 dated Aug. 3, 2007.
Office Action from U.S. Appl. No. 11/472,509 dated Nov. 30, 2007.
Response from U.S. Appl. No. 11/472,509 dated Apr. 30, 2008.
Response from U.S. Appl. No. 11/472,509 dated Jul. 22, 2008.
Office Action from U.S. Appl. No. 11/472,509 dated May 15, 2009.
Response from U.S. Appl. No. 11/472,509 dated Nov. 15, 2009.
Office Action from U.S. Appl. No. 11/472,509 dated Sep. 2, 2010.
Response from U.S. Appl. No. 11/472,509 dated Jan. 3, 2011.
Notice of Appeal and Pre-Appeal Brief Request and Statement from U.S. Appl. No. 11/472,509, filed Mar. 2, 2011.
Interview Summary from U.S. Appl. No. 11/472,509, filed Mar. 2, 2011.
Non-Final Rejection from U.S. Appl. No. 11/472,509 dated Mar. 3, 2011.
Pre-Brief Appeal Conference Decision from U.S. Appl. No. 11/472,509 dated Mar. 23, 2011.
Non-Final Rejection from U.S. Appl. No. 11/472,509 dated Apr. 7, 2011.
Response from U.S. Appl. No. 11/472,509 dated Aug. 8, 2011.
Notice of Allowance from U.S. Appl. No. 11/472,509 dated Nov. 14, 2011.
Supplemental amendment identifying cross-references to related applications from U.S. Appl. No. 11/472,509 dated Aug. 7, 2012.
Notice of Allowance from U.S. Appl. No. 11/472,509 dated Oct. 19, 2012.
Office Action from U.S. Appl. No. 11/474,834 dated Mar. 21, 2007.
Response from U.S. Appl. No. 11/474,834 dated Jun. 28, 2007.
Office Action from U.S. Appl. No. 11/474,834 dated Sep. 20, 2007.
Response from U.S. Appl. No. 11/474,834 dated Nov. 20, 2007.
Notice of Allowance from U.S. Appl. No. 11/474,834 dated Jan. 17, 2008.
Office Action from U.S. Appl. No. 11/490,899 dated Nov. 8, 2006.
Office Action from U.S. Appl. No. 11/490,899 dated Jan. 9, 2007.
Response from U.S. Appl. No. 11/490,899 dated Mar. 20, 2007.
Notice of Allowance from U.S. Appl. No. 11/490,899 dated Jun. 6, 2007.
Notice of Allowance from U.S. Appl. No. 11/490,899 dated Feb. 10, 2009.
Notice of Allowance from U.S. Appl. No. 11/490,899 dated May 26, 2009.
Office Action from U.S. Appl. No. 12/118,099 dated Oct. 28, 2010.
Response to Office Action from U.S. Appl. No. 12/118,099 dated Apr. 25, 2011.
Notice of Allowance from U.S. Appl. No. 12/118,099 dated Jul. 28, 2011.

(56) References Cited

OTHER PUBLICATIONS

Notice of Allowance from U.S. Appl. No. 12/118,099 dated Jul. 3, 2013.
Office Action from U.S. Appl. No. 12/330,554 dated Apr. 11, 2011.
Response to Office Action from U.S. Appl. No. 12/330,554 dated Jul. 11, 2011.
Notice of Allowance from U.S. Appl. No. 12/330,554 dated Sep. 23, 2011.
Notice of Allowance from U.S. Appl. No. 12/330,554 dated Nov. 15, 2011.
Notice of Allowance from U.S. Appl. No. 12/330,554 dated Feb. 14, 2012.
Office Action from U.S. Appl. No. 12/522,837 dated Feb. 15, 2011.
Amendment from U.S. Appl. No. 12/522,837 dated Jun. 15, 2011.
Notice of Allowance from U.S. Appl. No. 12/522,837 dated Jul. 26, 2011.
Notice of Allowance from U.S. Appl. No. 12/522,837 dated Jun. 28, 2012.
Office Action from U.S. Appl. No. 12/523,630 dated Dec. 21, 2011.
Response from U.S. Appl. No. 12/523,630 dated Mar. 15, 2012.
Notice of Allowance from U.S. Appl. No. 12/523,630 dated Jun. 11, 2012.
Restriction /Election Requirement for U.S. Appl. No. 12/524,476 dated Dec. 31, 2012.
Office Action from U.S. Appl. No. 12/524,476 dated May 22, 2013.
Amendment in U.S. Appl. No. 12/524,476 dated Nov. 20, 2013.
Final Office Action in U.S. Appl. No. 12/524,476 dated Feb. 27, 2014.
Notice of Allowance from U.S. Appl. No. 12/524,476 dated Aug. 15, 2014.
Office Action from U.S. Appl. No. 12/568,728 dated Jun. 10, 2010.
Response from U.S. Appl. No. 12/568,728 dated Nov. 5, 2010.
Office Action from U.S. Appl. No. 12/568,728 dated Jan. 24, 2011.
Notice of Allowance from U.S. Appl. No. 12/568,728 dated Oct. 26, 2011.
Examiner-Initiated Interview Summary from U.S. Appl. No. 12/568,728 dated Dec. 8, 2011.
RCE with Remarks (Amendments to Specification) from U.S. Appl. No. 12/568,728 dated Jan. 9, 2012.
Notice of Allowance from U.S. Appl. No. 12/568,728 dated Jan. 24, 2012.
Office Action from U.S. Appl. No. 13/413,839 dated Sep. 26, 2013.
Response to Office Action from U.S. Appl. No. 13/413,839 dated Feb. 26, 2014.
Notice of Allowance from U.S. Appl. No. 13/413,839 dated May 1, 2014.
Restriction Requirement in U.S. Appl. No. 13/465,404 dated Jan. 3, 2013.
Response to Restriction Requirement in U.S. Appl. No. 13/465,404 dated Feb. 4, 2013.
Office Action in U.S. Appl. No. 13/465,404 dated Apr. 11, 2013.
Response to Office Action in U.S. Appl. No. 13/465,404 dated Jul. 11, 2013.
Notice of Allowance in U.S. Appl. No. 13/465,404 dated Sep. 27, 2013.
Office Action from U.S. Appl. No. 13/465,268 dated Jul. 19, 2012.
Response to Office Action from U.S. Appl. No. 13/465,268 dated Jan. 22, 2013.
Final Office Action in U.S. Appl. No. 13/465,268 dated Apr. 15, 2013.
Amendment with RCE, terminal disclaimer for U.S. Appl. No. 13/465,268 dated Oct. 15, 2013.
Non-Final Office Action in U.S. Appl. No. 13/465,268 dated Apr. 15, 2014.
Notice of Allowance for U.S. Appl. No. 13/465,268 dated Oct. 24, 2014.
First Office Action in U.S. Appl. No. 13/566,473 dated Dec. 6, 2012.
Response in U.S. Appl. No. 13/566,473 dated Apr. 8, 2013.
Office Action in U.S. Appl. No. 13/568,623 dated Feb. 1, 2013.
Response to Office Action in U.S. Appl. No. 13/568,623 dated Jun. 19, 2013.
Notice of Allowance in U.S. Appl. No. 13/568,623 dated Oct. 9, 2013.
Notice of Allowance in U.S. Appl. No. 13/568,623 dated Apr. 2, 2014.
Restriction Requirement in U.S. Appl. No. 12/900,548 dated Jun. 28, 2013.
Response to Restriction Requirement in U.S. Appl. No. 12/900,548 dated Jul. 29, 2013.
Office Action in U.S. Appl. No. 12/900,548 dated Sep. 9, 2013.
Response to Office Action in U.S. Appl. No. 12/900,548 dated Jan. 28, 2014.
Office Action in U.S. Appl. No. 12/900,548 dated Jun. 2, 2014.
RCE and Amendment Filed in U.S. Appl. No. 12/900,548 dated Oct. 1, 2014.
Notice of Allowance in U.S. Appl. No. 12/900,548 dated Dec. 18, 2014.
Restriction Requirement from U.S. Appl. No. 13/768,878 dated Jun. 4, 2014.
Response to Restriction Requirement in U.S. Appl. No. 13/768,878 dated Sep. 4, 2014.
Notice of Allowance for U.S. Appl. No. 13/768,878 dated Dec. 11, 2015.
Office Action from U.S. Appl. No. 13/768,878 dated Dec. 3, 2014.
Response to Office Action from U.S. Appl. No. 13/768,878 dated Jan. 21, 2015.
Notice of Allowance from U.S. Appl. No. 14/162,955 dated May 26, 2015.
Office Action from U.S. Appl. No. 14/446,735 dated Jan. 14, 2016.
Response to Office Action from U.S. Appl. No. 14/446,735 dated Apr. 12, 2016.
Notice of Allowance from U.S. Appl. No. 14/446,735 dated Jul. 15, 2016.
Notice of Allowance from U.S. Appl. No. 14/446,735 dated Nov. 16, 2016.
Restriction Requirement from U.S. Appl. No. 14/486,766 dated Jun. 8, 2015.
Response to Restriction Requirement from U.S. Appl. No. 14/486,766 dated Aug. 10, 2015.
Office Action from U.S. Appl. No. 14/486,766 dated Sep. 16, 2015.
Response to Office Action from U.S. Appl. No. 14/486,766 dated Dec. 8, 2015.
Notice of Allowance from U.S. Appl. No. 14/486,766 dated Feb. 9, 2016.
Office Action from U.S. Appl. No. 14/566,899 dated Sep. 17, 2015.
Response to Office Action from U.S. Appl. No. 14/566,899 dated Dec. 10, 2015.
Notice of Allowance from U.S. Appl. No. 14/566,899 dated Jan. 21, 2016.
Office Action from U.S. Appl. No. 14/585,393 dated Sep. 3, 2015.
Response to Office Action from U.S. Appl. No. 14/585,393 dated Jan. 21, 2016.
Notice of Allowance from U.S. Appl. No. 14/585,393 dated Feb. 22, 2016.
Office Action from U.S. Appl. No. 14/690,678 dated Nov. 16, 2015.
Response to Office Action from U.S. Appl. No. 14/690,678 dated Mar. 16, 2016.
Office Action from U.S. Appl. No. 14/690,678 dated Jul. 15, 2016.
Pre-Brief Conference Request and Notice of Appeal from U.S. Appl. No. 14/690,678 dated Dec. 19, 2016.
Pre-Brief Appeal Conference Decision from U.S. Appl. No. 14/690,678 dated Feb. 3, 2017.
Office Action from U.S. Appl. No. 14/690,678 dated May 10, 2017.
Amendment from U.S. Appl. No. 14/690,678 dated Jul. 31, 2017.
Notice of Allowance from U.S. Appl. No. 14/690,678 dated Oct. 26, 2017.
Office Action from U.S. Appl. No. 14/875,110 dated May 20, 2016.
Response to Office Action from U.S. Appl. No. 14/875,110 dated Sep. 20, 2016.
Final Office Action from U.S. Appl. No. 14/875,110 dated Feb. 15, 2017.

(56) References Cited

OTHER PUBLICATIONS

Response to Office Action from U.S. Appl. No. 14/875,110 dated May 15, 2017.
Office Action from U.S. Appl. No. 14/875,110 dated May 24, 2017.
Amendment from U.S. Appl. No. 14/875,110 dated Sep. 25, 2017.
Final Office Action from U.S. Appl. No. 14/875,110 dated Dec. 11, 2017.
Response to Office Action from U.S. Appl. No. 14/875,110 dated Jan. 23, 2018.
Notice of Allowance from U.S. Appl. No. 14/875,110 dated Feb. 16, 2018.
Office Action from U.S. Appl. No. 15/060,121 dated Oct. 31, 2016.
Response to Office Action from U.S. Appl. No. 15/060,121 dated Jan. 31, 2017.
Notice of Allowance from U.S. Appl. No. 15/060,121 dated May 17, 2017.
Office Action from U.S. Appl. No. 15/146,260 dated Apr. 10, 2017.
Amendment from U.S. Appl. No. 15/146,260 dated Jun. 22, 2017.
Notice of Allowance from U.S. Appl. No. 15/146,260 dated Jul. 27, 2017.
Ex Parte Quayle Action from U.S. Appl. No. 15/151,929 dated Aug. 8, 2017.
Response to Ex Parte Quayle Action from U.S. Appl. No. 15/151,929 dated Oct. 9, 2017.
Office Action from U.S. Appl. No. 15/159,264 dated Nov. 17, 2016.
Notice of Allowance from U.S. Appl. No. 15/151,929 dated Nov. 16, 2017.
Response to Office Action from U.S. Appl. No. 15/159,264 dated Feb. 17, 2017.
Final Office Action from U.S. Appl. No. 15/159,264 dated Jun. 13, 2017.
Response After Final from U.S. Appl. No. 15/159,264 dated Sep. 12, 2017.
Advisory Action from U.S. Appl. No. 15/159,264 dated Sep. 28, 2017.
Office Action from U.S. Appl. No. 15/159,264 dated Dec. 26, 2017.
"All-Terrain Wheelchair, Designer's Corner", Design News, Feb. 24, 1992, cover page and p. 54.
"Big Bounder Power Wheelchair: Conventional "Tubular" Style Frame"; http://www.wheelchair.com/bigbounderpage.htm, Accessed on the World Wide Web on Dec. 17, 2003, p. 1-4.
"Frog Legs: Smooth Ride Ahead"; http://www.froglegsinc.com/index.php, Accessed on the World Wide Web on Dec. 17, 2003, p. 105.
"Frog Legs Tires", http://mdtap.org/tt/1999.09/prod.html, Accessed on the World Wide Web on Dec. 17, 2003, p. 1-3.
Golden Technologies advertisement video http://youtu.be/TyEvrmoaHME.
"Invacare pronto M7I jr. Power Wheelchair Manual"; Accessed on the World Wide Web on Dec. 17, 2003.
"Invacare Storm Series TDX Power Wheelchairs Manual"; Accessed on the World Wide Web on Dec. 17, 2003, p. 1-24.
"Invacare Xterra Series GT Power Wheelchair Manual", Accessed on the World Wide Web on Dec. 17, 2003, p. 1-4.
"Jazzy 1122", Pride Mobile Products Corp., Accessed on the World Wide Web on Dec. 17, 2003, p. 1-2.
"Jazzy 1133", Pride Mobile Products Corp., Accessed on the World Wide Web on Dec. 17, 2003, p. 1-2.
"Jazzy 1170XL", Pride Mobile Products Corp., Accessed on the World Wide Web on Dec. 17, 2003, p. 1-2.
Kauzlarich, J. et al., "Wheelchair Caster Shimmy II: Damping", Journal for Rehabilitative Research and Development, May/Jun. 2000, vol. 37, No. 3, pp. 305-314.
McLauren, C., "Future Developments—Current Directions in Wheelchair Research", Journal for Rehabilitative Research and Development, Jul./Aug. 1985, vol. 42, No. 4 Suppl. No. 2, pp. 88-99.
"Bruno Independent Living Aids ISP 9001 Certified"; http://www.bruno.com/power_chairs.htm, Accessed on the World Wide Web on Dec. 17, 2003, p. 1-5.
"Top End Terminator SS Sports Wheelchair", http://phc-online.com/terminator_ss.htm, Accessed on the World Wide Web on Dec. 17, 2003, p. 1-5.
"TransActions of the Institute of Measurement and Control", The British Library of Science Technology and Business, vol. 24, Nov. 5, 2002, 15 pgs.
M.J. Lawn, et al. "Modeling of a Stair-Climbing Wheelchair Mechanism with High Single-Step Capability", IEEE TransActions on Neutral Systems and Rehabilitation Engineering, vol. 11, No. 3, Sep. 2003, pp. 323-332.
Quickie G-424 User Instruction Manual & Warranty, 930484 Rev. A (27 sheets) (alleged date not later than 2000).
10 photographs (8.5×11) of Quickie G-424 Wheelchair obtained Nov. 24, 2004.
Sunrise Medical, Inc., Power Products Parts Manual, 930307 Rev. K (264 double sided sheets), Jul. 2004. (Note: various dates are alleged therein based on wheelchair products listed including the Quickie G-424).
Permobil Chairman HD3 Owner's Manual dated May 2003, 52 pages.
Permobil C400 Power Wheelchair, Owner's Manual, version 6, 2010, Permobil AB, Sweden, 100 pgs.
Permobil C500 Power Wheelchair, Owner's Manual, version 6, 2010, Permobil AB, Sweden, 100 pgs.
Pride Mobility, Jet 3 Ultra Owner's Manual dated Jun. 2007, 43 pages.
Quantum Series Owner's Manual dated Feb. 2009, 43 pages.
"Bike" magazine article, "Ten Underrated Products You Probably Don't Own but Maybe Should" (in part), Jan. 1994, pp. 82 and 83.
"Bike" magazine article "Softride Contour", Mar. 1994, pp. 64-65.
"Mountain Bike Action", picture and caption describing "Body Shock", Jan. 1994, pp. 48.
International Search Report from PCT/US98/07543 dated Aug. 19, 1998.
International Search Report from PCT/US01/42656 dated Jan. 14, 2003.
International Search Report from PCT/US02/29996 dated Jun. 24, 2003, 2 pgs.
International Preliminary Examination Report from PCT/US02/29996 dated Dec. 11, 2003.
International Search Report from PCT/US02/29998 dated Dec. 12, 2002.
International Preliminary Examination Report from PCT/US02/29998 dated Jan. 13, 2004.
International Search Report and Written Opinion from PCT/US03/25736 dated Dec. 28, 2004.
International Search Report from PCT/US03/34124 dated Dec. 28, 2004.
International Preliminary Examination Report from PCT/US03/34124 dated Aug. 25, 2006.
International Search Report and Written Opinion from PCT/IB08/050111 dated Jun. 4, 2008.
Amendments under Article 34(2)(b) PCT and Comments from PCT/IB08/050111 dated Oct. 2, 2008.
International Preliminary Report on Patentability for International Patent Application No. PCT/IB08/050111 dated Apr. 22, 2009.
International Search Report and Written Opinion from PCT/US08/52878 dated Jul. 3, 2008.
International Search Report and Written Opinion from PCT/US08/53242 dated Sep. 3, 2008.
International Search Report and Written Opinion from PCT/US10/51888 dated Dec. 6, 2010.
International Search Report and Written Opinion for PCT/US13/026441 dated Apr. 23, 2013.
Office Action dated Feb. 2, 2006 from Control No. 90/007,491.
Interview Summary from Control No. 90/007,491 dated Mar. 23, 2006.
Statement as to the substance of an Interview from Control No. 90/007,491 Apr. 3, 2006.
Response from Control No. 90/007,491 dated Apr. 3, 2006.
Office Action dated Jul. 5, 2006 from Control No. 90/007,491.
Notice of Allowance from U.S. Appl. No. 15/935,538 dated Aug. 9, 2019.

(56) References Cited

OTHER PUBLICATIONS

Notice of Allowance from U.S. Appl. No. 15/645,749 dated May 28, 2019.
Office Action from U.S. Appl. No. 15/935,538 dated Mar. 26, 2019.
Response to Office Action from U.S. Appl. No. 15/935,538 dated Jun. 26, 2019.

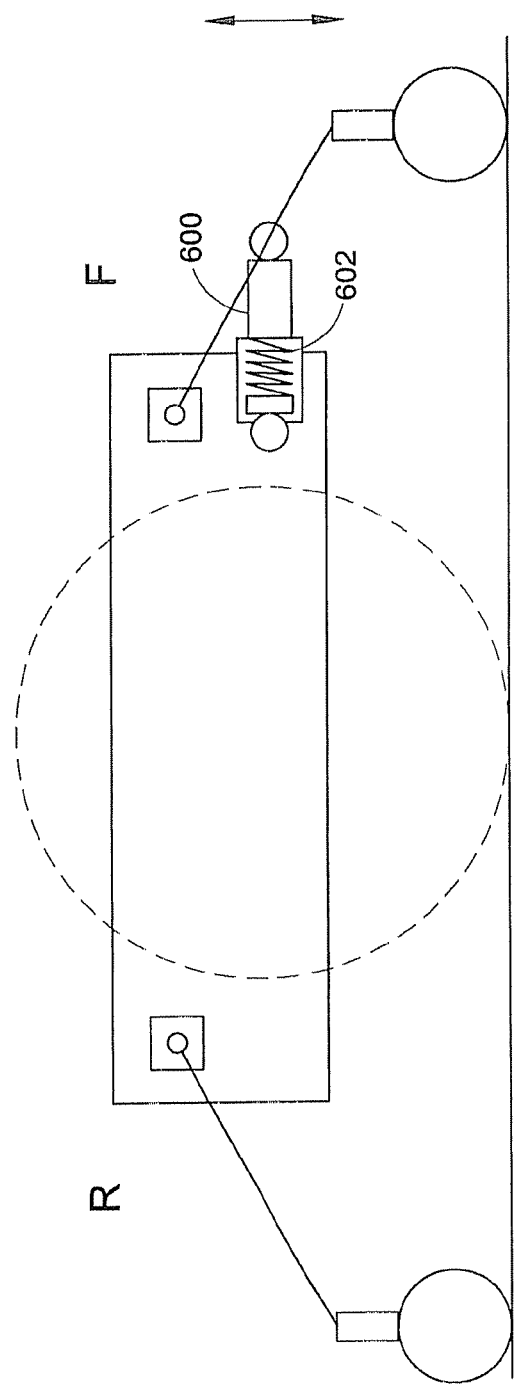

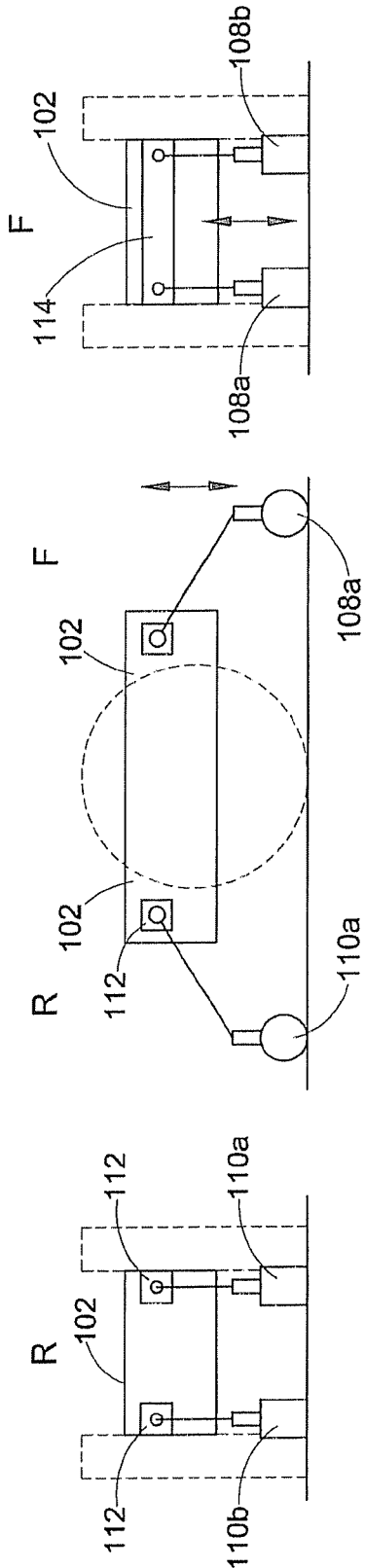

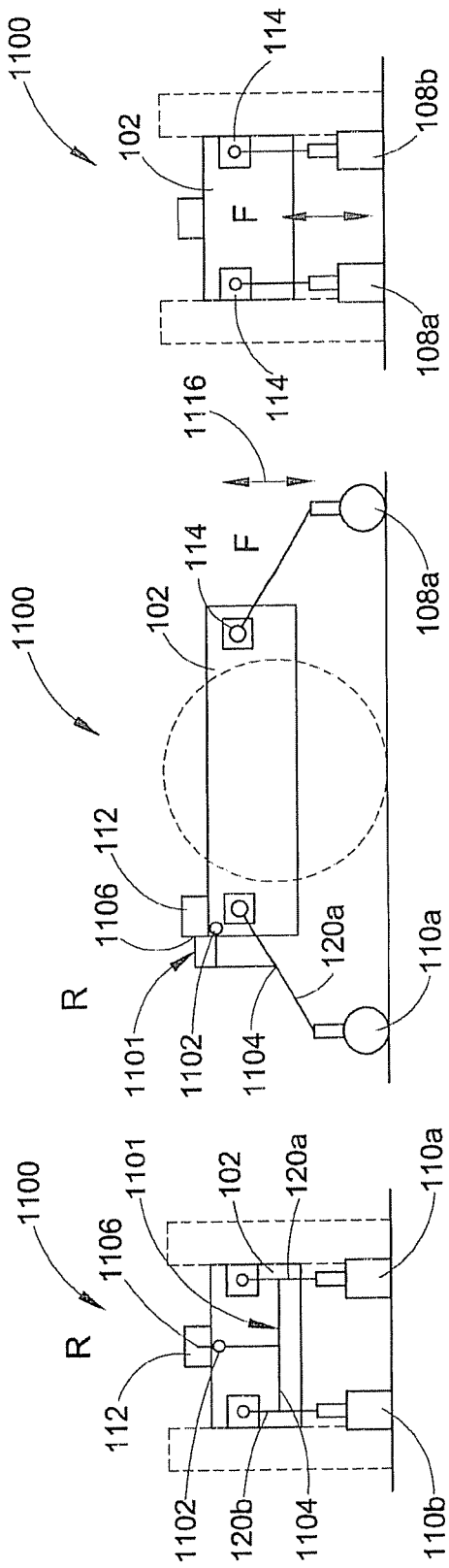

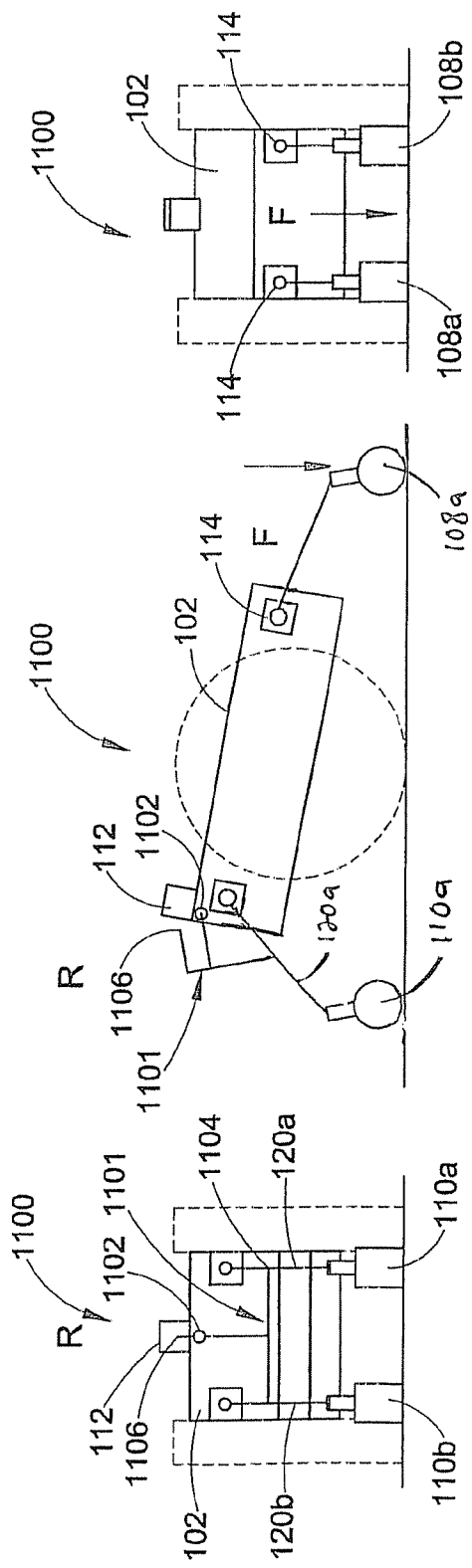

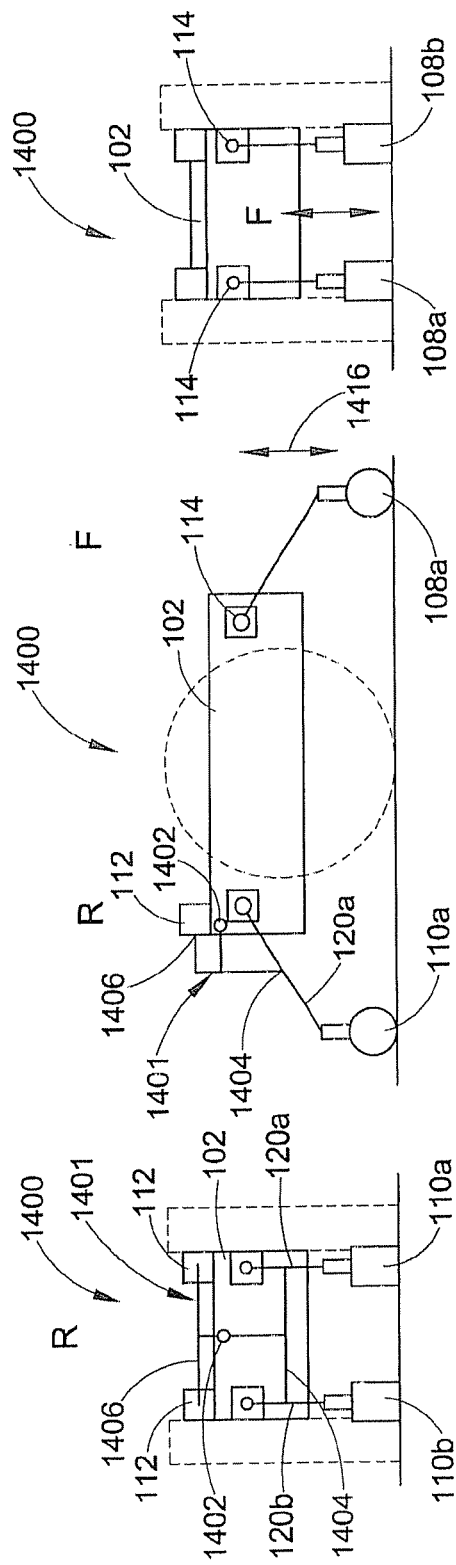

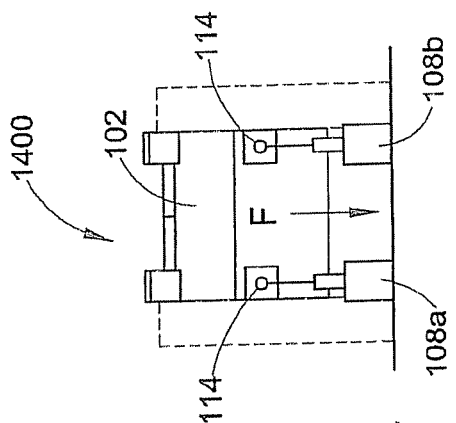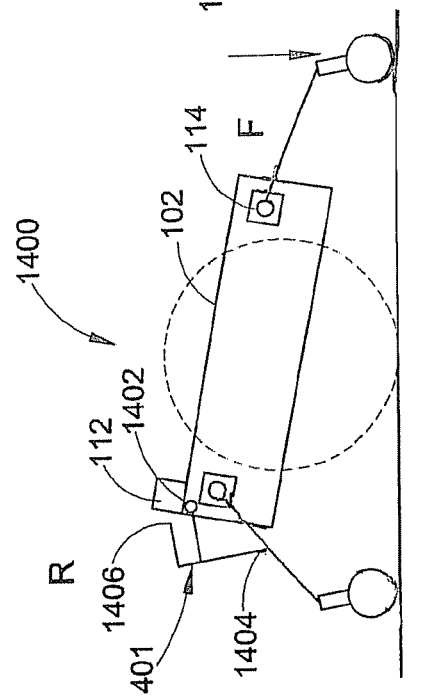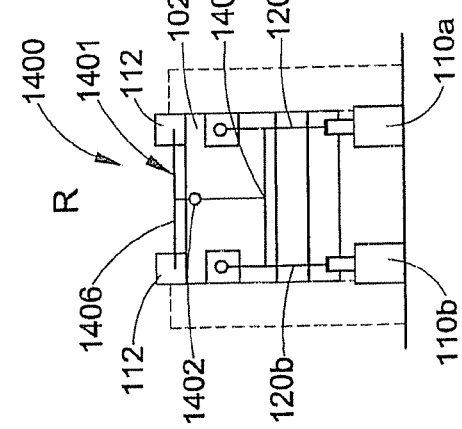

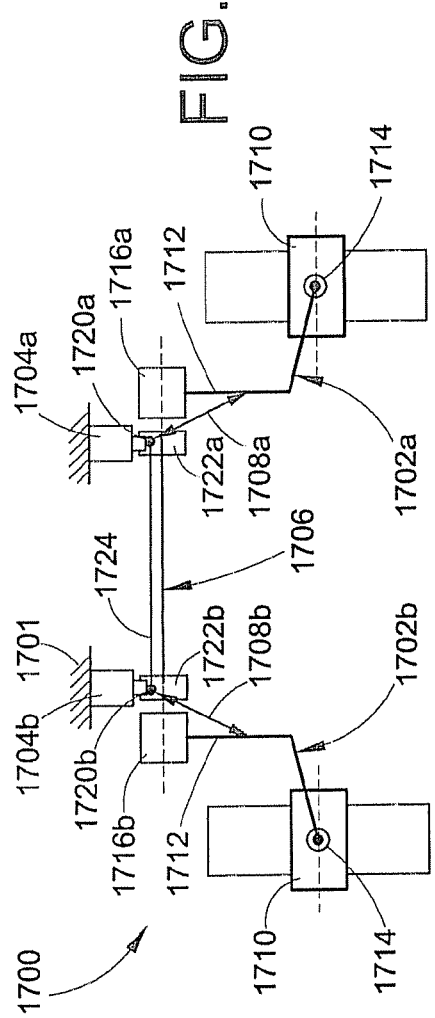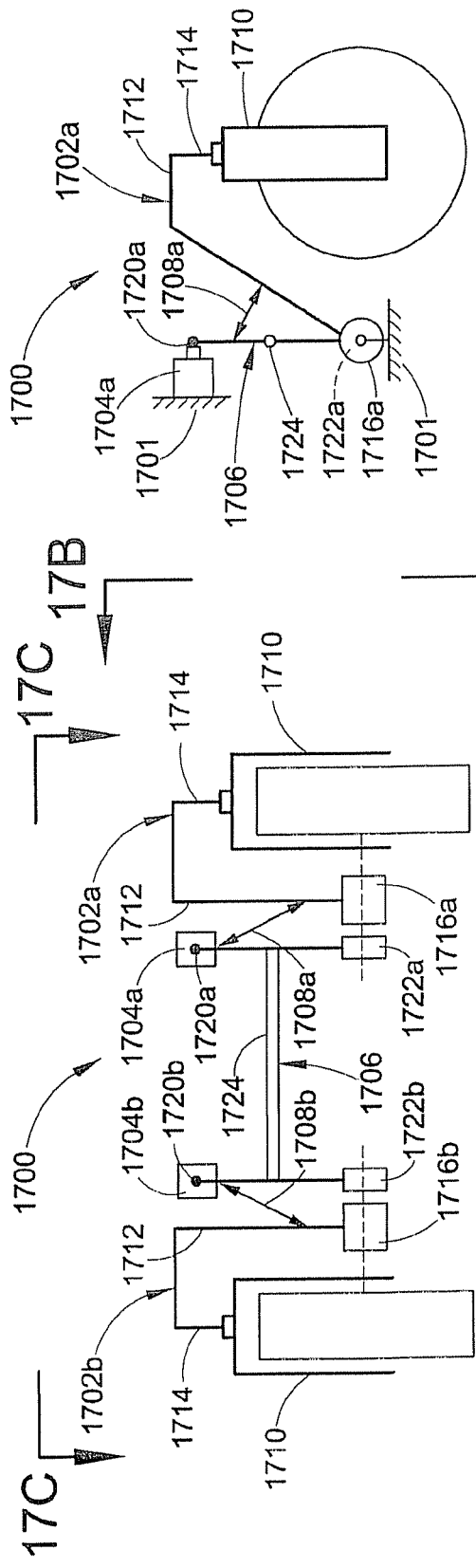

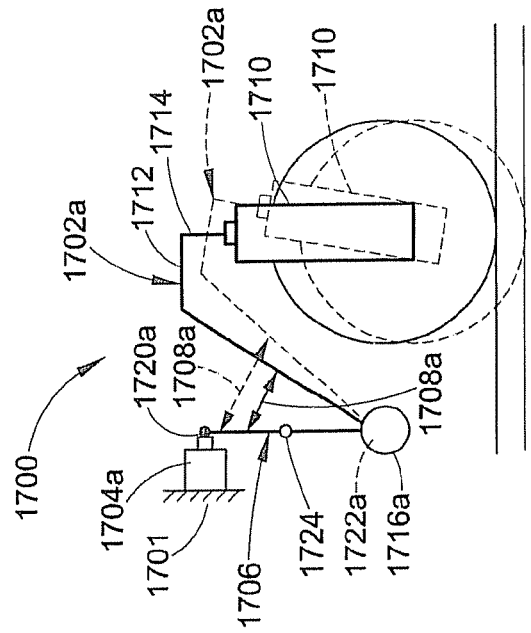
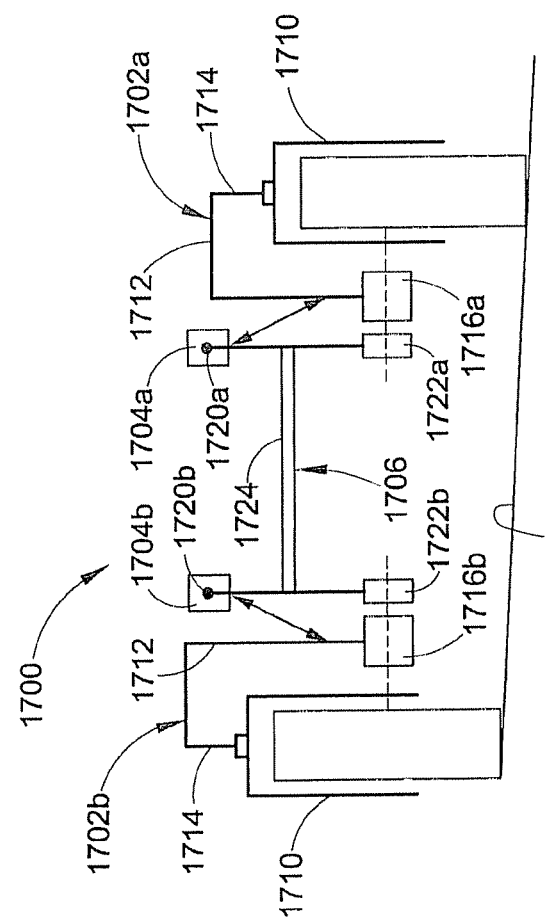
FIG. 18B
FIG. 18A

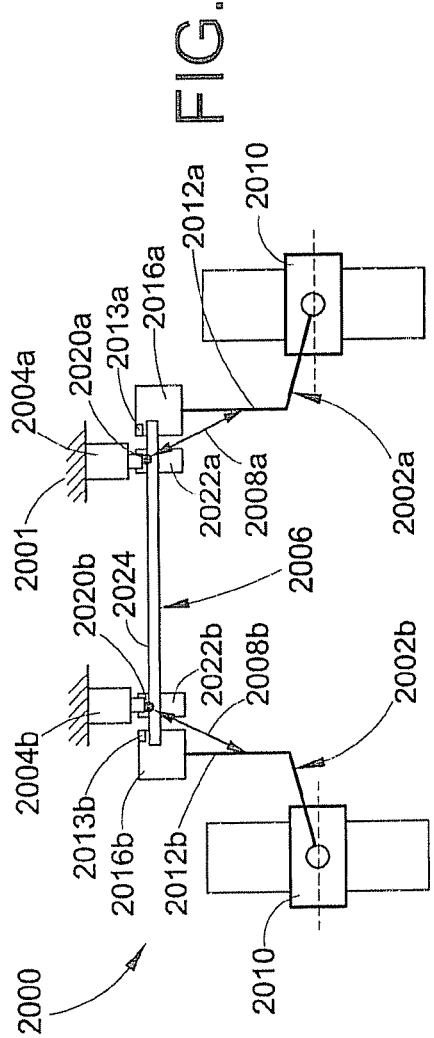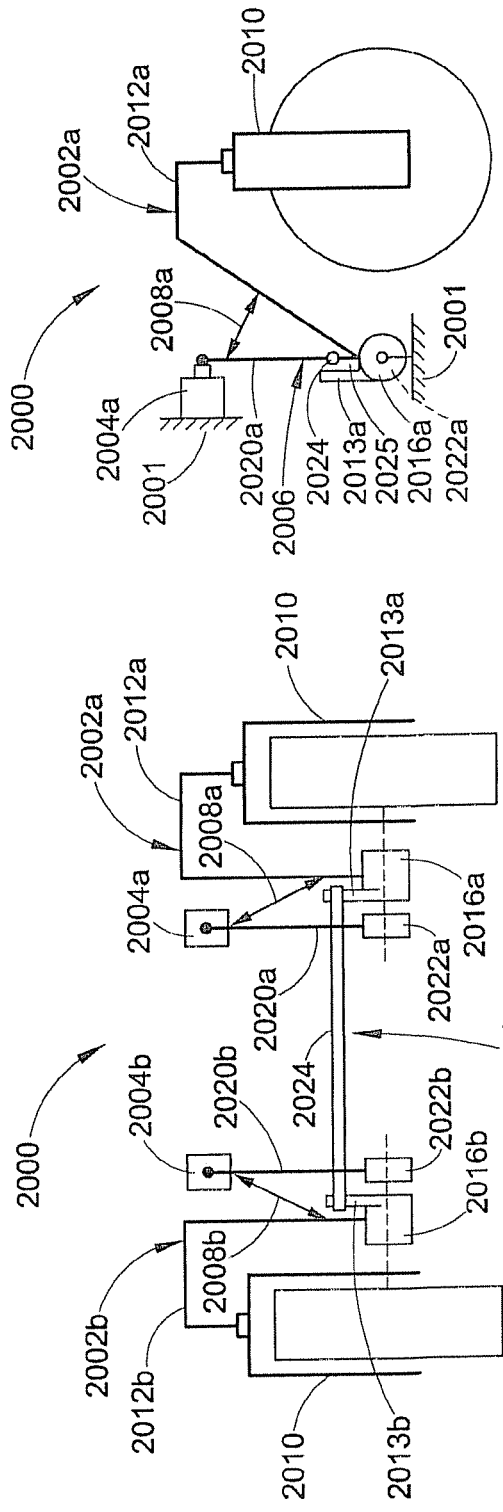

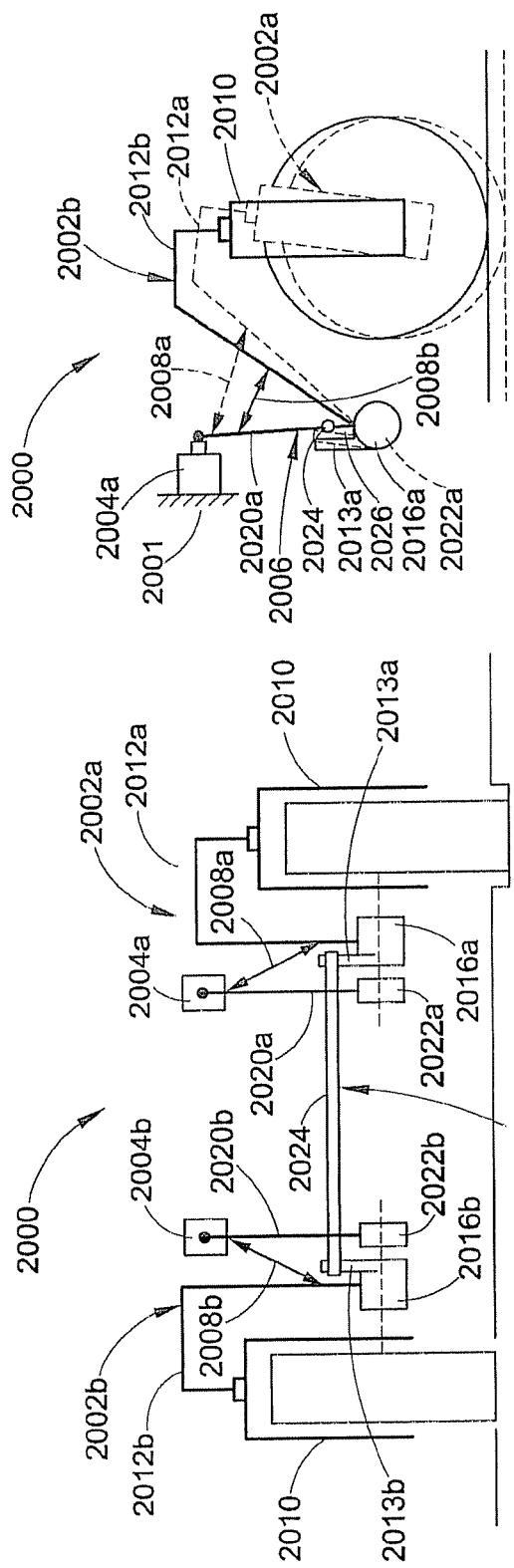

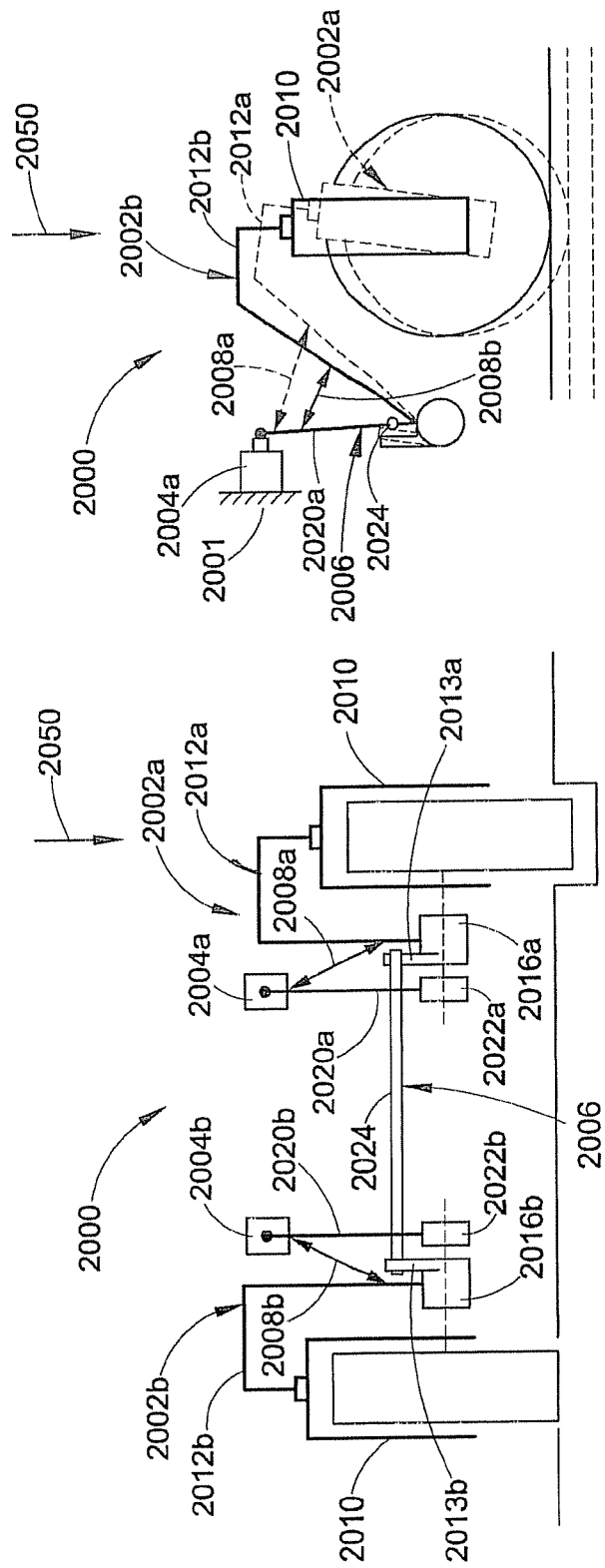

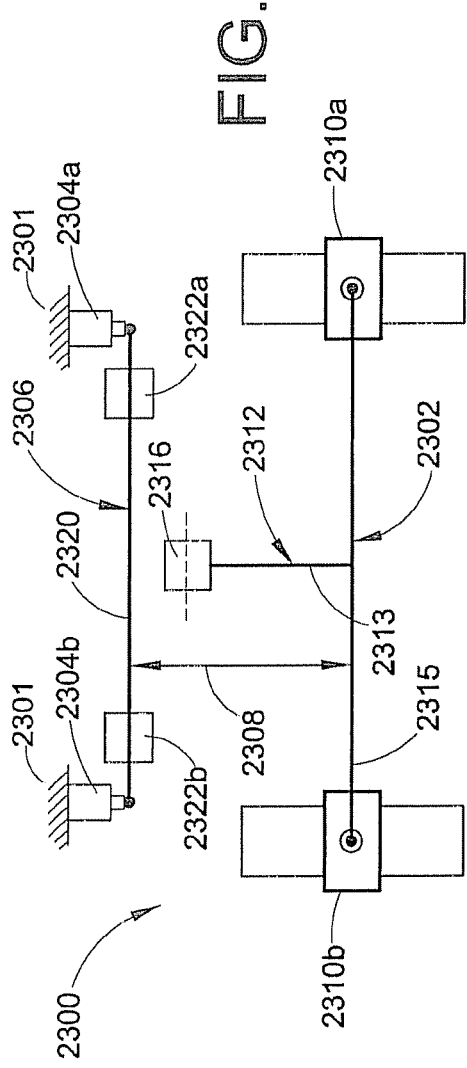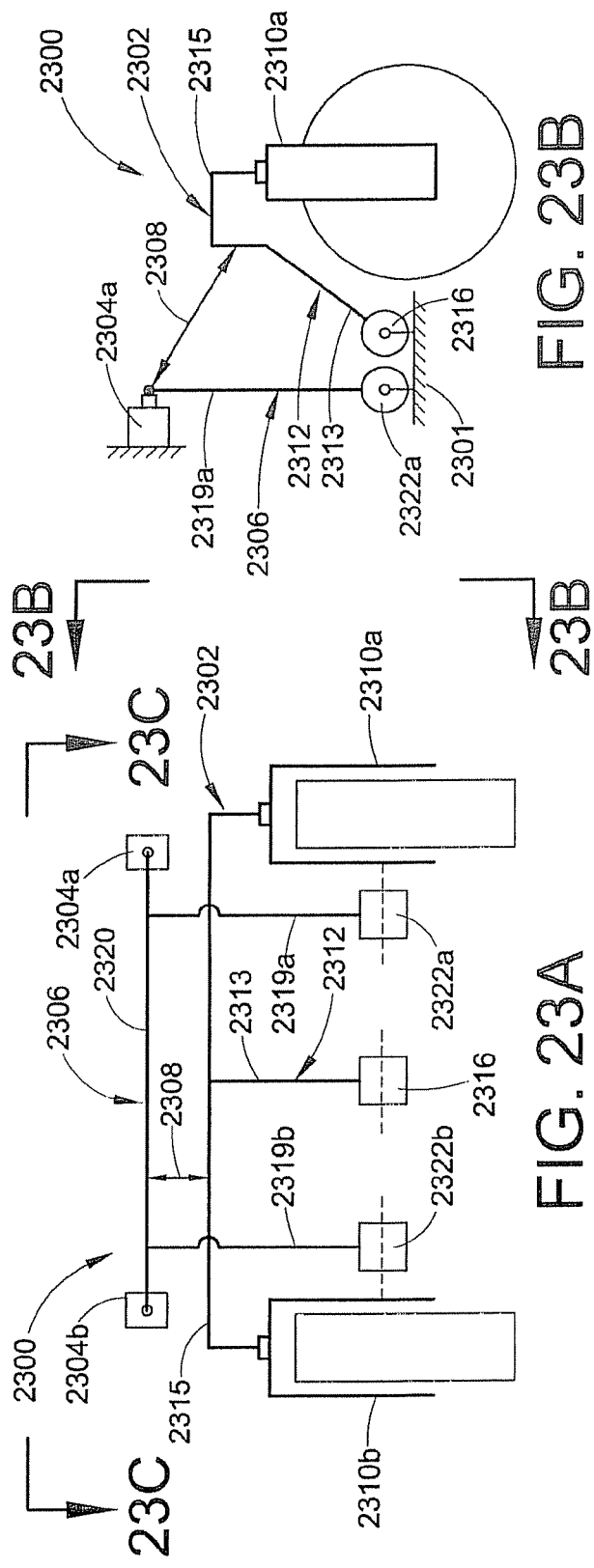

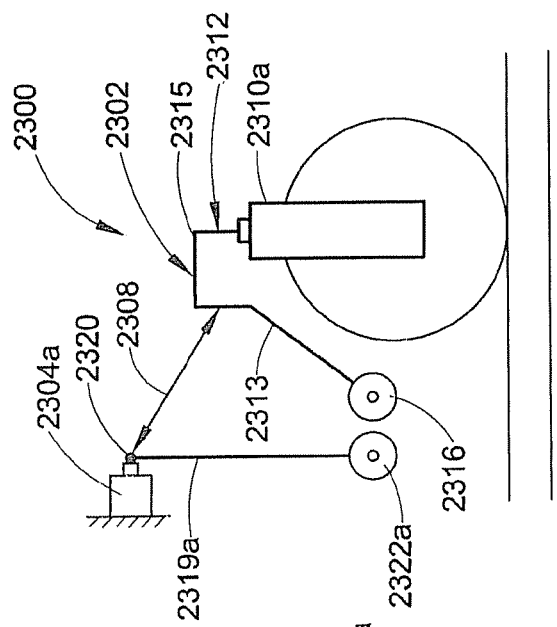
FIG. 24B
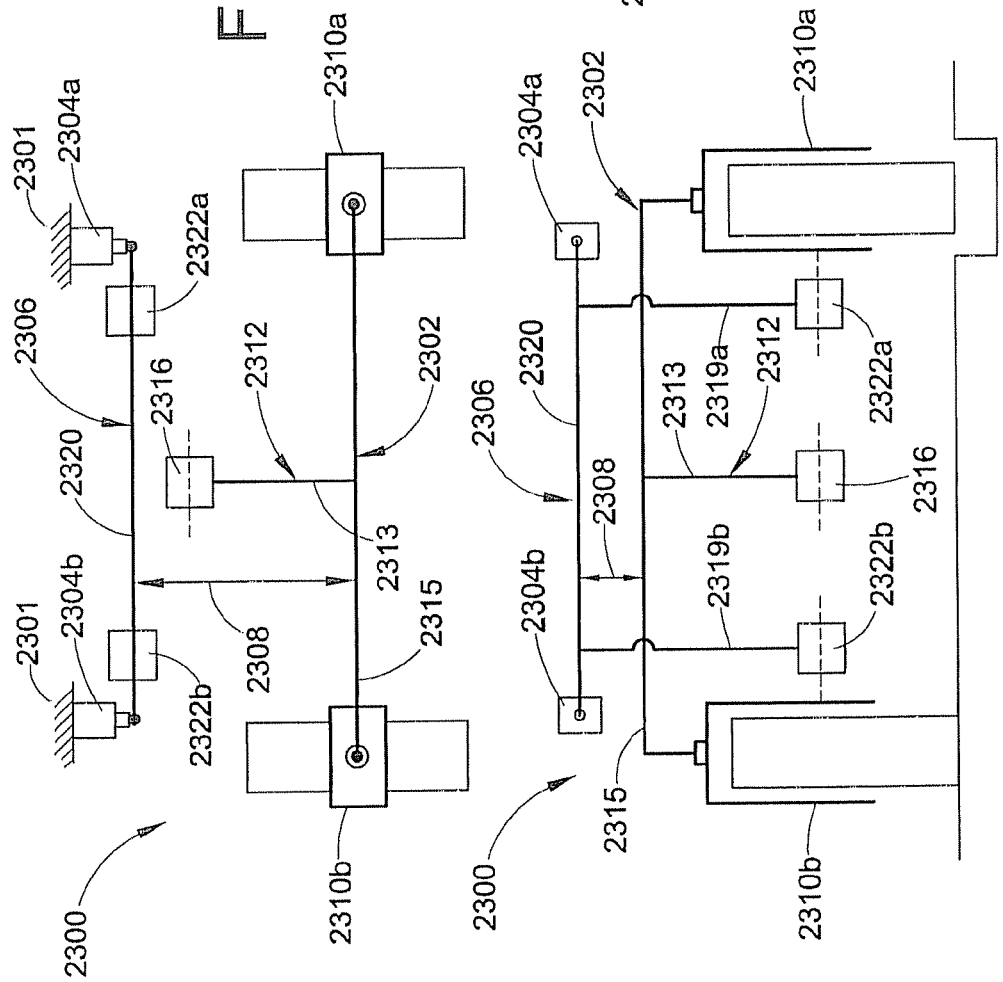
FIG. 24C
FIG. 24A

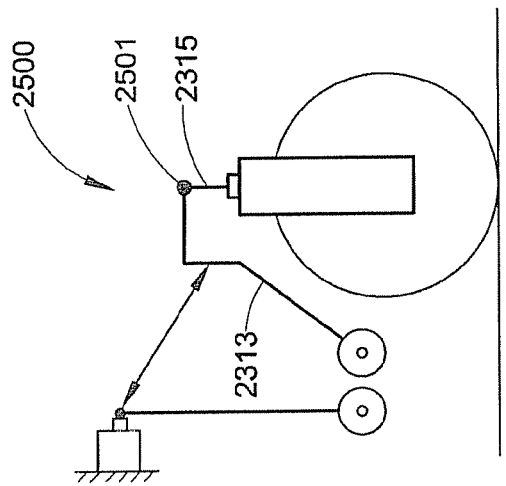
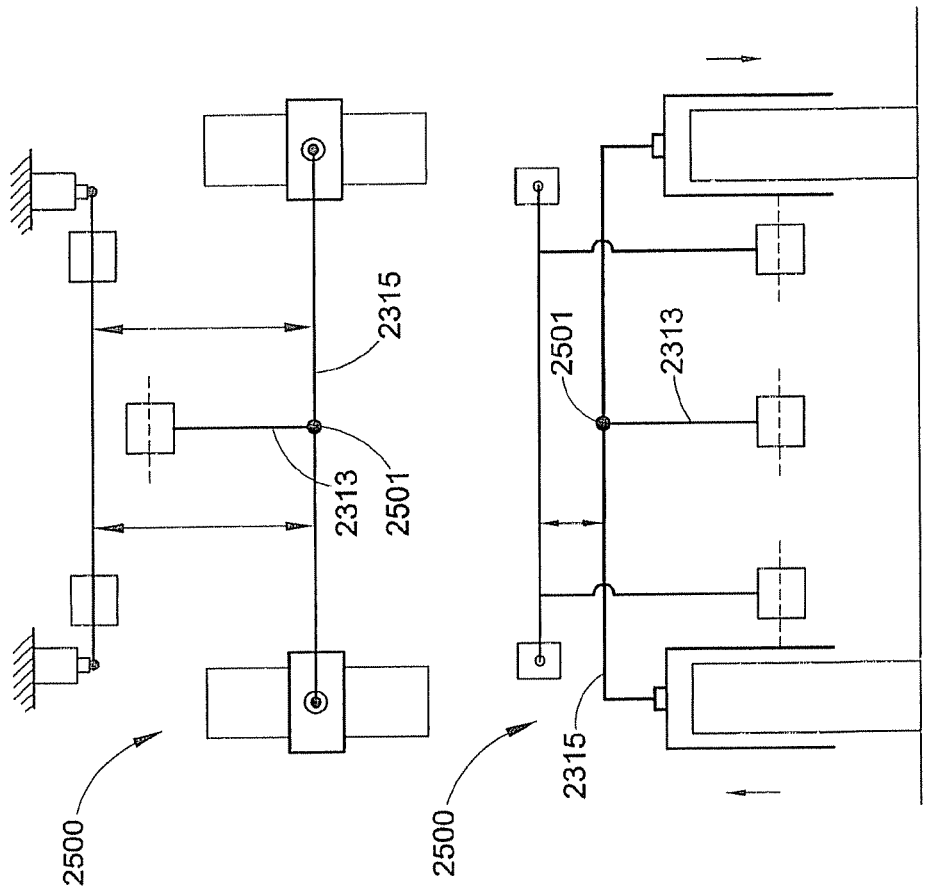

STABILITY CONTROL SYSTEM

RELATED APPLICATIONS

This application is a continuation application of U.S. Ser. No. 15/146,260, filed on May 4, 2016 and titled "STABILITY CONTROL SYSTEM," now U.S. Pat. No. 9,827,823, which is a divisional application of U.S. Ser. No. 14/566,899, filed on Dec. 11, 2014 and titled "STABILITY CONTROL SYSTEM," now U.S. Pat. No. 9,346,335, which is a divisional application of U.S. Ser. No. 12/524,476, filed on Jul. 24, 2009 and titled "WHEELCHAIR WITH SUSPENSION" now U.S. Pat. No. 8,910,975, which is the U.S. National Stage Entry of PCT/US2008/053242, filed on Feb. 7, 2008, which claims the benefit of U.S. Provisional Patent Application Ser. No. 60/901,513, filed on Feb. 14, 2007 and titled "STABILITY CONTROL SYSTEM," the entire disclosures of which are fully incorporated herein by reference.

BACKGROUND

Wheelchairs and scooters are an important means of transportation for a significant portion of society. Whether manual or powered, these vehicles provide an important degree of independence for those they assist. However, this degree of independence can be limited if the wheelchair is required to traverse obstacles such as, for example, curbs that are commonly present at sidewalks, driveways, and other paved surface interfaces. This degree of independence can also be limited if the vehicle is required to ascend inclines or descend declines.

Most wheelchairs have front and rear casters to stabilize the chair from tipping forward or backward and to ensure that the drive wheels are always in contact with the ground. The caster wheels are typically much smaller than the driving wheels and located both forward and rearward of the drive wheels. Though this configuration provides the wheelchair with greater stability, it can hamper the wheelchair's ability to climb over obstacles such as, for example, curbs or the like, because the size of the front casters limits the height of the obstacle that can be traversed.

Though equipped with front and rear suspended casters, most mid-wheel drive wheelchairs exhibit various degrees of tipping forward or rearward when descending declines or ascending inclines. This is because the suspensions suspending the front or rear stabilizing casters are compromised so that they are not made too rigid, which would prevent tipping and also not provide much suspension, or are made too flexible thereby effectively not providing any degree of suspension or stabilization.

SUMMARY

According to one embodiment, a suspension for a vehicle is provided. The suspension includes, for example, a stabilizing assembly. The stabilizing assembly inhibits tipping of a frame of the vehicle when tipping of the frame is detected.

BRIEF DESCRIPTION OF THE DRAWINGS

In the accompanying drawings which are incorporated in and constitute a part of the specification, embodiments of tip or stability control systems, sub-assemblies, and components are illustrated, which together with a general description given above and the detailed description given below, serve to explain the principles of tip or stability control systems, sub-assemblies and components.

FIG. 6 is an illustration of an embodiment of a wheelchair with a fluid cylinder with spring return stabilizing assembly;

FIGS. 8A-8C illustrate an embodiment of a mid-wheel drive wheelchair that is similar to the wheelchair shown in FIGS. 1A-1C that includes a single stabilizing member or assembly;

FIGS. 11A-11C illustrate an embodiment of a mid-wheel drive wheelchair that is similar to the wheelchair shown in FIGS. 1A-1C that includes a rear caster position sensing linkage coupled to a single trigger or sensor that indicates when both rear casters drop relative to a frame;

FIGS. 13A-13C illustrate the wheelchair of FIGS. 11A-11C, where the wheelchair is exhibiting a tipping behavior;

FIGS. 14A-14C illustrate an embodiment of a mid-wheel drive wheelchair that is similar to the wheelchair shown in FIGS. 1A-1C that includes a rear caster position sensing linkage coupled to a pair of triggers or sensor that indicates when both rear casters drop relative to a frame;

FIGS. 16A-16C illustrate the wheelchair of FIGS. 14A-14C, where the wheelchair is exhibiting a tipping behavior;

FIG. 17A illustrates a rear view of an embodiment of a rear caster suspension with a rear caster position sensing arrangement;

FIG. 17B is a view taken along lines 17B-17B in FIG. 17A, illustrating a side view of the rear caster suspension and rear caster position sensing arrangement;

FIG. 17C is a view taken along lines 17C-17C in FIG. 17A, illustrating a top view of the rear caster suspension and rear caster position sensing arrangement;

FIGS. 18A and 18B illustrate the rear caster suspension and rear caster position sensing arrangement of FIGS. 17A-17C, where one rear caster has moved downward;

FIGS. 20A-20C illustrate an embodiment of a rear caster suspension and rear caster position sensing arrangement that is similar to the rear caster suspension and rear caster position sensing arrangement shown in FIGS. 17A-17C where movement of a first rear caster pivot arm depends on a position of a second rear caster pivot arm;

FIGS. 21A and 21B illustrate the rear caster suspension and rear caster position sensing arrangement of FIGS. 20A-20C, where one rear caster has moved downward;

FIGS. 22A and 22B illustrate the rear caster suspension and rear caster position sensing arrangement of FIGS. 20A-20C, where further downward movement of one rear caster is inhibited by a second rear caster;

FIG. 23A illustrates a rear of an embodiment of a rear caster suspension and rear caster position sensing arrangement;

FIG. 23B is a view taken along lines 23B-23B in FIG. 23A, illustrating a side of the rear caster suspension and rear caster position sensing arrangement;

FIG. 23C is a view taken along lines 23C-23C in FIG. 23A, illustrating a top of the rear caster suspension and rear caster position sensing arrangement;

FIGS. 24A-24C illustrate the rear caster suspension and rear caster position sensing arrangement of FIGS. 23A-23C, where downward movement of one rear caster is inhibited by a second rear caster;

FIGS. 25A-25C illustrate an embodiment of a rear caster suspension and rear caster position sensing arrangement that is similar to the rear caster suspension and rear caster position sensing arrangement of FIGS. 23A-23C, where the rear casters are connected to a pivotable arm;

DETAILED DESCRIPTION

Figure 1:
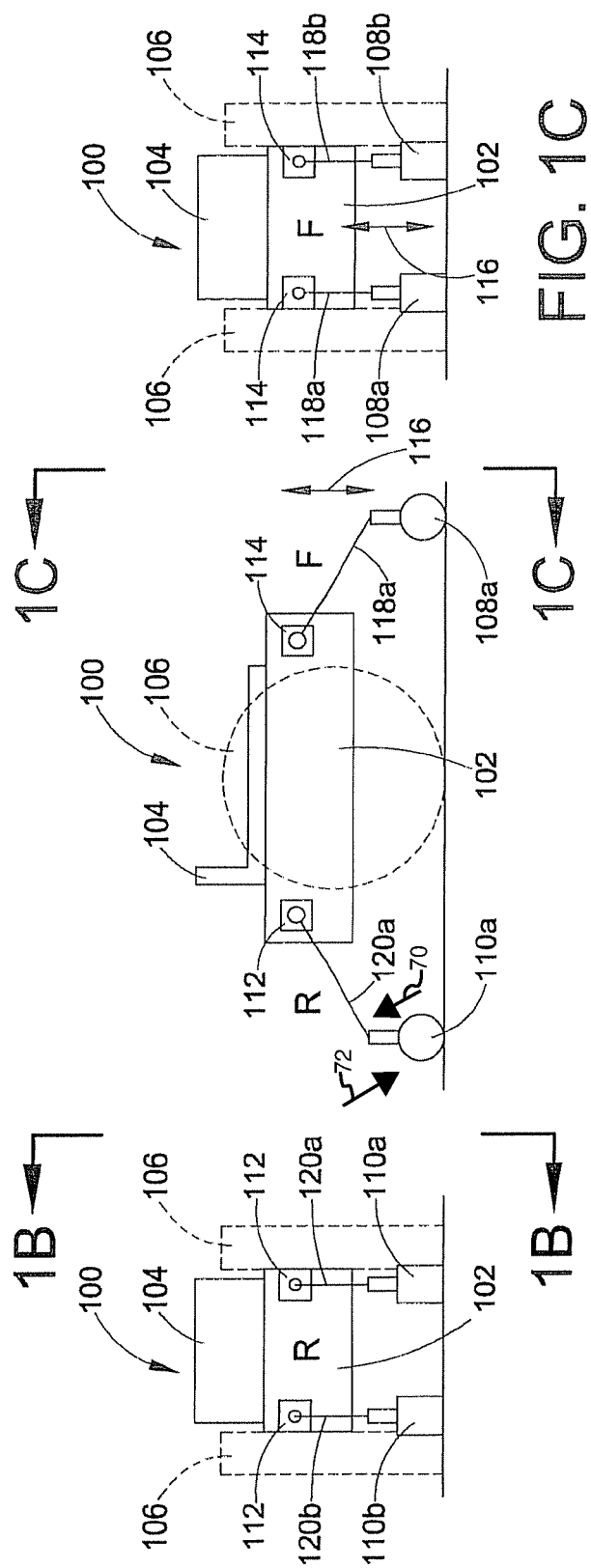
FIG. 1A is an illustration of a rear of an embodiment of a mid-wheel drive wheelchair.
FIG. 1B is a view taken along lines 1B-1B in FIG. 1A, illustrating a side of the mid-wheel drive wheelchair.
FIG. 1C is a view taken along lines 1C-1C in FIG. 1B, illustrating a front of the mid-wheel drive wheelchair.

The present description provides multiple embodiments of suspension systems for vehicles, such as, wheelchairs, including, but not limited to mid-wheel drive wheelchairs, scooters, and other personal mobility vehicles. The drawings illustrate the suspension systems on mid-wheel drive wheelchairs. However, the described suspensions can be implemented on any personal mobility vehicle, including scooters and rear drive wheelchairs.

The suspension systems include a tip or stability control system. Generally, the control system includes a trigger or sensor for sensing when conditions exist that may cause the vehicle to exhibit a tipping behavior, which can be either forward or rearward, and a stabilizing member or assembly that stabilizes the suspension system to prevent any further tipping behavior. The trigger or sensor also senses when the vehicle is no longer subject to conditions that may cause it to exhibit a tipping behavior and causes the stabilizing member or assembly to no longer inhibit movement of the suspension system. A variety of different control system features are disclosed in the context of the following exemplary embodiments. The individual features of the following embodiments may be used alone or in combination with features of other embodiments.

One feature of some control system embodiments disclosed herein is that upward movement of one front caster is inhibited to prevent tipping only if upward movement of the other front caster is also inhibited. Another feature of some control system embodiments disclosed herein is that the relative positions of two rear casters are sensed to determine a tipping behavior. For example, a tipping behavior may be indicated only when both rear casters move downward relative to a frame.

FIGS. 1A, 1B, and 1C schematically illustrate a mid-wheel drive wheelchair 100 that includes a tip or stability control system that comprises one or more sensors 112 and one or more stabilizing members or assemblies 114. The control system 100 can also be applied to a wide variety of other vehicles, including but not limited to, rear drive wheel chairs, front drive wheel chairs, scooters, and other personal mobility vehicles. The wheelchair 100 includes a frame 102, a seat 104 supported by the frame, first and second drive wheels 106 that support the frame, first and second front casters 108a, 108b, first and second rear casters 110a, 110b, one or more sensors 112, and one or more stabilizing members or assemblies 114. In this application, the term "frame" refers to any component or combination of components that are configured for mounting of a drive assembly and a caster pivot arm. The first and second front casters 108a, 108b are coupled to the frame 102 such that the front casters are moveable upwardly and downwardly with respect to the frame as indicated by double arrow 116. In the example illustrated by FIGS. 1A, 1B, and 1C, the front casters are independently coupled to the frame 102 by separate pivot arms 118a, 118b. In another embodiment, the pivot arms 118a, 118b are coupled such that movement of one pivot arm is transferred to the other pivot arm. For example, a torsion bar (not shown) may couple the pivot arms 108a, 108b. The first and second rear casters 110a, 110b are coupled to the frame 102 such that the rear casters are moveable upwardly and downwardly with respect to the frame. In the example illustrated by FIGS. 1A, 1B, and 1C, the rear casters are independently coupled to the frame 102 by separate rear caster pivot arms 120a, 120b. In another embodiment, the rear caster pivot arms 120a, 120b are coupled such that movement of one pivot arm is transferred to the other pivot arm (See the embodiment of FIG. 23 for example).

One stabilizing member 114 is coupled to each front caster pivot arms 118a, 118b and to the frame 102. However, any number of stabilizing members 114 can be used, may take any form, and may be coupled to the front caster pivot arm and the frame in any manner that allows the stabilizing member or members to inhibit movement of one or more of the front caster pivot arms with respect to the frame in at least one direction. Examples of stabilizing members that may be used include, but are not limited to, the stabilizing members disclosed herein and the locking members disclosed in U.S. Pat. No. 6,851,711 to Goertzen et al, United States Patent Application Publication No. 2004/0150204, and United States Patent Application Publication No. 2005/0151360 to Bertrand et al., which are all incorporated herein by reference in their entireties.

One trigger or sensor 112 is coupled to each of the rear caster pivot arms 120a,b in the example illustrated by FIGS. 1A, 1B, and 1C. However, any number of triggers or sensors 112 can be used, may take any form and may be positioned in any way that allows tipping of the frame 102 to be sensed. Examples of triggers or sensors that may be used include, but are not limited to, the triggers or sensors disclosed herein and the triggers or sensors disclosed in U.S. Pat. No. 6,851,711 to Goertzen et al, United States Patent Application Publication No. 2004/0150204, and United States Patent Application Publication No. 2005/0151360 to Bertrand et al. Tipping may be sensed in ways that are unrelated to movement of the rear casters relative to the frame. Examples of ways a tipping behavior may be sensed include, but are not limited to, the ways tipping is sensed in U.S. Pat. No. 6,851,711 to Goertzen et al, United States Patent Application Publication No. 2004/0150204, and United States Patent Application Publication No. 2005/0151360 to Bertrand et al.

Figure 2:
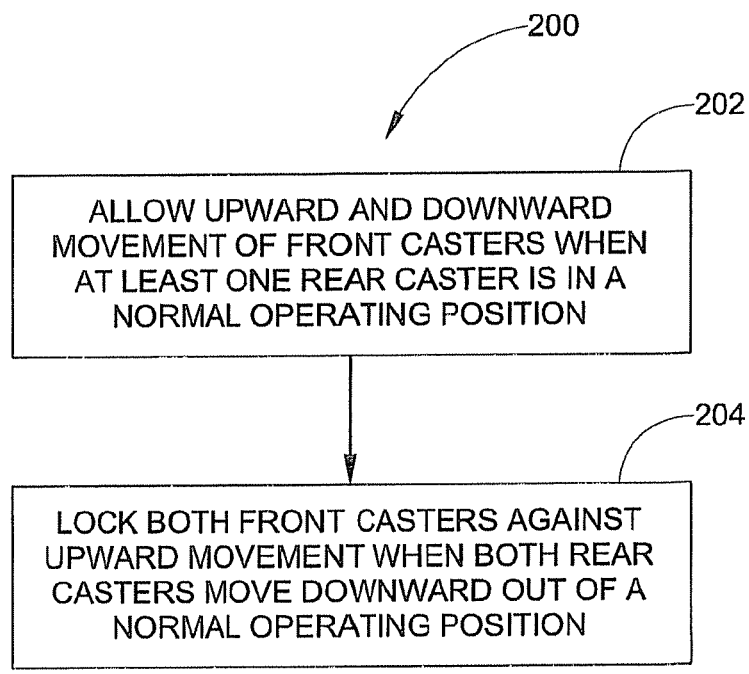
FIG. 2 is a flow chart that illustrates an embodiment of a method of controlling tipping of a mid-wheel drive wheelchair frame.

FIG. 2 is a flow chart that illustrates an embodiment of a method 200 of stabilizing a mid-wheel drive wheelchair frame. In the method, upward and downward movement of the front casters 108a, 108b is allowed (block 202) when at least one rear caster 110a, 110b is in a normal operating position. When both of the rear casters 110a, 110b move out of a normal operating position, the front casters 108a, 108b are locked (block 204) against at least upward movement relative to the frame. The front casters 108a, 108b may be locked against both upward and downward movement or only against upward movement.

Normal operating positions of the rear casters 110a and 110b include the positions of the rear casters when the wheelchair is stationary on level ground (referred to herein as the stationary, level ground position). Normal operating positions of the rear casters 110a and 110b also include any position of the rear casters relative to the frame where the rear caster(s) are rotated as indicated by arrow 70 in FIG. 1B. Normal operating positions of the rear casters 110a, 110b also include any positions where the rear caster(s) are rotated relative to the frame 102 as indicated by arrow 72 by less than a predetermined distance or angle below the stationary, level ground position. In the exemplary embodiment, the predetermined distance or angle from the stationary, level ground position in the direction indicated by arrow 72 corresponds to a distance or angle that is indicative of a tipping behavior of the wheelchair. For example, movement of the rear caster(s) relative to the frame in the direction indicated by arrow 72 that is greater than ½ inch may be indicative of tipping of the wheelchair and out of the normal operating position of the rear casters. However, the normal operating position of the rear casters 110a and 110b will vary from one wheelchair to another.

Figure 3:
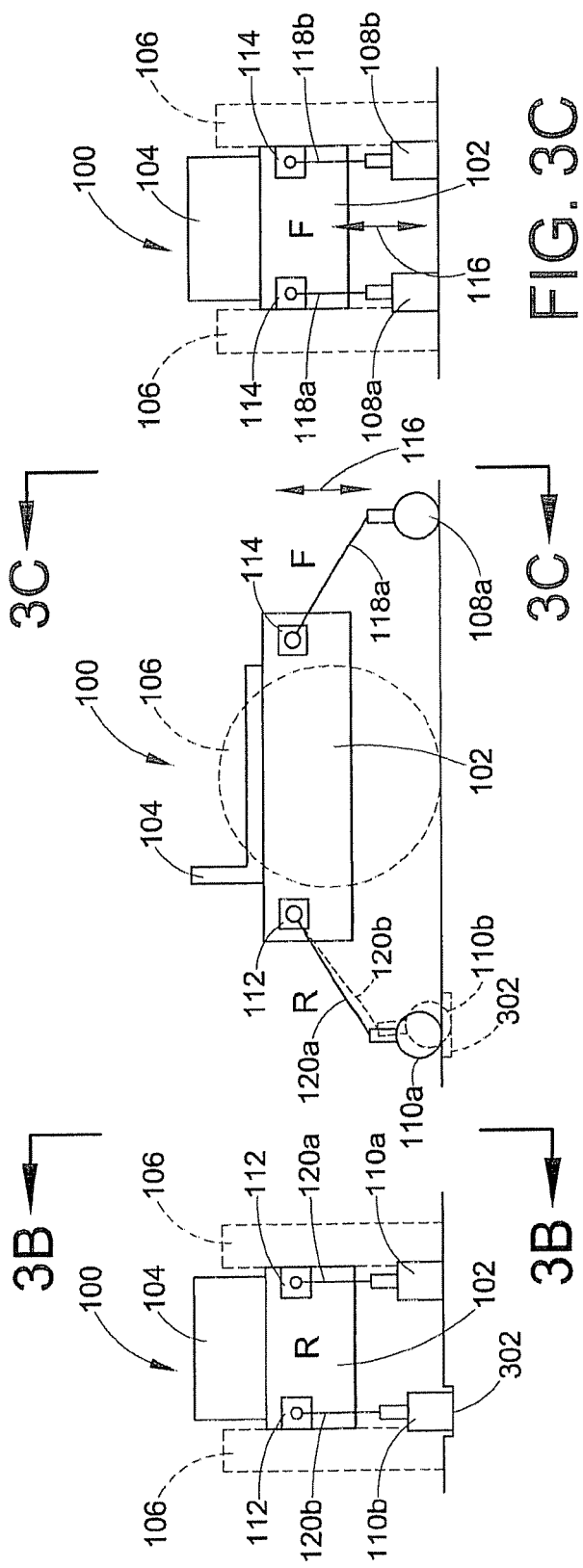
FIGS. 3A-3C illustrate the wheelchair of FIGS. 1A-1C, where one rear caster has moved downward relative to a frame.
Figure 4:
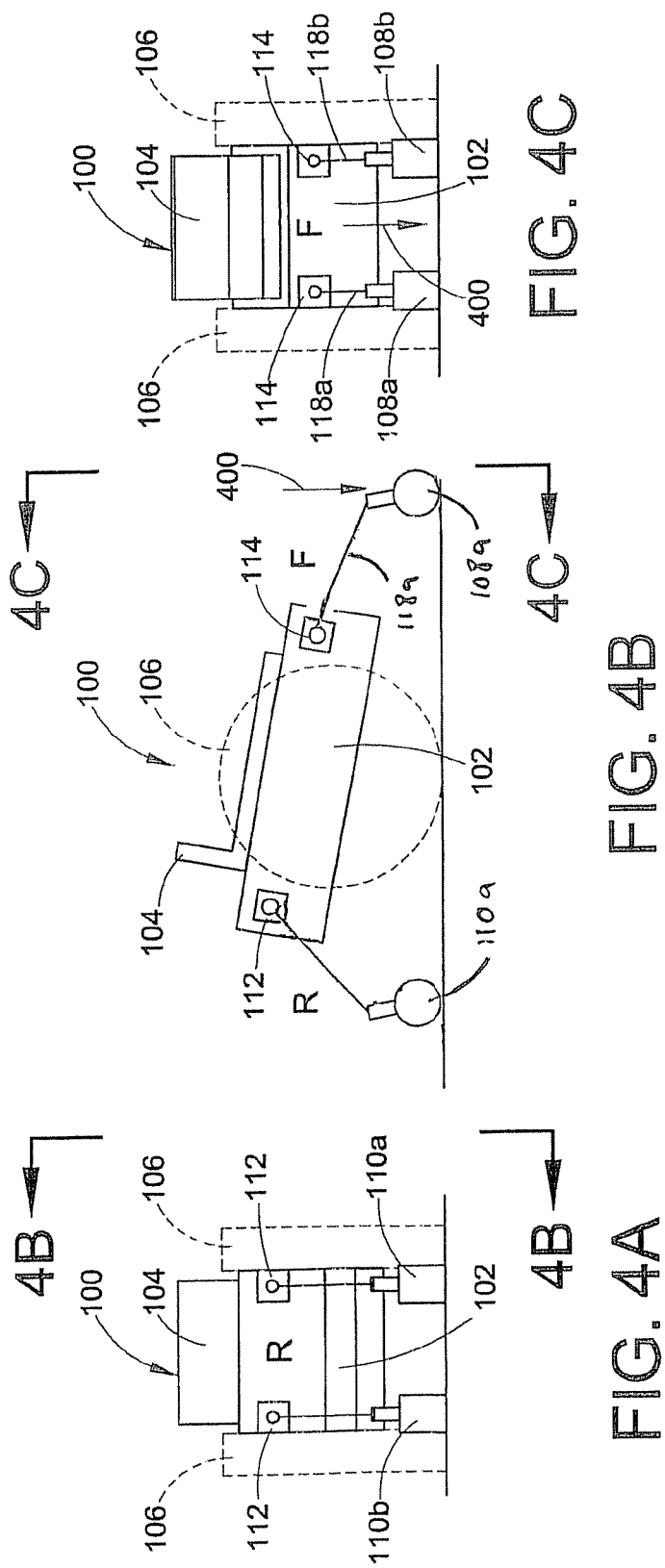
FIGS. 4A-4C illustrate the wheelchair of FIGS. 1A-1C, where the wheelchair is exhibiting a tipping behavior.

FIGS. 1, 3 and 4 illustrate a 100 wheelchair with a stabilizing assembly 114 that inhibits upward movement of the first and second front casters 108a, 108b with respect to the wheelchair frame 102 based on movement of first and second rear casters 110a, 110b with respect to the wheelchair frame. Referring to FIGS. 1A, 1B and 1C, the stabilizing assembly 114 allows upward and downward movement (as indicated by double arrow 116) of the first and second front casters 108a, 108b relative to the frame 102 when the first and second rear casters 110a, 110b are in normal operating positions relative to the frame.

FIGS. 3A, 3B, and 3C illustrate the wheelchair 100 where the rear caster 110a is in a normal operating position and the rear caster 110b has dropped below the range of normal operating positions. This condition may occur when one of the rear casters falls into a depression 302 as illustrated by FIGS. 3A, 3B, and 3C. This condition may also occur when the wheelchair travels laterally along an inclined surface. When the rear caster 110a is in a normal operating position and the rear caster 110b has dropped below the range of normal operating positions, both of the stabilizing members 114 continue to allow upward and downward movement of the first and second front casters 108a, 108b relative to the frame 102.

FIGS. 4A, 4B, and 4C illustrate the wheelchair 100 exhibiting a tipping behavior. The frame 102 of the wheelchair 100 is pitched forward toward the front casters 108a, 108b. As a result, the rear casters 110a, 110b move downward relative to the frame 102 to maintain contact with the ground. This downward movement positions both of the rear casters 110a, 110b below the range of normal operating positions relative to the frame 102. The sensors or triggers 112 sense that the rear casters 110a, 110b are both below the range of normal operating positions and cause the stabilizing members 114 to engage. In the example illustrated by FIGS. 4A, 4B and 4C, engagement of the stabilizing assemblies locks the first and second front casters 108a, 108b against upward movement relative to the frame, but allow the front casters to move downward as indicated by arrow 400 when the stabilizing assembly is engaged. In another embodiment, the stabilizing assembly 114 locks the front caster pivot arms against both upward and downward movement with respect to the pivot arm when engaged. In another embodiment, engagement of the stabilizing assemblies 114 greatly increase the amount of force required to move the front casters upward with respect to the frame. In another embodiment, engagement of the stabilizing assemblies 114 causes the stabilizing assemblies to apply additional force to move the front casters downward relative to the frame and return the frame to a normal operating position. When one or more of the rear casters return to a normal operating position relative to the frame, the sensors or triggers 112 disengage the stabilizing assembly to allow upward and downward movement of the first and second front casters relative to the frame.

Figure 5:
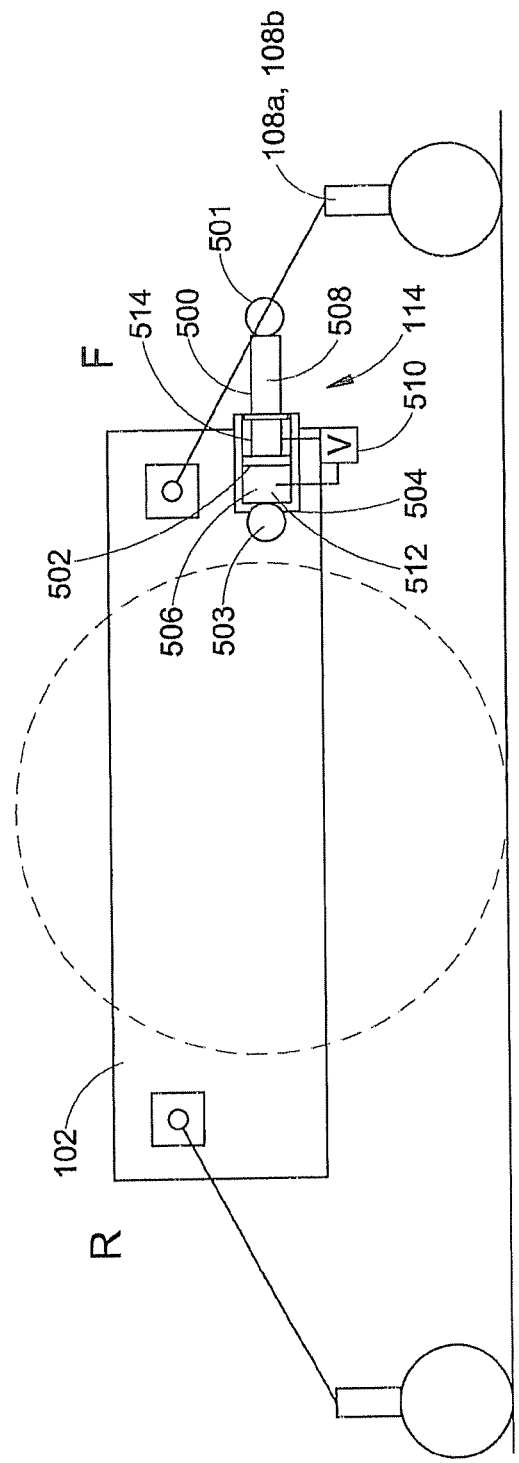
FIG. 5 is an illustration of an embodiment of a wheelchair with a fluid cylinder stabilizing assembly.

The stabilizing member, stabilizing members, or stabilizing assembly 114 or assemblies can take a wide variety of different forms. For example, the stabilizing assembly 114 may be a fluid cylinder 500 as illustrated by FIG. 5. One fluid cylinder 500 may be coupled between each front caster 108a, 108b at connection 501 and the frame 102 at connection 503, or a single fluid cylinder may be coupled between the front casters and the frame. As used herein, "coupled" refers to both direct coupling of two or more components or the indirect coupling of components such as through one or more intermediary components or structures. The fluid cylinder 500 includes a piston 502, a housing 504 that defines a piston chamber 506, a rod 508, and a valve 510. The rod 508 extends into the housing 504 and is connected to the piston. The piston 502 divides the chamber 506 into two compartments 512, 514. The valve 510 selectively allows fluid to flow between the two compartments when the valve is open and prevents flow between the two compartments when the valve is closed. As such, the rod 508 can move into and out of the housing 504 when the valve 510 is open and the position of the piston 502 and the rod is substantially fixed when the valve is closed. When the valve 510 is open, the movement of the fluid between the chambers 512, 514 and through the valve 510 provides a damping effect. As such, the cylinder 500 acts as a shock absorber when the valve is open and damps upward and downward movement of the front caster. In one embodiment, when the valve is "closed" fluid is allowed flow from the compartment 512 to the compartment 514, but not from the compartment 514 to the compartment 512. As such, the rod 508 may be moved into the housing 504, but not out the housing when the valve 510 is closed. When the valve 510 is closed, the cylinder 500 damps downward movement of the front caster and inhibits upward movement of the front caster. One acceptable fluid cylinder that may be used is model number Koa8kx-2-06-304/000N from Easylift.

FIG. 6 illustrates a cylinder 600 that is similar to the cylinder 500 illustrated in FIG. 5, but includes a spring 602 that biases or returns the rod 508 to a retracted position. In an embodiment where the valve prevents fluid flow between the compartments 512, 514 when the valve is closed, the actuator 600 biases the front caster toward contact with the ground only when the valve 510 is open. In an embodiment where the valve allows flow from the compartment 512 to the compartment 514, but not from the compartment 514 to the compartment 512 when the valve is closed, the actuator 600 biases the front caster toward contact with the ground when the valve 510 is open or closed. One acceptable fluid cylinder with a spring return that may be used is model number k0m2pm2-060-345-002/50N from Easylift.

The stabilizing cylinders 500, 600 illustrated by FIGS. 5 and 6 are two examples of the wide variety of different stabilizing assemblies 114 that can be used. Any arrangement capable of inhibiting upward and/or downward movement of a front caster relative to a frame can be used. As noted above, any of the arrangements for inhibiting movement of a front caster with respect to a frame disclosed in U.S. Pat. No. 6,851,711 to Goertzen et al., United States Patent Application Publication No.: 2004/0150204 to Goertzen et al., and United States Patent Application Publication No.: 2005/0151360 to Bertrand et al. can be used.

Figure 7C:
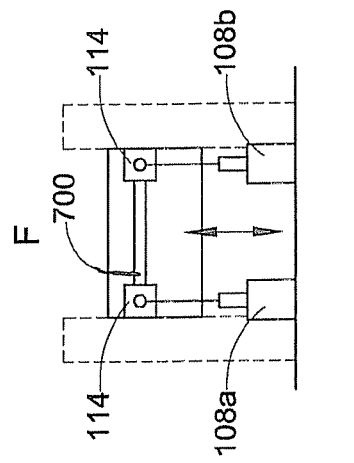
FIGS. 7A-7C illustrate an embodiment of a mid-wheel drive wheelchair that is similar to the wheelchair shown in FIGS. 1A-1C where two stabilizing members are linked.
Figure 7B:
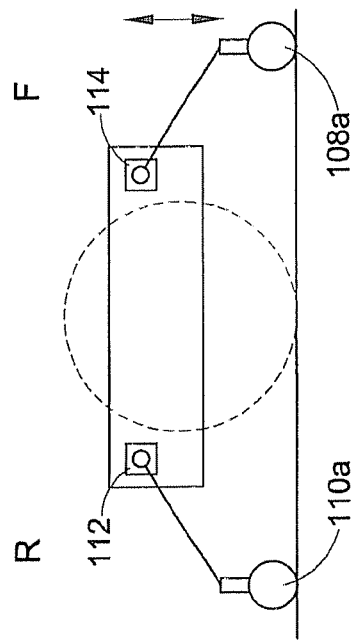
Figure 7A:
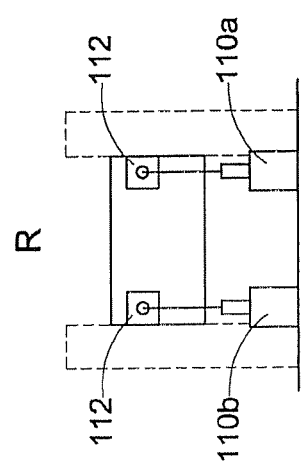

Stabilizing members or assemblies 114 and triggers or sensors 112 may be arranged in a wide variety of different ways to inhibit further tipping when both rear casters 110a, 110b drop below the range of normal operating positions. Referring to FIGS. 7A, 7B, and 7C a trigger or sensor 112 is coupled to each rear caster 110a, 110b. A stabilizing member or assembly 114 is coupled to each front caster 108a, 108b. The stabilizing assemblies 114 are linked by a coupling 700, such that each stabilizing member or assembly 114 will not engage unless the other stabilizing assembly also engages. The coupling 700 may take a wide variety of different forms. For example, the coupling 700 may be a mechanical linkage, and electronic linkage, an electromechanical linkage or a pneumatic or hydraulic linkage. The stabilizing members or assemblies 114 may be mechanically linked by wire, a rod or a clutch mechanism, electromechanically linked by a pair of solenoid actuators that are in electronic communication. When the stabilizing assemblies 114 are fluid actuators, the stabilizing assemblies may be pneumatically or hydraulically linked by conduits and valves that connect the chambers of the fluid actuators. For example, fluid devices from Easylift may be linked in this manner.

In the example illustrated by FIGS. 8A, 8B, and 8C a trigger or sensor 112 is coupled to each rear caster 110a, 110b and a single stabilizing assembly 114 is coupled to both of the front casters 108a, 108b. The stabilizing member or assembly 114 is in communication with both triggers or sensors 112, such that the stabilizing assembly 114 will not engage unless both of the triggers or sensors 112 sense a condition that indicates a tipping behavior of the frame 102, such as downward movement of both rear casters 110a, 110b relative to the frame 102. The single stabilizing assembly 114 may be arranged to permit independent upward and downward movement of the front casters 108a, 108b.

Figure 9C:
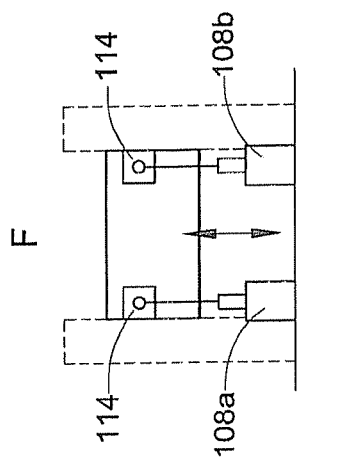
FIGS. 9A-9C illustrate an embodiment of a mid-wheel drive wheelchair that is similar to the wheelchair shown in FIGS. 1A-1C where two triggers or sensors are linked.
Figure 9B:
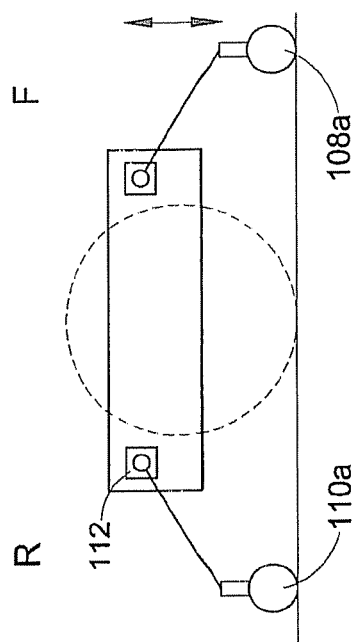
Figure 9A:
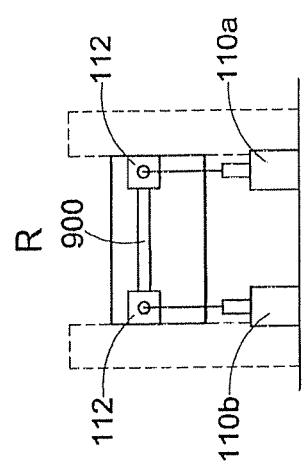

In the examples illustrated by FIGS. 9A, 9B and 9C, a trigger or sensor 112 is coupled to each rear caster 110a, 110b and a stabilizing assembly 114 is coupled to each front caster 108a, 108b. The triggers or sensors 112 are linked by a coupling 900, such that each sensor or trigger will not cause engagement of its respective stabilizing assembly 114 unless both of the sensors or triggers sense a tipping behavior of the wheelchair. The coupling 900 may take a wide variety of different forms. For example, the coupling 900 may be a mechanical linkage, and electronic linkage, an electromechanical linkage or a pneumatic or hydraulic linkage. The triggers or sensors 112 may be mechanically linked by wire or a rod, electromechanically linked by a pair of solenoid actuators that are in electronic communication, and/or pneumatically or hydraulically linked by a pair of fluid actuators that are in fluid communication.

Figure 10C:
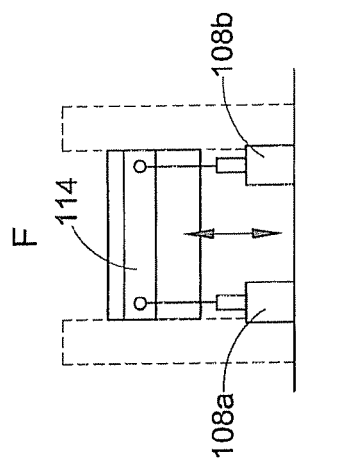
FIGS. 10A-10C illustrate an embodiment of a mid-wheel drive wheelchair that is similar to the wheelchair shown in FIGS. 1A-1C that includes a single trigger or sensor.
Figure 10B:
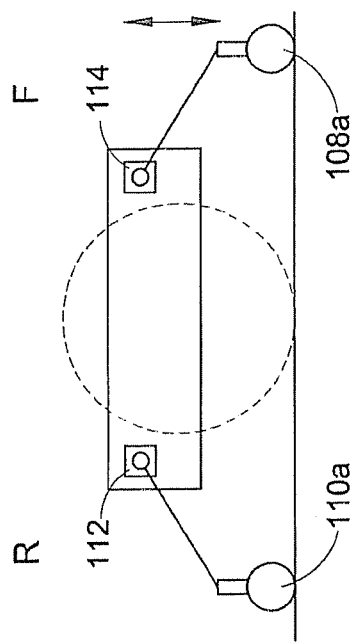
Figure 10A:
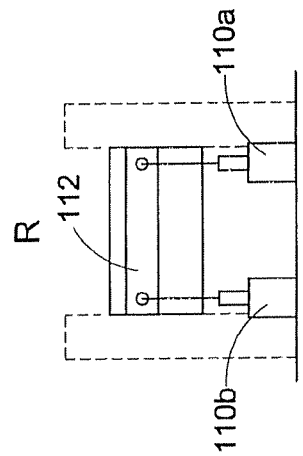

In the example illustrated by FIGS. 10A, 10B, and 10C a single trigger or sensor 112 is coupled to both rear casters 110a, 110 and a single stabilizing assembly 114 is coupled to both of the front casters 108a, 108b. The single stabilizing assembly 114 is controlled by the single trigger or sensor 112. In one embodiment, the single trigger or sensor 112 will not detect a tipping behavior unless both rear casters fall below their range of normal operating positions. The single trigger or sensor 112 causes the single stabilizing assembly 114 to engage when a tipping behavior is sensed. The single stabilizing assembly 114 may be arranged to permit independent upward and downward movement of the front casters 108a, 108b when disengaged and independent downward movement of the front casters when engaged.

FIGS. 11, 12 and 13 illustrate a wheelchair 1100 with a rear caster position sensing linkage 1101 that allows a single trigger or sensor 112 to determine when both of the rear casters 110a, 110b have dropped below their normal operating positions with respect to the frame 102. The linkage 1101 and sensor 112 can be used to control a pair of stabilizing members 114 as illustrated, or a single stabilizing member (see FIG. 10). The linkage 1101 is pivotally connected to the frame at pivot point 1102. The linkage 1101 includes a rear caster pivot arm sensing portion 1104 and a sensor activating portion 1106. The rear caster pivot arm sensing portion 1104 and a sensor activating portion 1106 are pivotable around the pivot point 1102. The sensing portion 1104 is in connection with the rear caster pivot arms 120a, 120b. The sensor activating portion 1106 is in communication with the trigger or sensor 112.

Referring to FIGS. 11A, 11B and 11C, when the first and second rear casters 108a, 108b are in normal operating positions, the first and second rear caster pivot arms 120a, 120b maintain the rear caster pivot arm sensing portion 1104 and the sensor activating portion 1106 in a first or disengaged position shown in FIGS. 11A, 11B, and 11C. When the sensor activating portion 1106 is in the first position, the sensor 112 controls the stabilizing assembly 114 to allow upward and downward movement (as indicated by double arrow 1116) of the first and second front casters 108a, 108b relative to the frame 102. In the example illustrated by FIGS. 11A, 11B, and 11C, the sensor activating portion 1106 is in engagement or close to the sensor in the first or disengaged position. In another embodiment, the sensor activating portion 1106 is spaced apart from the sensor in the first position or disengaged position.

Figures 12A, 12B, 12C:
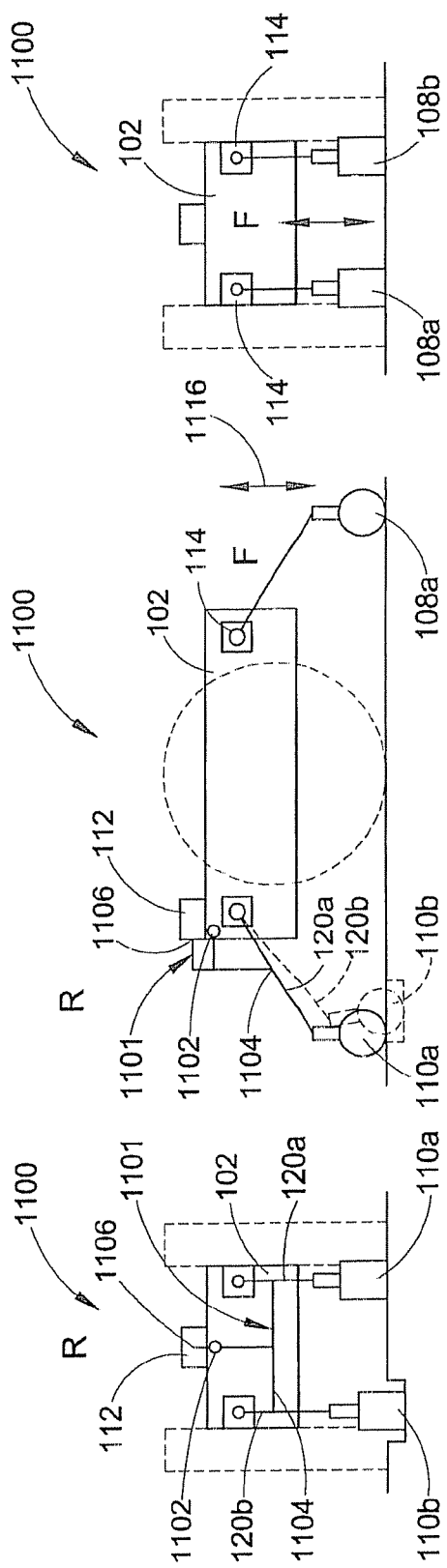
FIGS. 12A-12C illustrate the wheelchair of FIGS. 11A-11C, where one rear caster has moved downward relative to a frame.

FIGS. 12A, 12B, and 12C illustrate the wheelchair 1100 where the rear caster 110a is in a normal operating position and the rear caster 110b has dropped below the range of normal operating positions. When the rear caster 110a is in a normal operating position and the rear caster 110b has dropped below the range of normal operating positions, the first rear caster pivot arms 120a maintains the rear caster pivot arm sensing portion 1104 and the sensor activating portion 1106 in the first or disengaged position.

FIGS. 13A, 13B, and 13C illustrate the wheelchair 100 exhibiting a tipping behavior. The frame 102 of the wheelchair 100 is pitched forward toward the front casters 108a, 108b. As a result, the rear casters 110a, 110b move downward relative to the frame 102 to maintain contact with the ground. This downward movement positions both of the rear casters 110a, 110b below the range of normal operating positions with respect to the frame. When the first and second rear casters 108a, 108b fall below their ranges of normal operating positions, the rear caster pivot arm sensing portion 1104 and the sensor activating portion 1106 pivot to a second or engaged position shown in FIGS. 13A, 13B, and 13C. When the sensor activating portion 1106 is in the second or engaged position, the sensor 112 controls the stabilizing assembly 114 to inhibit at least upward movement of the first and second front casters 108a, 108b relative to the frame 102. In the example illustrated by FIGS. 13A, 13B, and 13C, the sensor activating portion 1106 is spaced apart from the sensor in the second or engaged position. In another embodiment, the sensor activating portion 1106 is in contact or close to the sensor in the second or engaged position. When one or more of the rear casters return to a normal operating position relative to the frame, the linkage 1101 is moved back to the disengaged position and the sensor or trigger 114 causes the stabilizing assembly to disengage and allow upward and downward movement of the front casters relative to the frame.

FIGS. 14, 15 and 16 illustrate a wheelchair 1400 with a rear caster position sensing linkage 1401 that actuates a pair of triggers or sensors 112 when both of the rear casters 110a, 110b have dropped below their normal operating positions with respect to the frame 102 and does not actuate either of the triggers or sensors 112 when one or more of the rear casters 110a, 110b are in their normal operating position with respect to the frame 102. The linkage 1401 and sensors 112 can be used to control a pair of stabilizing members 114 as illustrated, or a single stabilizing member (see FIG. 8). The linkage 1401 is pivotally connected to the frame at pivot point 1402. The linkage 1401 includes a rear caster pivot arm sensing portion 1404 and a sensor activating portion 1406. The rear caster pivot arm sensing portion 1404 and a sensor activating portion 1406 are pivotable around the pivot point 1402. The sensing portion 1404 is coupled to the rear caster pivot arms 120a, 120b. The sensor activating portion 1406 is in communication with both of the triggers or sensors 112.

Referring to FIGS. 14A, 14B and 14C, when the first and second rear casters 108a, 108b are in normal operating positions, the first and second rear caster pivot arms 120a, 120b maintain the rear caster pivot arm sensing portion 1404 and the sensor activating portion 1406 in a first or engaged position shown in FIGS. 14A, 14B, and 14C. When the sensor activating portion 1406 is in the first position, the sensor activating portion 1406 maintains both sensors 112 in a first state. In the first state, the two sensors 112 control the stabilizing assemblies 114 to allow upward and downward movement (as indicated by double arrow 1416) of the first and second front casters 108a, 108b relative to the frame 102.

Figure 15C:
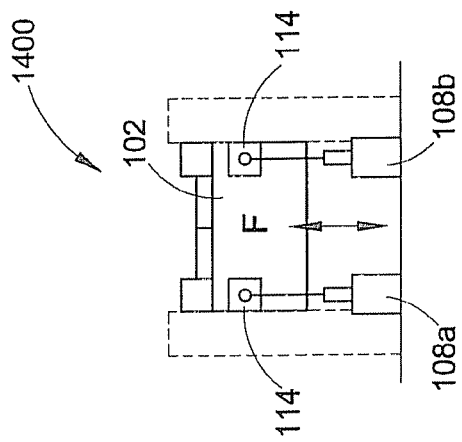
FIGS. 15A-15C illustrate the wheelchair of FIGS. 14A-14C, where one rear caster has moved downward relative to a frame.
Figure 15B:
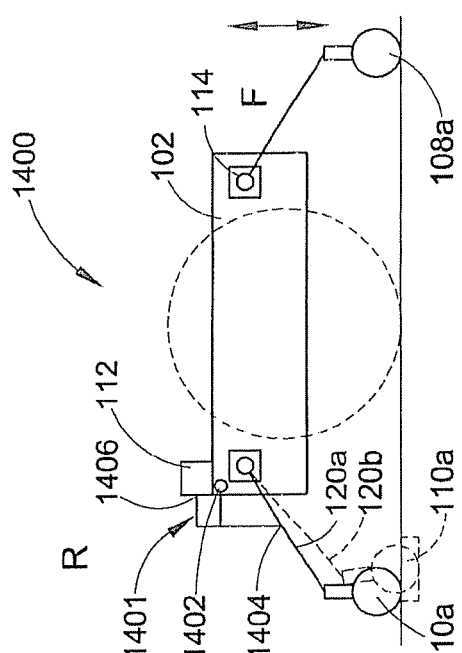
Figure 15A:
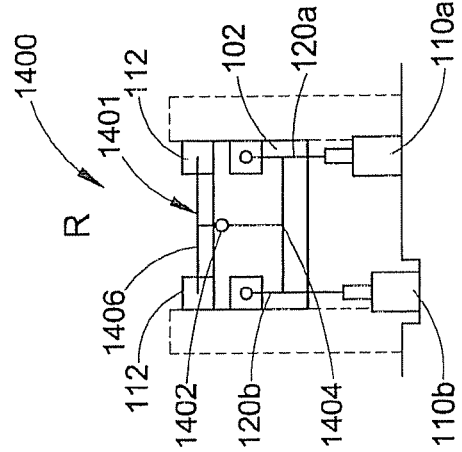

FIGS. 15A, 15B, and 15C illustrate the wheelchair 1400 where the rear caster 110a is in a normal operating position and the rear caster 110b has dropped below the range of normal operating positions. When the rear caster 110a is in a normal operating position and the rear caster 110b has dropped below the range of normal operating positions, the first rear caster pivot arm 120a maintains the rear caster pivot arm sensing portion 1404 and the sensor activating portion 1106 in the first or disengaged position.

FIGS. 16A, 16B, and 16C illustrate the wheelchair 1400 exhibiting a tipping behavior. The rear casters 110a, 110b move downward, below the range of normal operating positions relative to the frame. When the first and second rear casters 108a, 108b fall below their ranges of normal operating positions, the rear caster pivot arm sensing portion 1404 and the sensor activating portion 1406 move to a second or engaged position shown in FIGS. 16A, 16B, and 16C. When the sensor activating portion 1406 is in the second or engaged position, the sensor activating portion 1406 places both sensors 112 in a second state. In the second state, the sensors 112 control the stabilizing assemblies 114 to inhibit at least upward movement of the first and second front casters 108a, 108b relative to the frame 102. When one or more of the rear casters return to a normal operating position relative to the frame, the linkage 1401 is moved back to the disengaged position and both sensors or triggers 114 cause the stabilizing assemblies 114 to disengage and allow upward and downward movement of the front casters relative to the frame.

FIGS. 17, 18 and 19 illustrate an embodiment of a rear caster suspension 1700 with a rear caster position sensing arrangement 1706. The rear caster suspension 1700 includes a pair of rear caster assemblies 1702a, 1702b, a pair of sensors or triggers 1704a, 1704b, the rear caster position sensing arrangement 1706, and a pair of biasing members 1708a, 1708b, such as springs or other resilient members. The rear caster position sensing arrangement 1706 is in communication with both rear caster assemblies 1702a, 1702b. When one or both of the rear casters 1702a, 1702b are in a normal operating position, the rear caster position sensing arrangement communicates this condition to both sensors or triggers 1704a, 1704b. When both of the rear casters 1704a, 1704b fall below their normal operating positions, the rear castor position sensing arrangement communicates this condition to both sensors or triggers 104a and 104b. As a result, both sensors or triggers 1704a, 1704b are placed in an engaged state when both rear casters 1702a, 1702b fall below their normal operating positions and both sensors or triggers 1704a, 1704b are placed in a disengaged state when one or both of the rear casters are in a normal operating position. The conditions of the rear casters can be communicated by the rear caster position sensing arrangement in a wide variety of different ways. For example, the rear caster position sensing arrangement may be a mechanical linkage or assembly that communicates the condition of the rear casters to the sensors, as illustrated by FIGS. 17A-17C.

In the example illustrated by FIGS. 17, 18 and 19, compression springs are schematically represented. However, extension springs can be used, or the biasing members can take some other form. Each rear caster assembly 1702 includes a caster 1710 and a pivot arm 1712. The castor 1710 is rotatable about an axis 1714 with respect to the pivot arm 1712. The pivot arms 1712 are coupled to a wheelchair frame 1701 (See FIG. 17B) at pivots 1716a, 1716b. The sensors or triggers 1704a, 1704b are supported by the wheelchair frame 1701.

The illustrated rear caster position sensing arrangement 1706 includes a pair of spaced apart trigger actuating members 1720a, 1720b that are coupled to the wheelchair frame 1701 at pivots 1722a, 1722b. The trigger actuating members 1720a, 1720b are connected together by a bar 1724. The biasing members 1708a, 1708b are interposed between the rear caster assemblies 1702a, 1702b and the trigger actuating members 1720a, 1720b.

The rear caster suspension 1700 and rear caster position sensing arrangement 1706 can be included on any type of wheelchair to sense a tipping behavior and control one or more stabilizing members or a stabilizing assembly to inhibit further tipping. Referring to FIGS. 17A, 17B and 17C, when the rear caster assemblies 1702a, 1702b are in normal operating positions relative to the frame, 1701, the biasing members 1708a, 1708b are compressed between the trigger actuating members 1720a, 1720b and the rear caster pivot arms 1712a, 1712b. The biasing members 1708a, 1708b force the trigger actuating members 1708a, 1708b into engagement with the sensors or triggers 1704a, 1704b to place both of the sensors in a depressed or disengaged state.

FIGS. 18A and 18B illustrate the rear caster suspension 1700 and rear caster position sensing arrangement 1706 where the rear caster assembly 1702b is in a normal operating position and the rear caster assembly 1702a has dropped below the range of normal operating positions. This condition may occur when the wheelchair travels laterally along an inclined surface 1800. This condition may also occur when one of the rear casters falls into a depression (see FIGS. 3A, 3B, and 3C). When the rear caster assembly 1702b is in a normal operating position and the rear caster assembly 1702a has dropped below the range of normal operating positions, the biasing member 1708b remains compressed between the trigger actuating member 1720b and the rear caster pivot arms 1712b, while the biasing member 1708a extends to a relaxed state (See FIG. 18B). The biasing member 1708b forces the trigger actuating member 1720b into engagement with the sensor or trigger 1704b. The bar 1724 that connects the trigger actuating member 1720a to the trigger actuating member 1720b holds the trigger actuating member 1720a in engagement with the sensor or trigger 1704a. The trigger actuating members 1720a, 1720b place both of the sensors in a depressed or disengaged state when the rear casters are in the positions shown in FIGS. 18A and 18B.

Figure 19B:
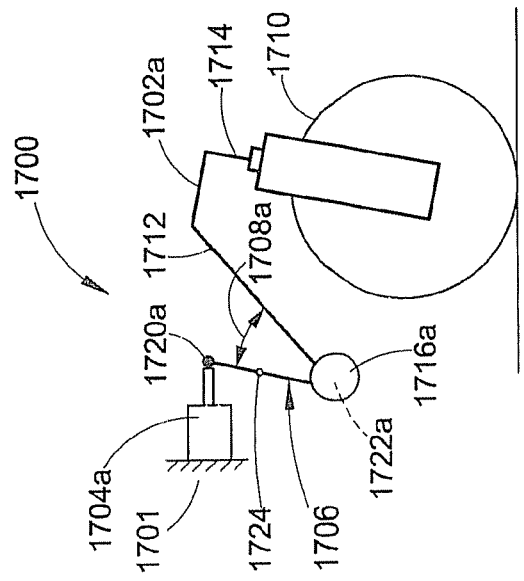
FIGS. 19A and 19B illustrate the rear caster suspension and rear caster position sensing arrangement of FIGS. 17A-17C, where both rear casters have moved downward.
Figure 19A:
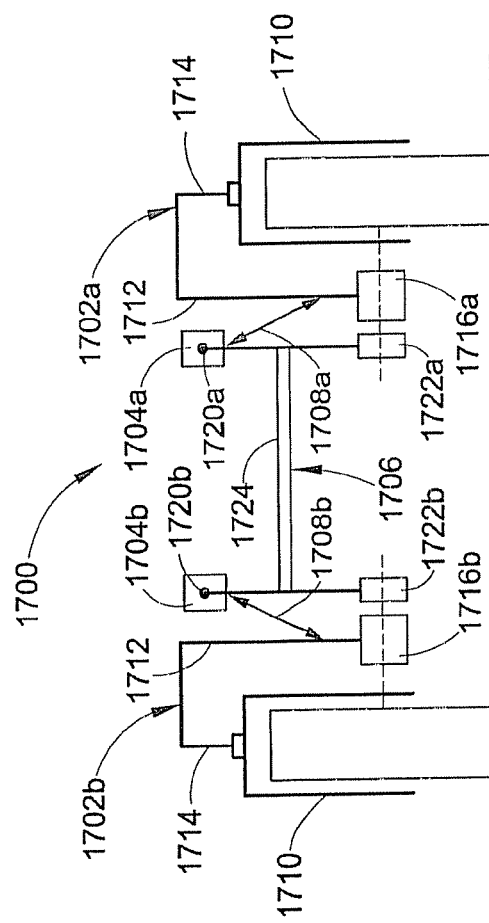

FIGS. 19A and 19B illustrate the rear caster suspension 1700 and rear caster position sensing arrangement 1706 where the rear caster assemblies 1702a, 1702 have both dropped below the range of normal operating positions. This condition may occur when the wheelchair exhibits a tipping behavior. When both of the rear caster assemblies 1702a, 1702b have dropped below the range of normal operating positions, the biasing members 1708a, 1708b both extend to a relaxed state and may pull the trigger actuating members 1708a, 1708b out of engagement with the sensors or triggers 1704a, 1704b to place the sensors or triggers in an engaged state. When one or more of the caster assemblies 1702a, 1702b return to a normal operating position with respect to the frame 1701, both sensors or triggers are returned to the disengaged state.

FIGS. 20, 21 and 22 illustrate an embodiment of a rear caster suspension 2000 and rear caster position sensing arrangement 2006 where movement of one caster assembly 2002a is limited, depending on the position of the second caster assembly 2002b. The rear caster suspension includes a pair of rear caster assemblies 2002a, 2002b, a pair of sensors or triggers 2004a, 2004b, the rear caster position sensing arrangement 2006, and a pair of biasing members 2008a, 2008b, such as springs or other resilient members. In the example illustrated by FIGS. 20, 21 and 22, compression springs are schematically represented. However, extension springs can be used, or the biasing members can take some other form. Each rear caster assembly 2002 includes a caster 2010, a pivot arm 2012a, 2012b, and a stop member 2013a, 2013b attached to the pivot arm. The pivot arms 2012 are coupled to a wheelchair frame 2001 at pivots 2016a, 2016b (See FIG. 20B). The stop members 2013a, 2013b rotate with the pivot arms 2012a, 2012b about the pivots 2016a, 2016b. The sensors or triggers 2004a, 2004b are supported by the wheelchair frame 2001.

The illustrated rear caster position sensing arrangement 2006 includes a pair of spaced apart trigger actuating members 2020a, 2020b that are coupled to the wheelchair frame 2001 at pivots 2022a, 2022b. The elongated members 2020a, 2020b are connected together by a bar 2024. The bar 2024 extends past the pivots 2022a, 2022b for selective engagement with the stop members 2013a, 2013b. The biasing members 2008a, 2008b are interposed between the rear caster assemblies 2002a, 2002b and the trigger actuating members 2020a, 2020b.

The rear caster suspension 2000 and rear caster position sensing arrangement 2006 operate to place the sensors in the disengaged and engaged states based on the positions of the rear caster assemblies 2002a, 2002b. The rear caster suspension 2000 and rear caster position sensing arrangement 2006 limit the relative positions of the rear caster assemblies 2002a, 2002b. In one embodiment, the suspension arrangement 2000 does not include a rear caster position sensing arrangement, and the sensors 2004a, 2004b are omitted. In this embodiment, the elongated members 2020a, 2020b may be modified accordingly or replaced with a different arrangement for coupling the biasing members 2008a, 2008b to the bar 2024.

Referring to FIGS. 20A, 20B and 20C, when one or both of the rear caster assemblies 2002a, 2002b are in normal operating positions relative to the frame 2001, the biasing members 2008a, 2008b hold the trigger actuating members 2020a, 2020b against the sensors or triggers 2004a, 2004b (or some other stop if the sensors are omitted). The trigger actuating members 2020a, 2020b position the bar 2024 with respect to the stop members 2013. As long as the force applied by one or more of the biasing members 2008a, 2008b is sufficient to maintain the trigger actuating members 2020a, 2020b against the sensors or triggers 2004a, 2004b, the position of the bar 2024 is fixed. When there is a gap 2025 (FIG. 20B) between the bar 2024 and the stop members 2013a, 2013b, the caster assemblies 2002 are free to move upwardly and downwardly with respect to one another.

FIGS. 21A and 21B illustrate the situation where the rear caster assembly 2002b drops, such that the stop member 2013b rotates into contact with the bar 2024. When the stop member 2013b engages the bar 2024, further movement of the rear caster assembly 2002b is inhibited by the bar. Referring to FIGS. 22A and 22B, the bar 2024 prevents the caster assembly 2002a from falling into a deep depression. The rear caster assembly 2002a can be moved downward by applying a downward force indicated by arrow 2050 in FIGS. 22A and 22B. The force is applied by the stop member 2013b, to the bar 2024, and to the trigger actuating member 2020b. If the force applied to trigger actuating member 2020a is sufficient to compress the biasing member 2008b, the trigger actuating member 2020b moves toward the rear caster pivot arm 2012b. As a result, the elongated members 2020a, 2020b may move away from the triggers or sensors 2004a, 2004b. When both rear casters 1010 fall away from the frame 2001, the sensors 2004a, 2004b are placed in the engaged state in the same manner as described with respect to the rear caster suspension and trigger arrangement 1700. When one or both of the rear casters are in a normal operating position, the sensors 2004a, 2004b are placed in a disengaged state in the same manner as described with respect to the rear caster suspension and trigger arrangement 1700.

FIGS. 23 and 24 illustrate another embodiment of a rear caster suspension 2300 with a rear caster position sensing arrangement 2306. The rear caster suspension includes a rear caster assembly 2302, a pair of sensors or triggers 2304a, 2304b, the rear caster position sensing arrangement 2306, and a biasing member 2308, such as a spring. In the example illustrated by FIGS. 23 and 24, a compression spring is schematically represented. However, an extension spring can be used, or the biasing member can take some other form.

The rear caster assembly 2302 includes a pair of casters 2310a, 2310b and a pivot arm 2312. The pivot arm 2312 includes a first member 2313 coupled to a wheelchair frame 2301 at a pivot 2316 (See FIG. 23B) and a second member 2315 connected to the first member 2313, such that the pivot arm 2312 has a generally "T-shaped" configuration. The castors 2310a, 2310b are connected to ends of the second member 2315 and are rotatable with respect to the pivot arm 2312.

The sensors or triggers 2304a, 2304b are supported by the wheelchair frame 2301. The illustrated rear caster position sensing arrangement 2306 includes a pair of spaced apart elongated members 2319a, 2319b (See FIG. 23A) that support a trigger actuating member 2320 and are coupled to the wheelchair frame 2301 at pivots 2322a, 2322b. The rear caster position sensing arrangement 2306 could also be configured to include only one member (or any other number of members) member that supports the rear caster position sensing arrangement 2306. The biasing member 2308 is interposed between the rear caster assembly 2302 and the trigger actuating member 2320.

The rear caster suspension 2300 with the rear caster position sensing arrangement 2306 can be included on any type of wheelchair to sense a tipping behavior and control one or more stabilizing members or stabilizing assemblies. Referring to FIGS. 23A, 23B and 23C, when the rear caster assembly 2302 is in a normal operating position relative to the frame 2301, the biasing member 2308 is compressed between the trigger actuating member 2320 and the rear caster pivot arm 2312. The biasing members 2308 force the trigger actuating member 2308 into engagement with both of the sensors or triggers 2304a, 2304b to place both of the sensors in a depressed or disengaged state.

FIGS. 24A, 24B and 24C illustrate the rear caster suspension 2300 and the rear caster position sensing arrangement 2306 where one of the rear casters 2310a of the rear caster assembly 2302a encounters a depression in the support surface. Since both rear casters 2310a, 2310b are coupled to a common pivot arm, the rear caster 2310a does not drop into the depression. The biasing member 2308 remains compressed between the trigger actuating member 2320 and the rear caster pivot arms 2312a. The biasing member 2308 forces the trigger actuating member 1708 into engagement with the sensors or triggers 2304a, 2304b. When the rear caster assembly 2302 drops below the range of normal operating positions, the biasing member 2308 extends to a relaxed state and may pull the trigger actuating member 2308 out of engagement with the sensors or triggers 1704a, 1704b to place the sensors or triggers in an engaged state.

FIGS. 25A, 25B and 25C illustrate a rear caster suspension 2500 that is a variation of the rear caster suspension 2300 where the second member 2315 of the pivot arm is pivotally connected to the first member 2313 by a pivotal connection 2500. The pivotal connection allows the ends of the second member 2315 and the attached rear casters 2310a, 2310b to move upward and downward with respect to one another. When one rear caster 2310a moves down, the other rear caster 2310b moves up.

Stability systems can be used on a wide variety of vehicles. When used on wheelchairs, the wheelchairs may include front caster pivot arms of any configuration. The front caster pivot arms may be coupled to drive assemblies or the front caster pivot arms may be independent of the drive assemblies (See FIGS. 1A, 1B, 1C). The front caster pivot arms can be coupled to the drive assemblies in a wide variety of different ways. For example, the front caster pivot arms can be coupled to the drive assembly in any manner that transfers motion of the drive assembly to the front caster pivot arm, including but not limited to, a fixed length link, a variable length link, a flexible link, a chain, a cord, a belt, a wire, a gear train, or any other known structure for transferring motion from one structure to another structure. FIGS. 26-31 illustrate one side of wheelchairs with stability systems and pivot arms that are coupled to a drive assembly. The other side is a mirror image in the exemplary embodiment and is therefore not described in detail.

Figure 26:
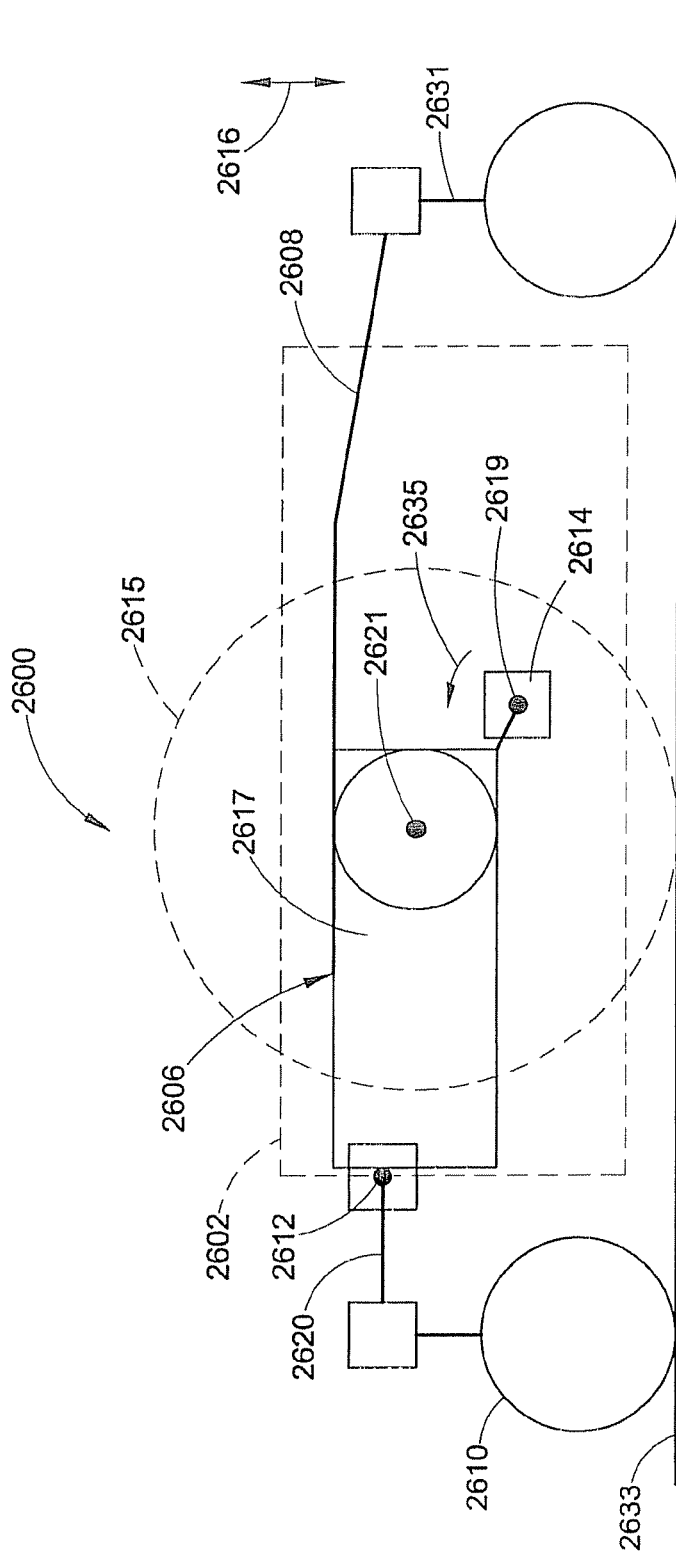
FIG. 26 illustrates an embodiment of a mid-wheel drive wheelchair that includes a tip or stability control system and front caster pivot arm that are coupled to drive assemblies.

FIG. 26 schematically illustrates a mid-wheel drive wheelchair 2600 that includes a tip or stability control system that comprises at least one tip sensor or trigger 2612 and at least one stabilizing member or assembly 2614. The wheelchair 2600 includes front caster pivot arms 2608 that are coupled to drive assemblies 2606. Each drive assembly 2606 includes a drive wheel 2615 and a motor or drive 2617 that propels the drive wheel 2615. The drive 2617 may comprise a motor/gear box combination, a brushless, gearless motor, or any other known arrangement for driving the drive wheel 2615. The drive assembly 2606 is connected to the frame 2602 at a pivotal connection 2619. In the example illustrated by FIG. 26, the pivotal connection 2619 is disposed below a drive axis 2621 of the drive wheel 2615 when the wheelchair 2600 is resting on flat, level ground.

A front caster pivot arm 2608 is connected to each drive assembly 2606. A front caster 2631 is coupled to each front caster pivot arm 2608. The front caster 2631 is movable upwardly and downwardly as indicated by double arrow 2616 by pivotal movement of the drive 2617 about the pivotal connection 2619. Torque applied by the drive assembly 2606 urges the front caster pivot arm 2608 and the front caster 2631 upward with respect to a support surface 2633 as indicated by arrow 2635. In one embodiment, the torque applied by the drive assembly 2606 lifts the front caster 2631 off the support surface 2633. In another embodiment, the torque applied by the drive assembly 2606 urges the front caster 2631 upward, but does not lift the front caster up off of the support surface.

Rear casters 2610 are coupled to the frame 2602 such that the rear casters are moveable upwardly and downwardly with respect to the frame. A stabilizing assembly 2614 is coupled to each front caster pivot arm 2618 and to the frame 2602. However, the stabilizing assembly can take any form that allows the stabilizing assembly to inhibit tipping behavior. One or more triggers or sensors 2612 may be coupled to rear caster pivot arms 2620 to detect a tipping behavior of the wheelchair. However, a trigger or sensor can be arranged in any manner to detect a tipping behavior of the wheelchair and need not be coupled to a rear caster. The trigger or sensor 2612 senses when conditions exist that may cause the vehicle to exhibit a tipping behavior and causes the locking assembly 2614 to engage when a tipping behavior is sensed to prevent any further tipping behavior.

Figure 27:
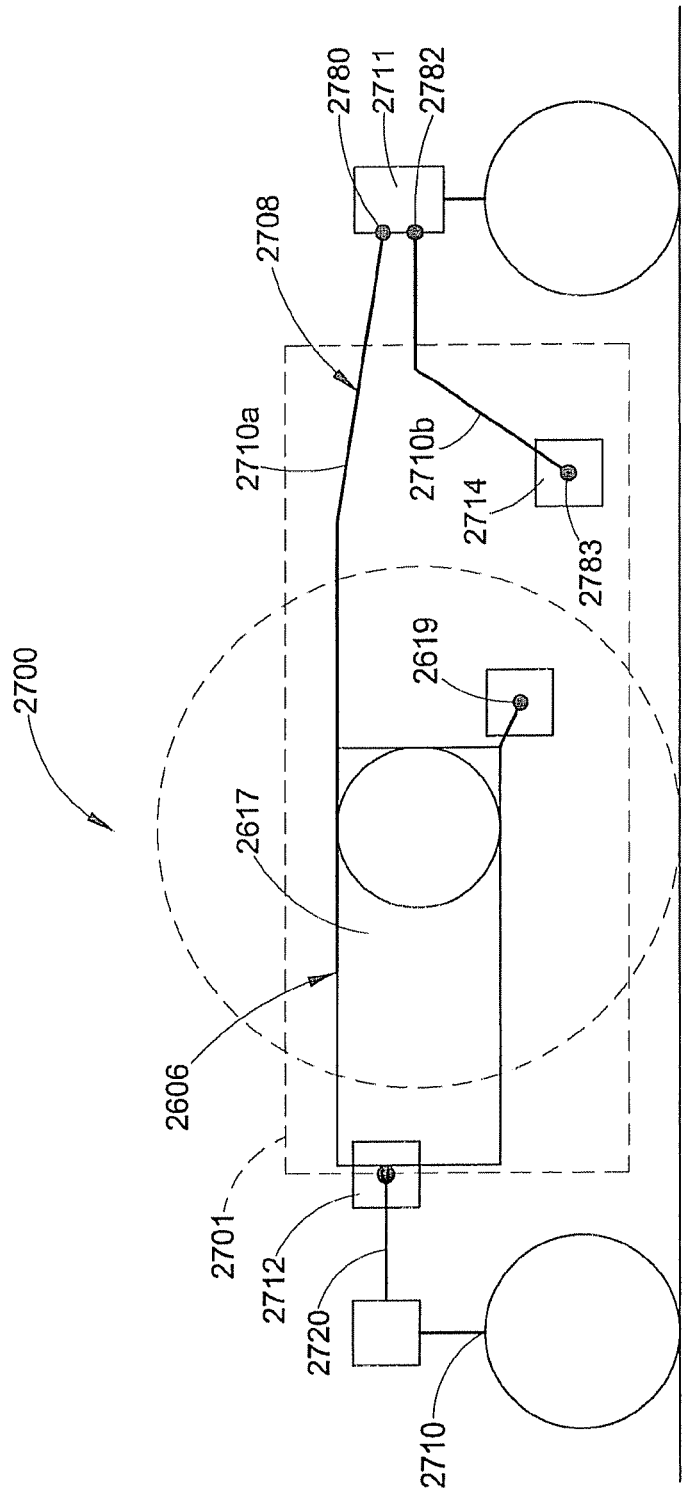
FIG. 27 illustrates an embodiment of a mid-wheel drive wheelchair that includes a tip or stability control system and front caster pivot arms that are coupled to drive assemblies.

FIG. 27 schematically illustrates a mid-wheel drive wheelchair 2700 that includes a tip or stability control system that comprises at least one tip sensor or trigger 2712 and at least one stabilizing member or assembly. The wheelchair 2700 is similar to the wheelchair 2600 of FIG. 26, but each front caster pivot arm 2708 includes upper and lower links 2710a, 2710b that define a four bar linkage. The upper link 2710a is pivotally coupled to a caster support member 2711 at a pivotal connection 2780 and is fixedly connected to the drive 2617. The lower link 2710b is pivotally coupled to the caster support member 2711 at a pivotal connection 2782 and is pivotally connected to the frame 2701 at a pivotal connection 2783.

The drive 2617, the links 2710a, 2710b, the frame 2701, and the caster support member 2711 form a four-bar linkage. The pivotal connections 2619, 2780, 2782, 2783 can be positioned at a wide variety of different locations on the frame 2701 and the caster support member 2711 and the length of the links 2706 can be selected to define the motion of the front caster as the front caster pivot arm 2708 is pivoted.

The rear casters 2710 are coupled to the frame 2701 such that the rear casters are moveable upwardly and downwardly with respect to the frame. A stabilizing assembly 2714 is coupled to each front caster pivot arm 2718 and to the frame 2702. However, the stabilizing assembly can take any form and be coupled in any manner that allows the stabilizing assembly to inhibit tipping behavior. For example, a stabilizing assembly 2714 can be coupled to the drive 2617. One or more triggers or sensors 2712 are coupled to the rear caster pivot arms 2720 to detect a tipping behavior of the wheelchair. However, a trigger or sensor can be arranged in any manner to detect a tipping behavior of the wheelchair and need not be coupled to a rear caster. The trigger or sensor 2712 senses when conditions exist that may cause the vehicle to exhibit a tipping behavior and causes the locking assembly 2714 to engage when a tipping behavior is sensed to prevent any further tipping behavior.

Figure 28:
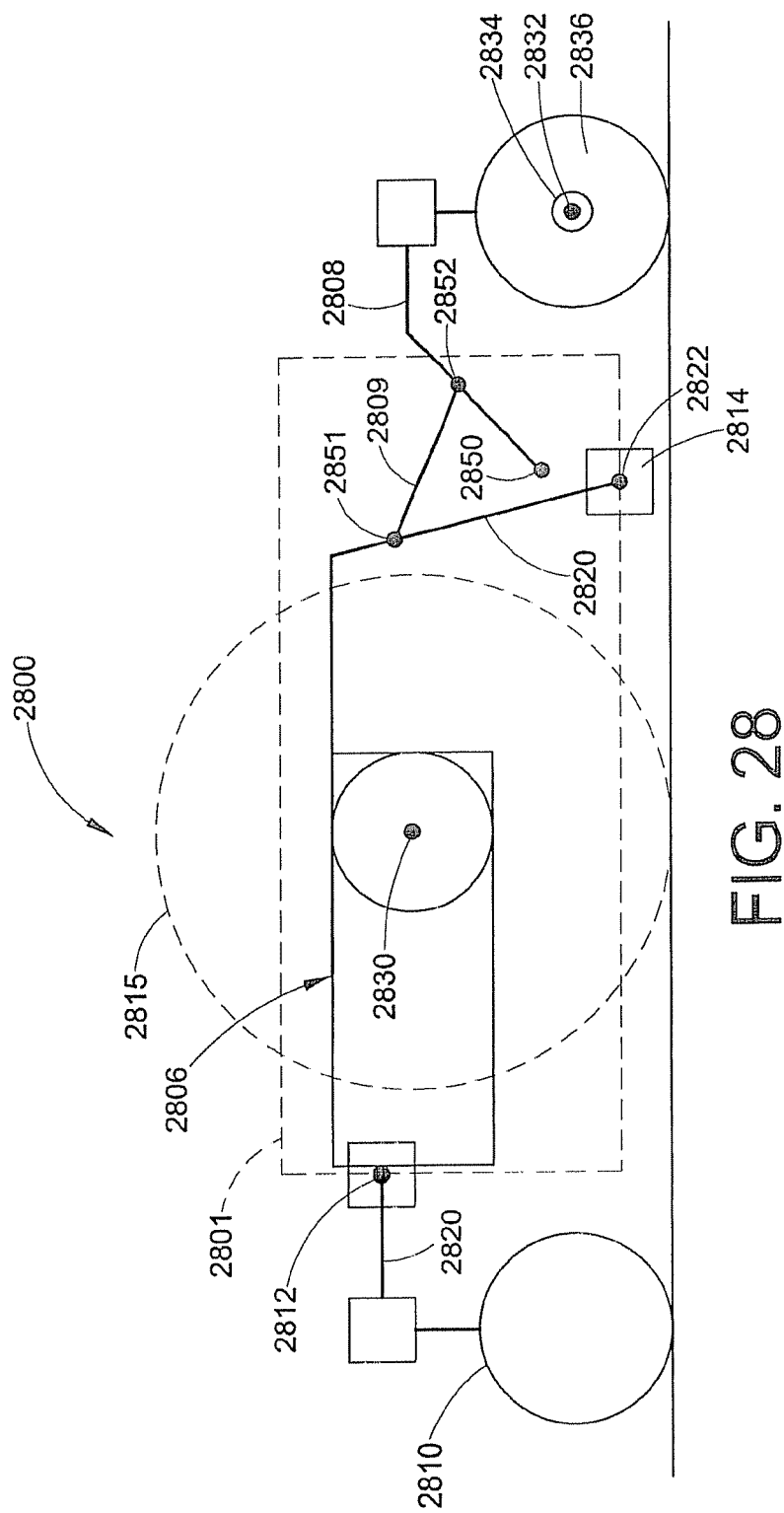
FIG. 28 illustrates an embodiment of a mid-wheel drive wheelchair that includes a tip or stability control system and front caster pivot arms that are coupled to drive assemblies.

FIG. 28 schematically illustrates a mid-wheel drive wheelchair 2800 that includes a tip or stability control system 2802 that comprises at least one tip sensor or trigger 2812 and at least one stabilizing member or assembly. Front caster pivot arms 2808 are coupled to drive assemblies 2806 by a link 2809. The wheelchair 2800 is similar to the wheelchair 2600 of FIG. 26, but the front caster pivot arm 2808 is pivotally coupled to the frame 2801 and is coupled to the drive assembly 2806 by the link 2809. Each drive assembly 2806 is mounted to the frame 2801 by a pivot arm 2820 at a drive assembly pivot axis 2822. The pivot arm 2820 extends forward and downward from the motor drive to the drive assembly pivot axis 2822. The pivot axis 2822 of the drive assembly pivot arm 2820 is below the drive wheel axis of rotation 2830 and the axis 2832 of an axle 2834 that the front caster wheel 2836 rotates around.

In one embodiment, a biasing member, such as a spring may optionally be coupled between the frame 2801 and the front caster pivot arm 2808 and/or the frame and the drive assembly 2806 to bias the front caster into engagement with the support surface 2819 or a biasing member may be included in the stabilizing assembly 2814. The front caster pivot arm 2808 is pivotally mounted to the frame at a pivot axis 2850. The pivot axis 2850 of the front caster pivot arm 2808 is forward of the drive assembly pivot axis 2822 and below the axis of rotation 2830 of the drive wheel.

The link 2809 is connected to the drive assembly pivot arm 2820 at a pivotal connection 2851 and is connected to the front caster pivot arm 2808 at a pivotal connection 2852. The link 2809 can take a wide variety of different forms. For example, the link may be rigid, flexible, or extendible in length. The link need not comprise a linear member for example, the link may be a gear train. The link 2809 may be any mechanical arrangement that transfers at least some portion of motion in at least one direction of the drive assembly 2806 to the front caster pivot arm 2808.

When the drive assembly 2806 is accelerated such that the moment arm generated by drive wheel 2815 is greater then all other moment arms around pivot axis 2822, the drive assembly 2806 pivots and pulls the link 2809. Pulling on the link 2809 causes the front caster pivot arm 2808 to move upward or urges the pivot arm upward. When the link 2809 is a variable length link, such as a spring, a shock absorber, or a shock absorber with a spring return, the drive assembly 2806 pulls the link 2809 to extend the link to its maximum length or a length where the front caster pivot arm 2808 begins to pivot. Once extended, the link 2809 pulls the front caster pivot arm 2808 upward or urges the front caster pivot arm upward.

Rear casters 2810 are coupled to the frame 2801 such that the rear casters are moveable upwardly and downwardly with respect to the frame. A stabilizing assembly 2814 is coupled to each front caster pivot arm 2808 and to the frame 2801, to the drive assembly 2806 and the frame 2801 and/or to the link 2809 and the frame 2801. However, the stabilizing assembly can take any form and be positioned in any manner that allows the stabilizing assembly to inhibit a tipping behavior. One or more triggers or sensors 2812 are coupled to the rear caster pivot arms 2820 to detect a tipping behavior of the wheelchair. However, a trigger or sensor can take any form and be arranged in any manner to detect a tipping behavior of the wheelchair and need not be coupled to a rear caster. The trigger or sensor 2812 senses when conditions exist that may cause the vehicle to exhibit a tipping behavior and causes the locking assembly 2814 to engage when a tipping behavior is sensed to prevent any further tipping behavior.

Figure 29:
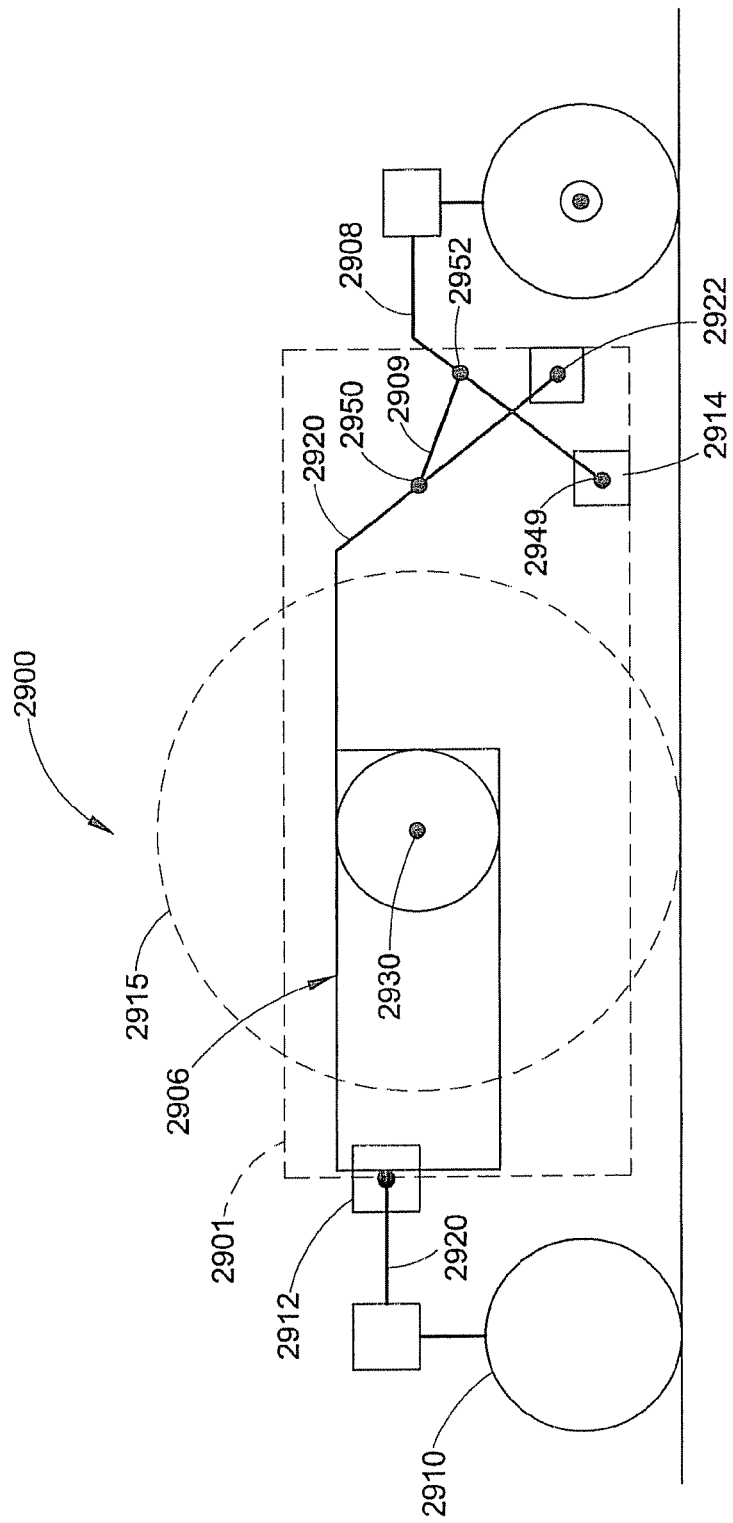
FIG. 29 illustrates an embodiment of a mid-wheel drive wheelchair that includes a tip or stability control system and front caster pivot arms that are coupled to drive assemblies.

FIG. 29 schematically illustrates a mid-wheel drive wheelchair 2900 that includes a tip or stability control system that comprises at least one tip sensor or trigger 2912 and at least one stabilizing member or assembly 2914. Front caster pivot arms 2908 are coupled to drive assemblies 2906 by a link 2909. The wheelchair 2900 is similar to the wheelchair 2800 of FIG. 28, but the front caster pivot arm 2908 and the drive assembly pivot arm 2920 are disposed in a crossed configuration.

Each drive assembly 2906 is mounted to a frame 2901 by a pivot arm 2920 at a drive assembly pivot axis 2922. The pivot arm 2920 extends forward and downward from the motor drive to the drive assembly pivot axis 2922. The pivot axis 2922 of the drive assembly pivot arm 2920 is below the drive wheel axis of rotation 2930. The front caster pivot arm 2908 is pivotally mounted to the frame at a pivot axis 2949. The pivot axis 2949 of the front caster pivot arm 2908 is rearward of the drive assembly pivot axis 2932 and below the axis of rotation 2930 of the drive wheel. As such, the front caster pivot arm 2908 and the drive assembly pivot arm 2920 are in a crossed configuration. The front caster pivot arm 2908 and the drive assembly pivot arm 2920 may be bent or may be offset to accommodate the crossed configuration.

The link 2909 is connected to the drive assembly pivot arm 2920 at a pivotal connection 2950 and is connected to the front caster pivot arm 2908 at a pivotal connection 2952. The link 2909 can take a wide variety of different forms. Any link 2909 that transfers at least some portion of motion in at least one direction of the drive assembly 2906 to the front caster pivot arm 2908 can be used.

When the drive assembly 2906 is accelerated such that the moment arm generated by a drive wheel 2915 is greater then all other moment arms around pivot axis 2922, the drive assembly 2906 pivots and pulls the link 2909. Pulling on the link 2909 causes the front caster pivot arm 2908 to move upward or urges the pivot arm upward.

Rear casters 2910 are coupled to the frame 2901 such that the rear casters are moveable upwardly and downwardly with respect to the frame. A stabilizing assembly 2914 is coupled to each front caster pivot arm 2908 and to the frame 2901, to the drive assembly 2906 and the frame 2901 and/or to the link 2909 and the frame 2901. One or more triggers or sensors 2912 are coupled to rear caster pivot arms 2920 to detect a tipping behavior of the wheelchair. However, a trigger or sensor can take any form and be arranged in any manner to detect a tipping behavior of the wheelchair and need not be coupled to a rear caster. The trigger or sensor 2912 senses when conditions exist that may cause the vehicle to exhibit a tipping behavior and causes the locking assembly 2914 to engage when a tipping behavior is sensed to prevent any further tipping behavior.

Figure 30:
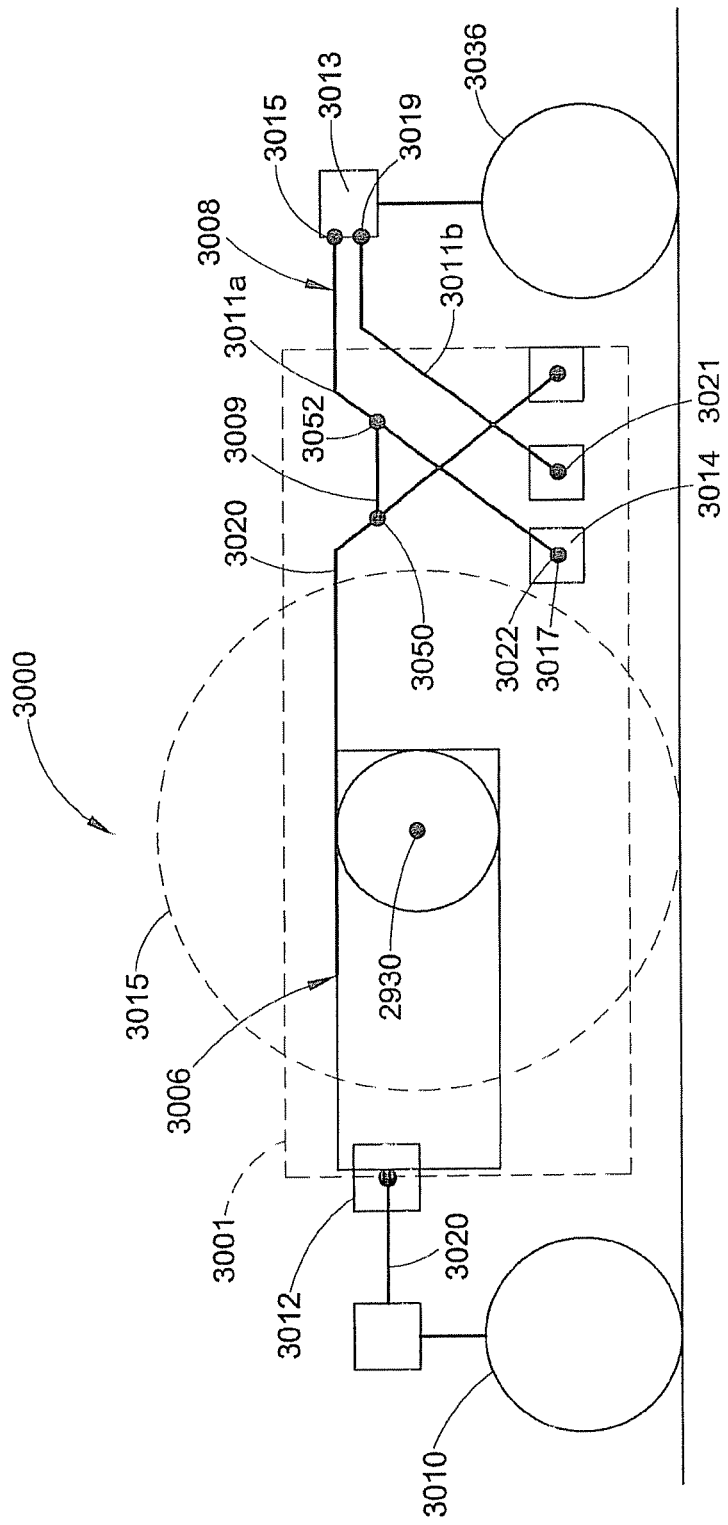
FIG. 30 illustrates an embodiment of a mid-wheel drive wheelchair that includes a tip or stability control system and front caster pivot arms that are coupled to drive assemblies.

FIG. 30 schematically illustrates a mid-wheel drive wheelchair 3000 that includes a tip or stability control system that comprises at least one tip sensor or trigger 3012 and at least one stabilizing member or assembly 2914. Front caster pivot arms 3008 are coupled to drive assemblies 3006 by a link 3009. The wheelchair 3000 is similar to the wheelchair 2900 of FIG. 29, but the front caster pivot arm 3008 comprises an upper link 3011a and a lower link 3011b.

The upper link 3011a is pivotally coupled to a caster support member 3013 at a pivotal connection 3015 and is pivotally connected to the frame 3001 at a pivotal connection 3017. The lower link 3011b is pivotally coupled to the caster support member 3013 at a pivotal connection 3019 and is pivotally connected to the frame 3001 at a pivotal connection 3021.

The caster support member 3013 may be any structure that couples the links 3011a, 3011b to be coupled to a front caster 3036. The links 3011a, 3011b, the frame 3001, and the caster support member 3013 form a four-bar linkage. The pivotal connections 3015, 3017, 3019, 3021 can be positioned at a wide variety of different locations on the frame 3001 and the caster support member 3013 and the length of the links 3011a, 3011b can be selected to define the motion of the caster 3036 as the front caster pivot arm 3008 is pivoted. In the example illustrated by FIG. 30, the front caster pivot arm 3008 retracts the front caster 3008 or pivots the wheel of the front caster toward the frame as the pivot arm 3008 is lifted and extends the front caster or pivots the wheel of the front caster away from the frame as the front caster pivot arm is lowered.

Each drive assembly 3006 is mounted to the frame 3001 by a pivot arm 3020 at a drive assembly pivot axis 3022. The pivot arm 3020 extends forward and downward from the motor drive to the drive assembly pivot axis 3022. The pivot axis 3022 of the drive assembly pivot arm 3020 is below the drive wheel axis of rotation 3030 and is in front of the front caster pivot arms 3008. As such, the front caster pivot arm 3008 and the drive assembly pivot arm 3020 are in a crossed configuration. The front caster pivot arm 3008 and the drive assembly pivot arm 3020 may be bent or may be offset to accommodate the crossed configuration.

The link 3009 is connected to the drive assembly pivot arm 3020 at a pivotal connection 3050 and is connected to the front caster pivot arm 3008 at a pivotal connection 3052. The link 3009 can be connected to the upper link 3011a, or the lower link 3011b. Any link 3009 that transfers at least some portion of motion in at least one direction of the drive assembly 3006 to the front caster pivot arm 3008 can be used.

When the drive assembly 3006 is accelerated the drive assembly 3006 may pivot and pull the link 3909. Pulling on the link 3009 causes the front caster pivot arm 3008 to move upward or urges the pivot arm upward.

Rear casters 3010 are coupled to the frame 3001 such that the rear casters are moveable upwardly and downwardly with respect to the frame. A stabilizing assembly 3014 is coupled to each front caster pivot arm 3008 and to the frame 3001, to the drive assembly 3006 and the frame 3001 and/or to the link 3009 and the frame 3001. One or more triggers or sensors 3012 are coupled to rear caster pivot arms 3020 to detect a tipping behavior of the wheelchair. However, a trigger or sensor can take any form and can be arranged in any manner to detect a tipping behavior of the wheelchair and need not be coupled to a rear caster. The trigger or sensor 3012 senses when conditions exist that may cause the vehicle to exhibit a tipping behavior and causes the locking assembly 3014 to engage when a tipping behavior is sensed to inhibit further tipping behavior.

Figure 31:
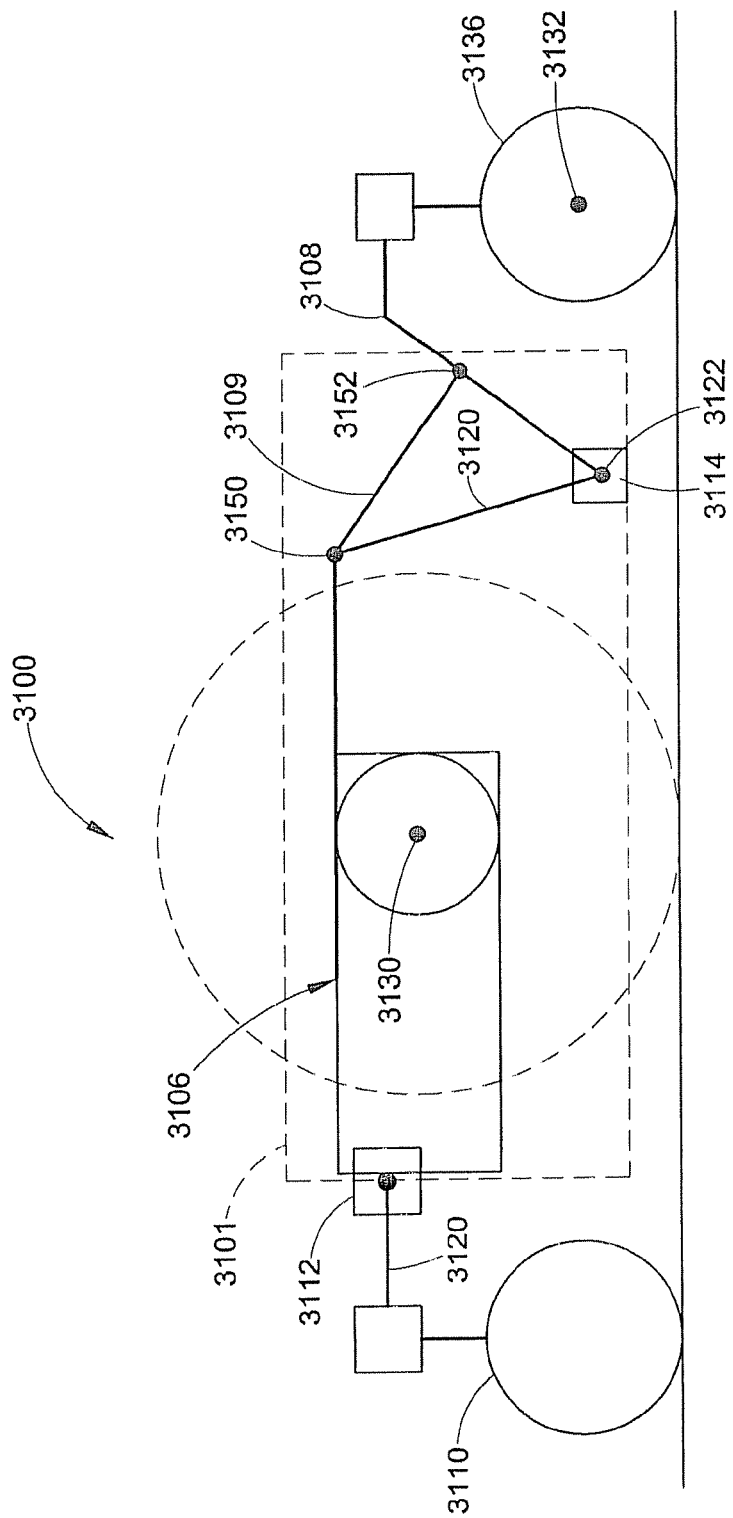
FIG. 31 illustrates an embodiment of a mid-wheel drive wheelchair that includes a tip or stability control system and front caster pivot arms that are coupled to drive assemblies.

FIG. 31 schematically illustrates a mid-wheel drive wheelchair 3100 that includes a tip or stability control system that comprises at least one tip sensor or trigger 3112 and at least one stabilizing or assembly 3114. Front caster pivot arms 3108 are coupled to drive assemblies 3106 by a link 3109. The wheelchair 3100 is similar to the wheelchair 2800 of FIG. 28, but the front caster pivot arm 3108 and the drive assembly 3106 are pivotally coupled to the frame 3101 at a common pivot axis 3122.

Each drive assembly 3106 is mounted to the frame 3101 by a pivot arm 3120. The pivot arm 3120 extends forward and downward from the motor drive to the common pivot axis 3122. The pivot axis 3122 is below the drive wheel axis of rotation 3130 and the axis 3132 that the front caster wheel 3136 rotates around.

The link 3109 is connected to the drive assembly pivot arm 3120 at a pivotal connection 3150 and is connected to the front caster pivot arm 3108 at a pivotal connection 3152. The link 3109 can take a wide variety of different forms. For example, the link may be rigid, flexible, or extendible in length. Any link 3109 that transfers at least some portion of motion in at least one direction of the drive assembly 3106 to the front caster pivot arm 3108 can be used.

When the drive assembly 3106 is accelerated, the drive assembly 3106 may pivot and pull on the link 3109. Pulling on the link 3109 causes the front caster pivot arm 3108 to move upward or urges the pivot arm upward.

Rear casters 3110 are coupled to the frame 3101 such that the rear casters are moveable upwardly and downwardly with respect to the frame. A stabilizing assembly 3114 is coupled to each front caster pivot arm 3108 and to the frame 3101, to the drive assembly 3106 and the frame 3101 and/or to the link 3109 and the frame 3101. However, the stabilizing assembly can take any form and be positioned in any manner that allows the stabilizing assembly to inhibit tipping behavior. One or more triggers or sensors 3112 are coupled to the rear caster pivot arms 3110 to detect a tipping behavior of the wheelchair. However, a trigger or sensor can take any form and be arranged in any manner to detect a tipping behavior of the wheelchair and need not be coupled to a rear caster. The trigger or sensor 3112 senses when conditions exist that may cause the vehicle to exhibit a tipping behavior and causes the locking assembly 3114 to engage when a tipping behavior is sensed to prevent any further tipping behavior.

FIGS. 32-37 illustrate an example of a mid-wheel drive wheelchair 3200 that includes a control system that comprises sensors or triggers 3212a, 3212b and stabilizing members 3214a, 3214b. The wheelchair 3200 includes a frame 3202, a seat (not shown) is supported by the frame 3202, first and second drive assemblies 3206a, 3206b, first and second front caster pivot arms 3218a, 3218b, first and second front casters 3208a, 3208b, first and second rear caster pivot arms 3220a, 3220b, and first and second rear casters 3210a, 3210b. A rear caster position sensing arrangement 4400 (see FIGS. 44-51) communicates a condition of the rear caster pivot arms 3220a, 3220b to both of the sensors or triggers 3212a, 3212b.

Figure 32:
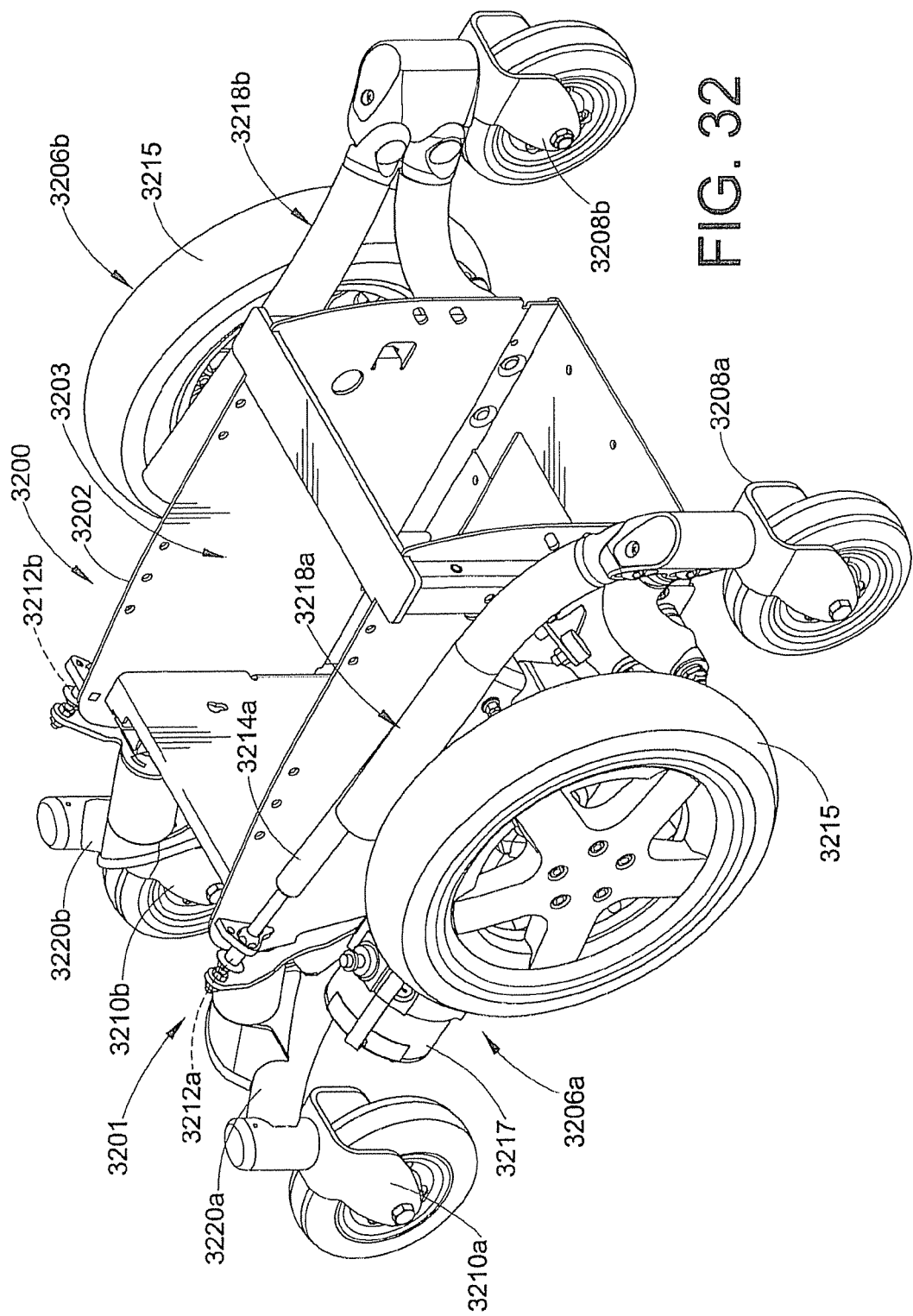
FIG. 32 is a perspective view of an embodiment of a mid-wheel drive wheelchair that includes a tip or stability control system.

Referring to FIG. 32, the illustrated frame 3202 is made from sheet metal panels, but can be constructed in any manner that is suitable for the application of the wheelchair 3200. The illustrated frame 3202 defines an interior space 3203 for batteries (not shown), wiring (not shown), and other wheelchair components.

Figure 33:
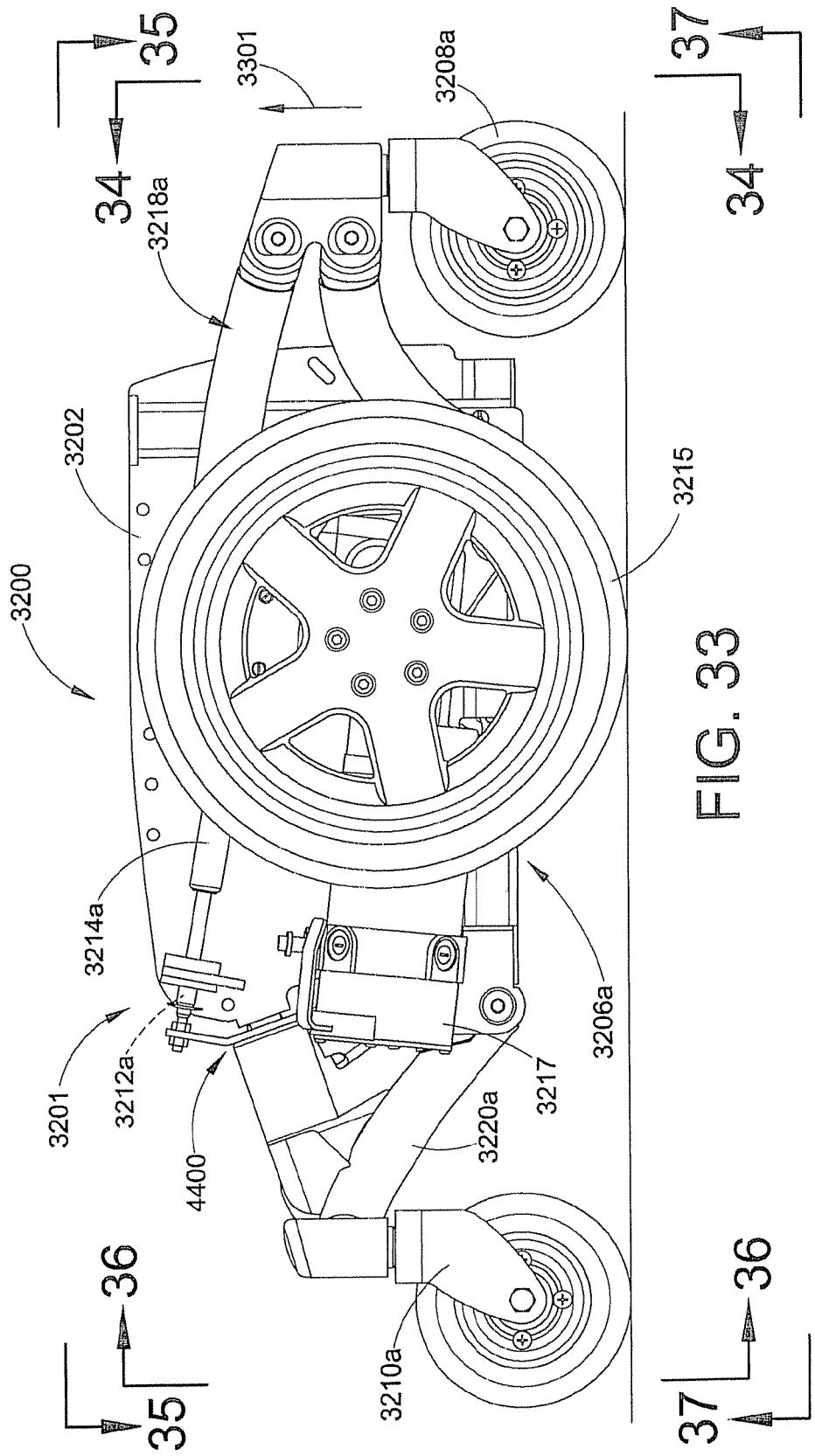
FIG. 33 is a side view of the mid-wheel drive wheelchair of FIG. 32.
Figure 34:
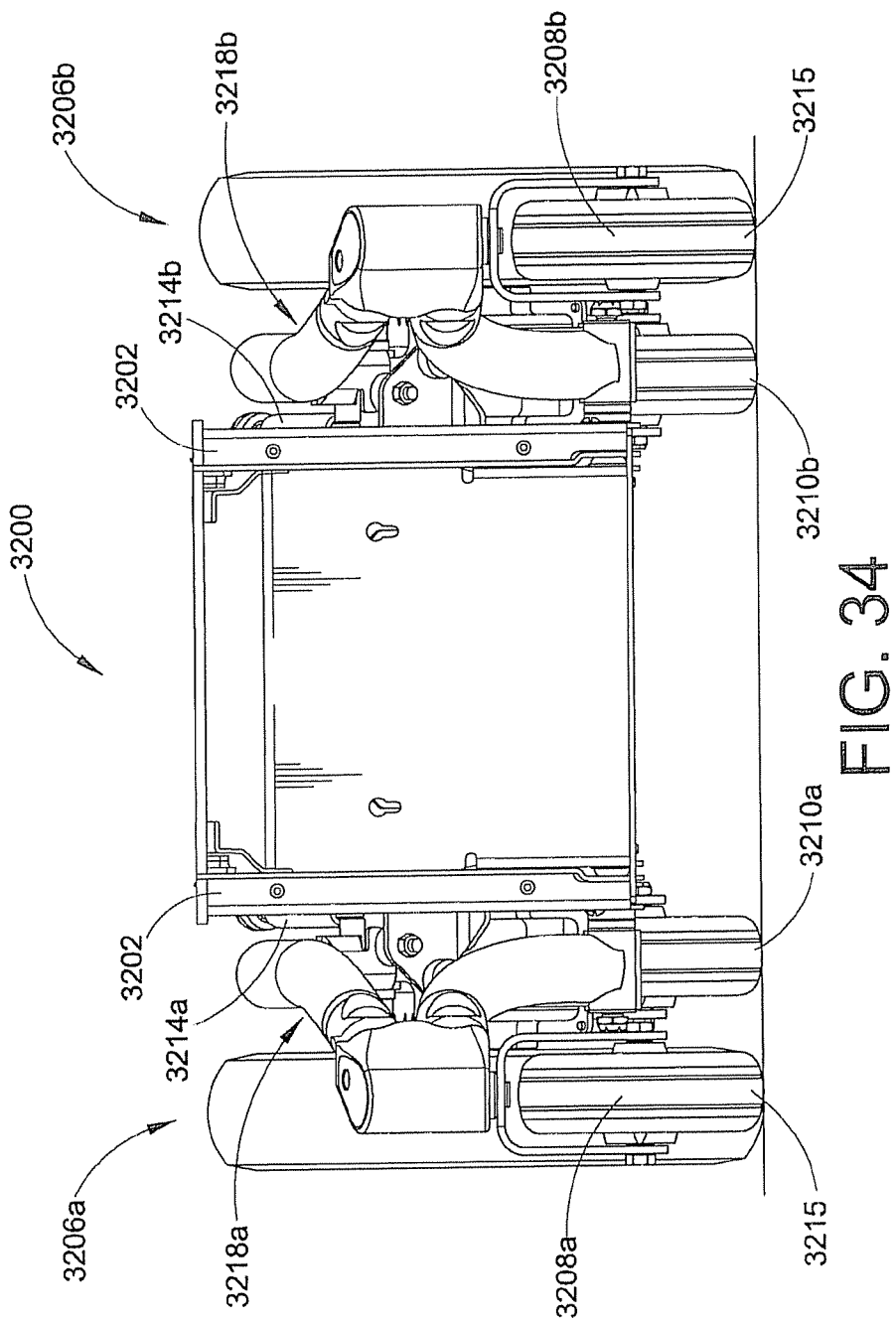
FIG. 34 is a view taken along lines 34-34 in FIG. 33.
Figure 35:
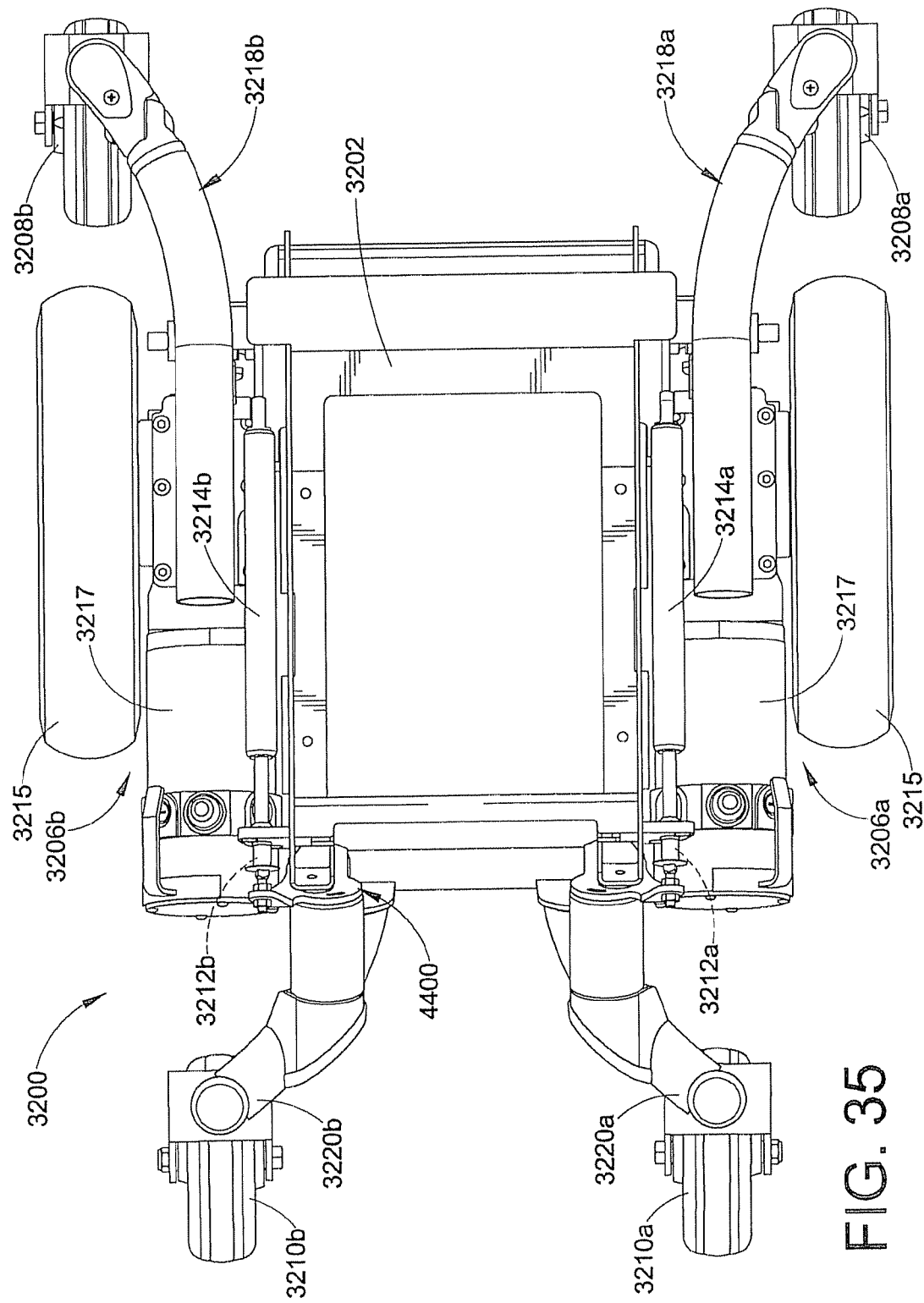
FIG. 35 is a view taken along lines 35-35 in FIG. 33.

Referring to FIGS. 32 and 33, each drive assembly 3206a, 3206b includes a drive wheel 3215 and a motor or drive 3217 that propels the drive wheel 3215. The drive 3217 may comprise a motor/gear box combination, a brushless, gearless motor, or any other known arrangement for driving the drive wheel 3215. The drive 3717 is coupled to the frame 3202 at a pivotal connection 3219. The pivotal connection 3219 is disposed below a drive axis 3221 of the drive wheel 3215 when the wheelchair 3200 is resting on flat, level ground. FIGS. 38-41 show the wheelchair 3200 with many of the components removed to more clearly illustrate the drive 3217, the front pivot caster pivot arm 3218a, the rear caster pivot arm 3220a, and the stabilizing member 3214a mounted on one side of the frame 3202. The component mounting on the other side of the frame 3202 may be a mirror image, and is therefore not described in detail.

Figure 39:
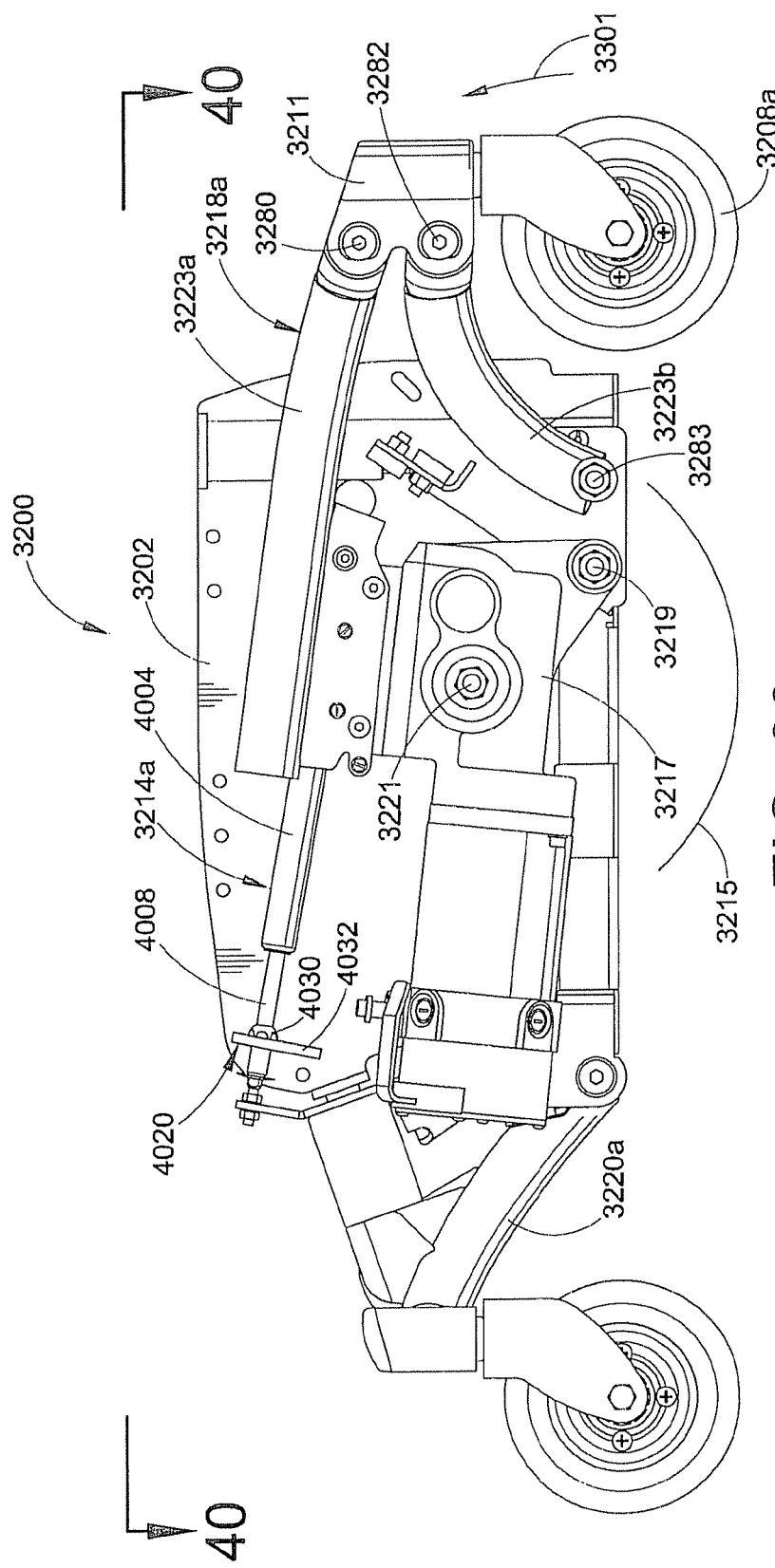
FIG. 39 is a side view of the mid-wheel drive wheelchair with components removed of FIG. 38.

Referring to FIG. 39, each front caster pivot arm 3218a, 3218b includes upper and lower links 3223a, 3223b that define a four bar linkage. The upper link 3223a is pivotally coupled to a caster support member 3211 at a pivotal connection 3280 and is fixedly connected to the drive 3217. The lower link 3223b is pivotally coupled to the caster support member 3211 at a pivotal connection 3282 and is pivotally connected to the frame 3202 at a pivotal connection 3283. The drive 3217, the links 3223a, 3223b, the frame 3202, and the caster support member 3211 form a four-bar linkage.

The front caster 3208a is coupled to the caster support member 3211. The front caster pivot arms 3218a, 3218b are independently pivotable upwardly and downwardly on the opposite sides of the frame to move the front casters 3208a, 3208b upwardly and downwardly with respect to the frame 3202.

Referring to FIGS. 33 and 39, when the drive assembly 3206a is accelerated such that the moment arm generated by drive wheel 3215 is greater then all other moment arms around pivot axis 3219, the drive assembly 3206 pivots about pivot axis 3219 to move the front caster pivot arm 3218 upward or urges the pivot arm upward as indicated by arrow 3301. Resulting upward tendencies of the front caster 3208a helps the wheelchair 3200 to traverse obstacles. In the exemplary embodiment, the drive assembly 3206b operates in the same manner or a similar manner to move or urge the front caster 3208b upward.

Figure 40:
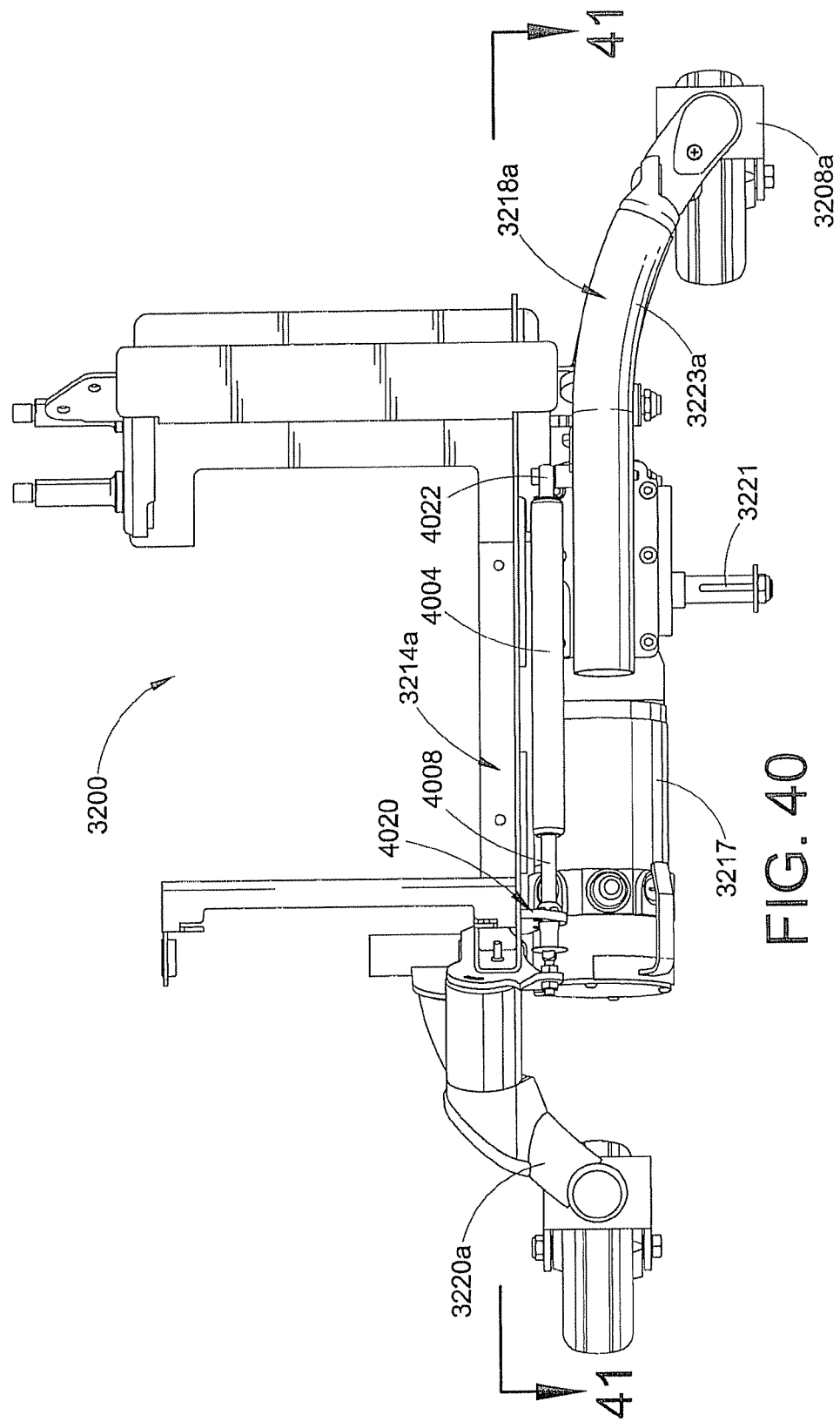
FIG. 40 is a view taken along lines 40-40 in FIG. 39.
Figure 41:
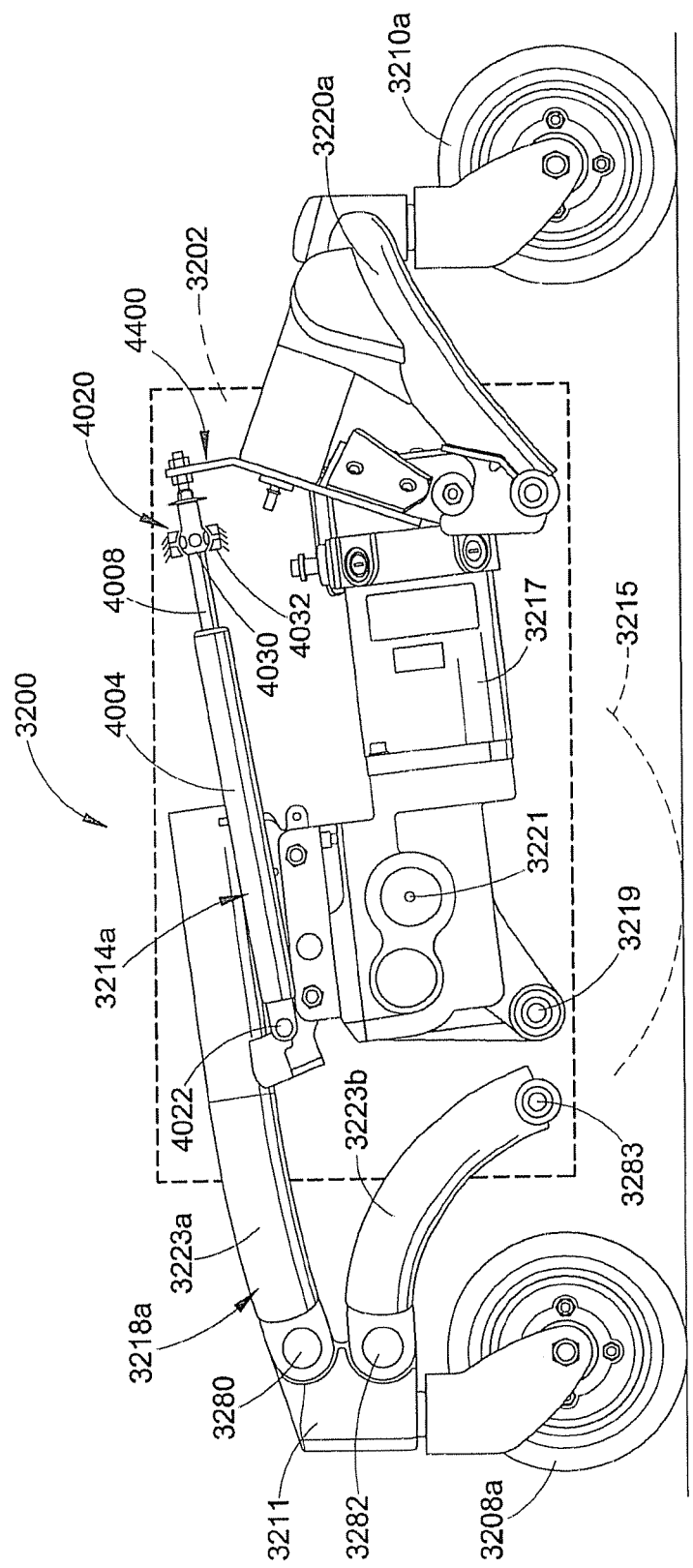
FIG. 41 is a view taken along lines 41-41 in FIG. 40.
Figure 42:
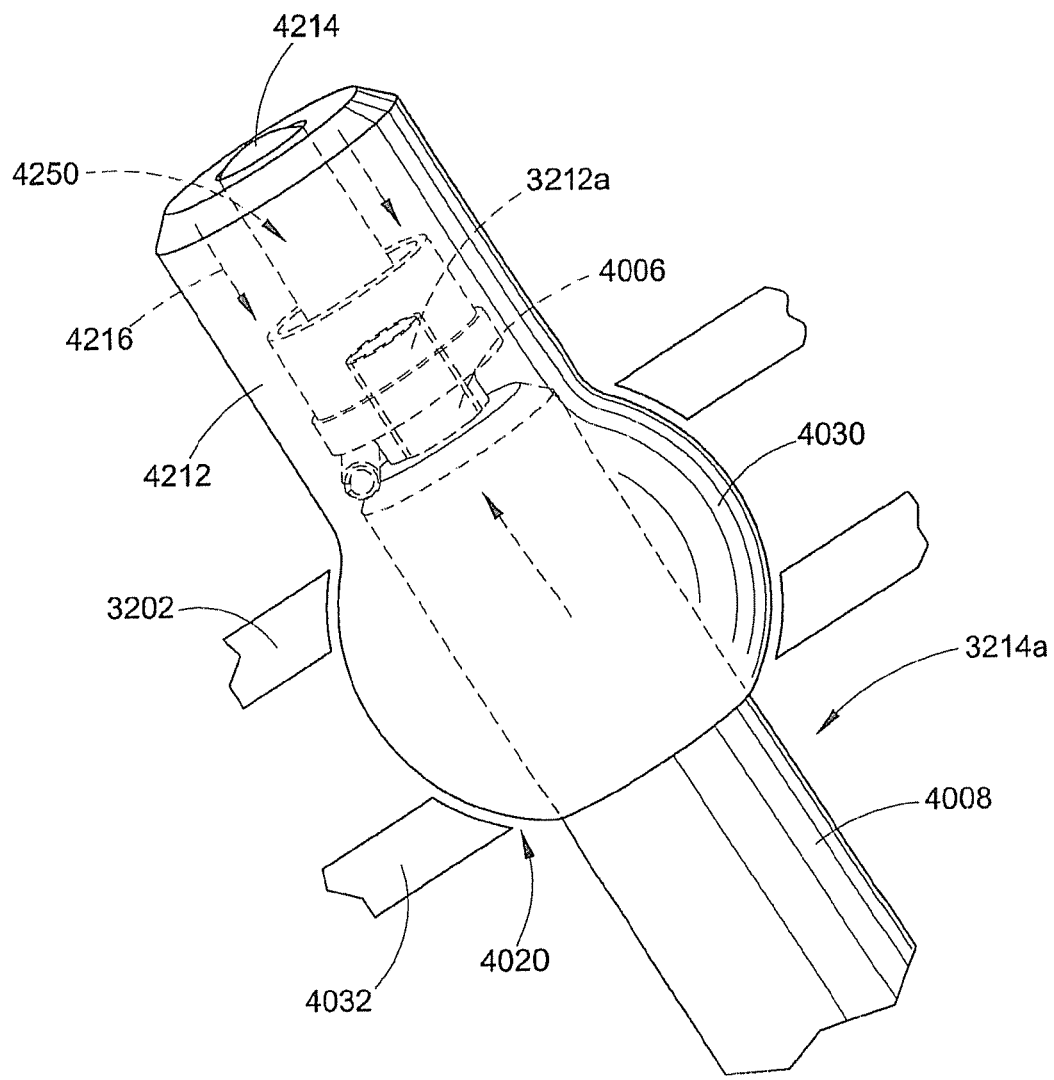
FIG. 42 is an enlarged portion of FIG. 38 as indicated by reference FIG. 42 in FIG. 38.

Referring to FIGS. 40-42, the stabilizing member 3214a comprises a hydraulic cylinder with a spring return (see also FIGS. 5 and 6). The stabilizing member 3214a includes a housing 4004, and a rod 4008. In this embodiment, the sensor or trigger 3212a is a portion of a button 4006 that extends from the stabilizing member 3214a. The position of the button 4006 determines the state of the stabilizing member 3214a. In the wheelchair 3200, when the button 4006 is depressed, the rod 4008 may move into and out of the housing 4004 to extend and shorten the length of the stabilizing member 3214a. When the button 4006 is extended, the rod 4008 may move out of the housing 4004 to extend the length of the stabilizing member 3214a, but is prevented from moving into the housing 4004 to shorten the length of the stabilizing member. When the button 4006 is in the depressed position, the movement of the fluid in the stabilizing member 3214a when the rod extends and retracts provides a damping effect. When the button 4006 is extended, the stabilizing member damps downward movement of the front caster. In the wheelchair 3200, a spring return (See FIG. 6) biases or returns the rod 4008 to an extended position to bias the front caster toward contact with the ground.

Referring to FIGS. 40-42, the stabilizing member 3214a is pivotally connected to the frame 3202 at a pivotal connection 4020 and to the drive assembly/front caster pivot arm at a pivotal connection 4022. When the button 4006 is extended, the stabilizing member 3214a can extend to allow the front caster to move downward with respect to the frame 3202, but cannot retract to prevent upward movement of the front caster with respect to the frame. When the button 4006 is depressed, the stabilizing member 3214a allows the front caster to move upward and downward with respect to the frame.

Referring to FIG. 42, the pivotal connection 4020 may comprise a ball 4030 and socket 4032 connection. The ball 4030 is mounted to the rod 4008. The socket 4032 is connected to the frame 3202. If the pivotal connection 4020 is made before the pivotal connection 4022, the ball 4030 can be turned in the socket 4032 to facilitate alignment required to make the pivotal connection 4022. If the pivotal connection 4022 is made before the connection 4022, the ball 4030 can be assembled in the socket 4022, regardless of the orientation of the ball with respect to the socket. As a result, assembly of the stabilizing members 3214a, 3214b to the frame and to the drive assembly/front caster pivot arm is made easier.

Figure 43:
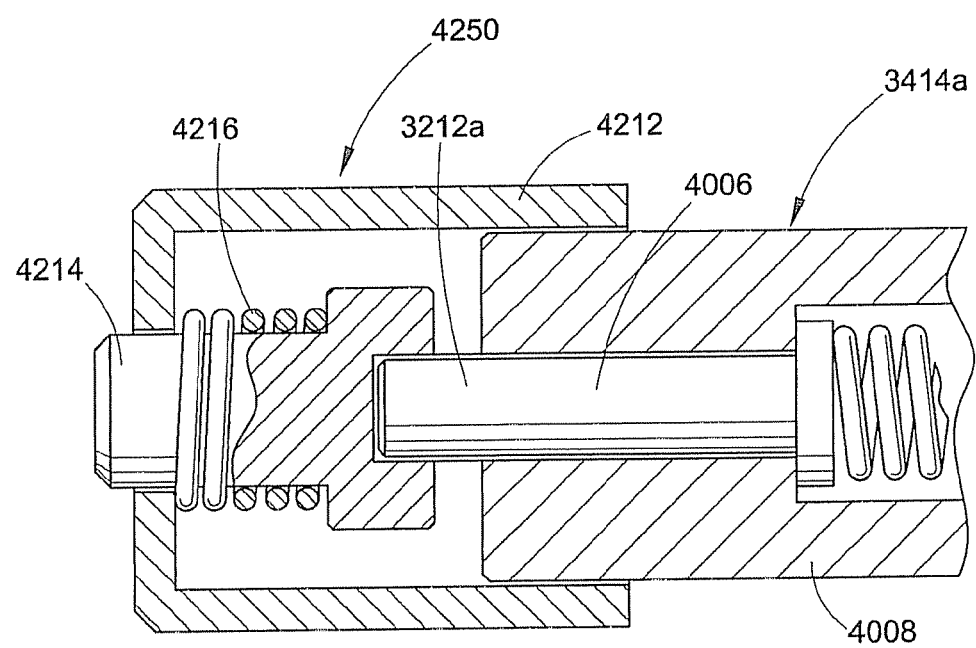
FIG. 43 is a schematic illustration of a vibration damping assembly.

In the embodiment of wheelchair 3200, optional vibration damping assemblies 4250 are coupled to the button 4006 of each stabilizing member 3214a, 3214b to prevent vibration of the button 4006 in the rod 4008. FIG. 42 illustrates a vibration damping assembly 4250 that includes a ball portion for a ball and socket connection. FIG. 43 illustrates a vibration damping assembly 4250 where the ball is omitted and the stabilizing member 3214a is connected to the frame by a conventional pivotal coupling or the ball is coupled to the stabilizing member at another location. The vibration damping includes a housing 4212, a trigger extension member 4214, and a biasing member 4216, such as a spring or other resilient member. The housing 4212 is disposed on the end of the rod 4008. In the embodiment illustrated by FIG. 42, the ball 4030 is defined as part of the housing 4212. In the embodiment illustrated by FIG. 43, the housing 4212 does not include a ball portion. The trigger extension member 4214 is disposed in the housing 4212 in engagement with the control rod 4210. The biasing member 4216 biases the trigger extension member 4214 against the button 4006. The biasing member 4216 applies a preload to the button 4006 to inhibit vibration of the button 4006 in the rod 4008. The force applied by the biasing member 4216 is small enough that the biasing member 4216 does not depress the control rod 4210 to a point where the stabilizing member 3214a, 3214 changes state (i.e. from an engaged state to a disengaged state).

Figure 36:
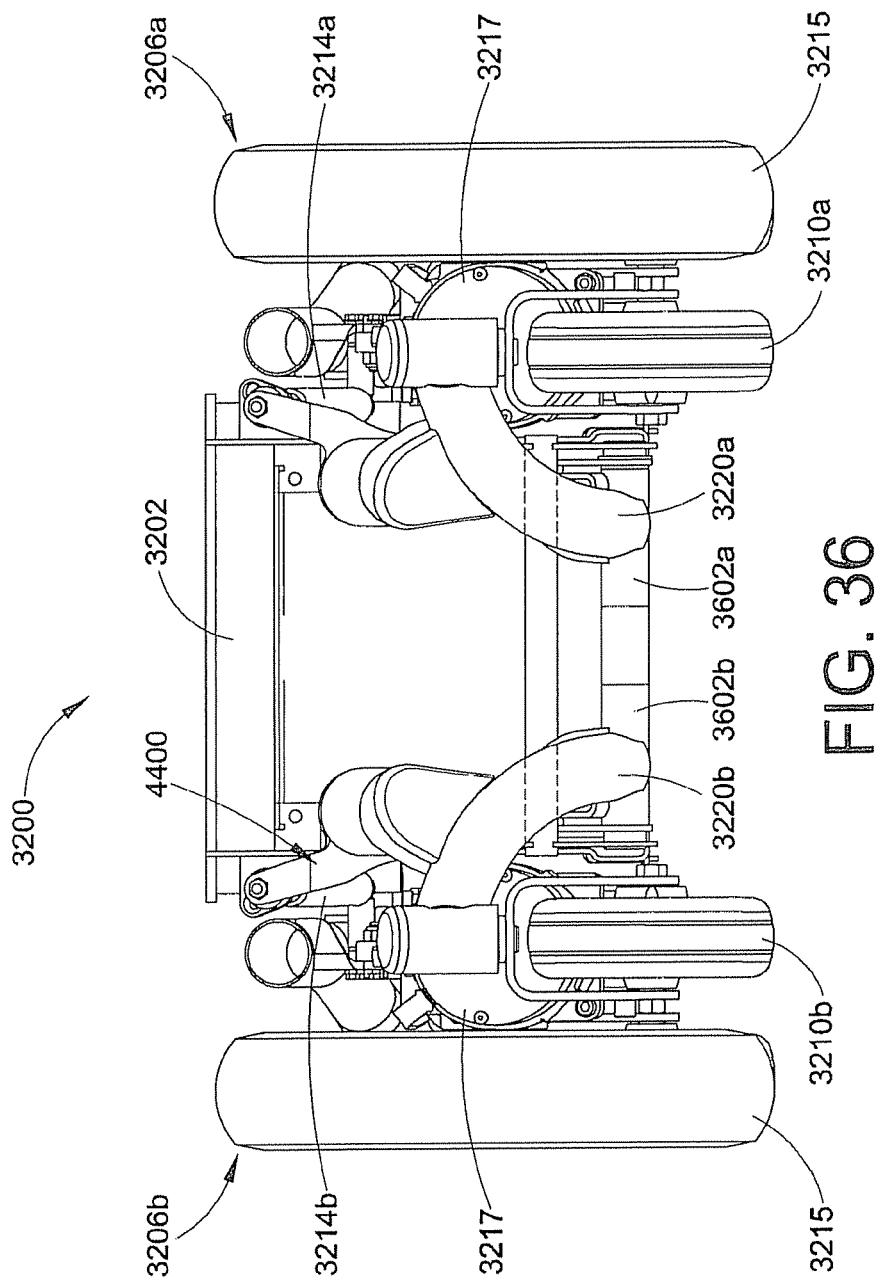
FIG. 36 is a view taken along lines 36-33 in FIG. 33.
Figure 37:
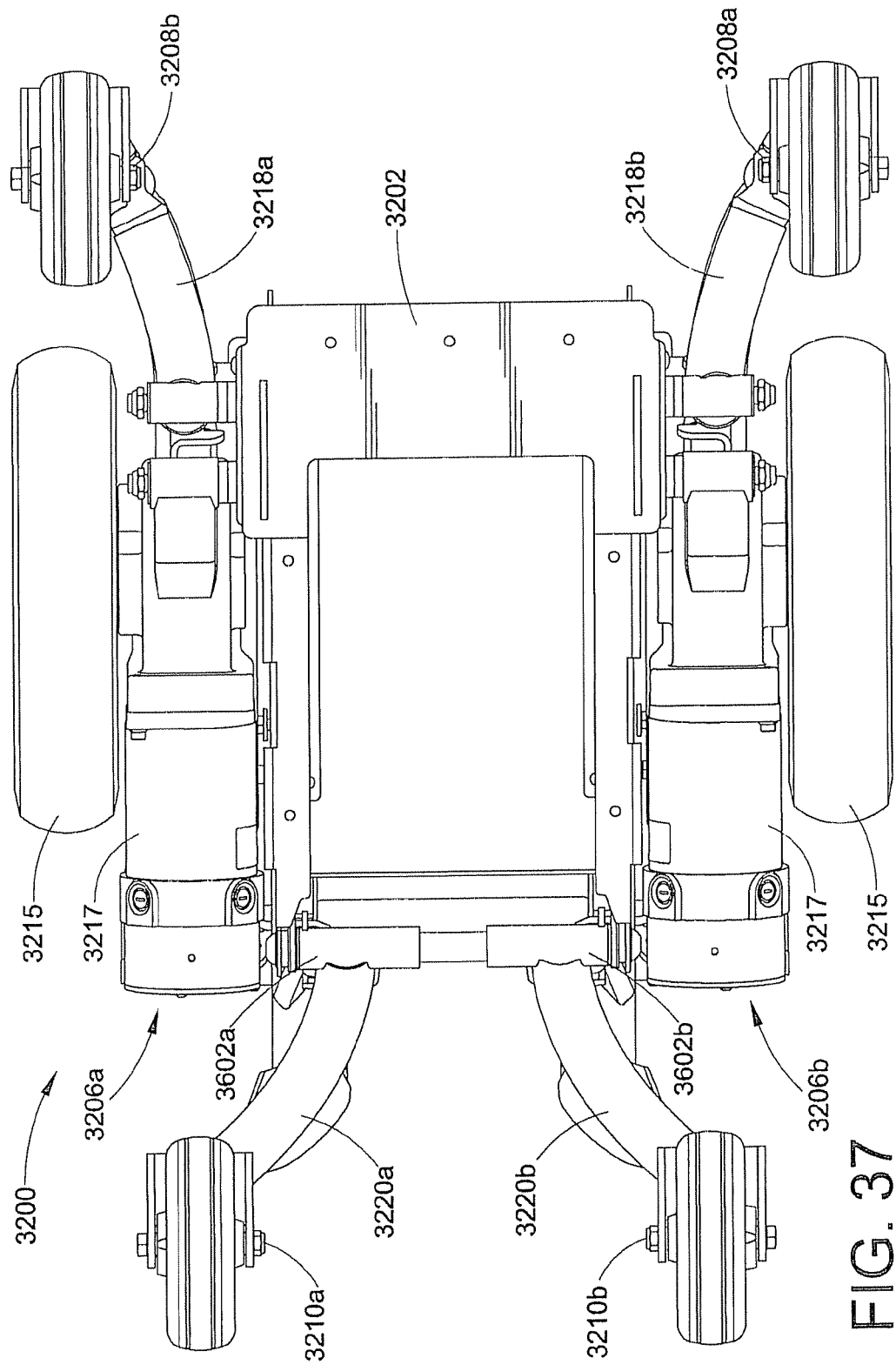
FIG. 37 is a view taken along lines 37-37 in FIG. 33.
Figure 38:
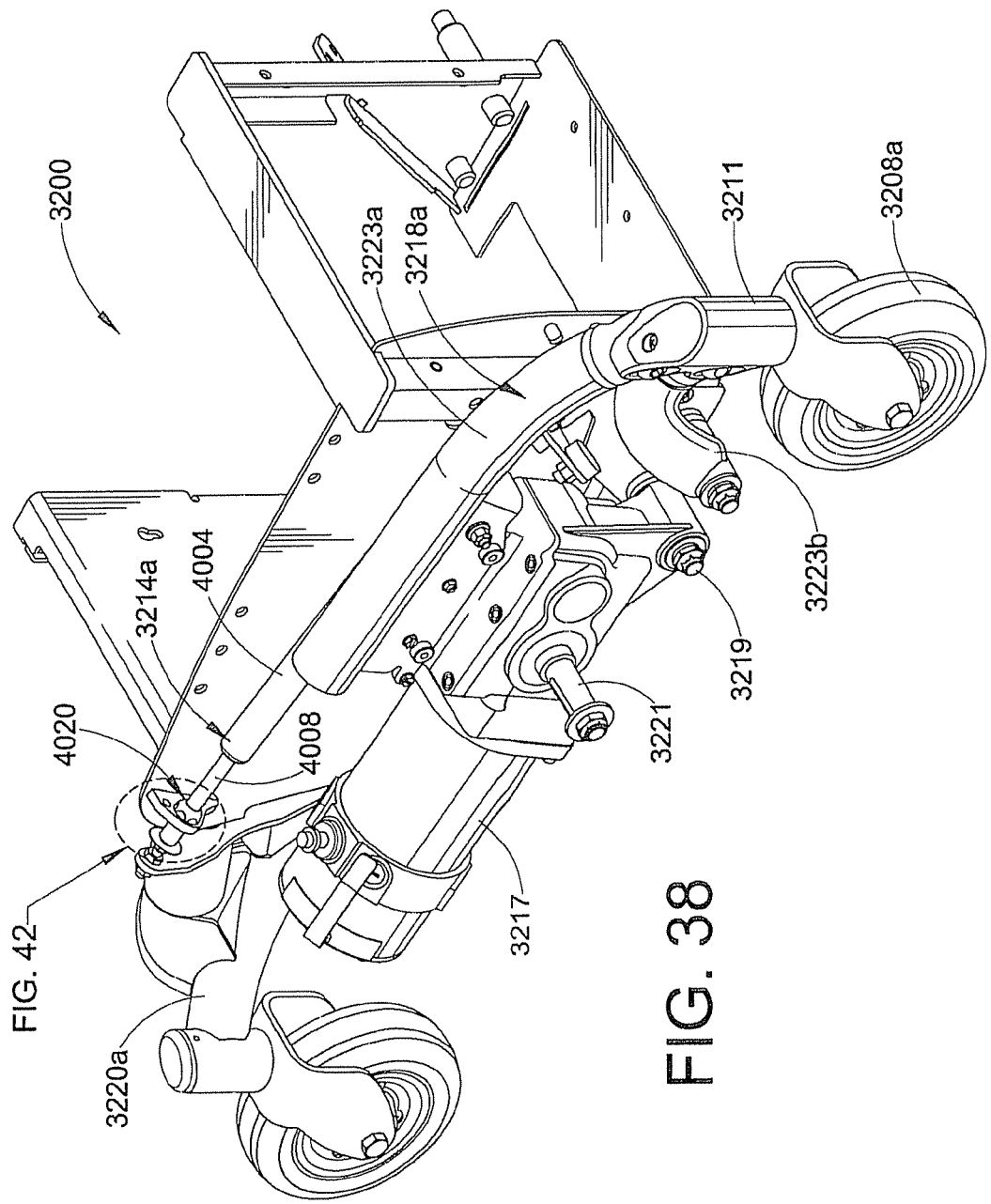
FIG. 38 is a view of the wheelchair of FIG. 32 with components removed.

Referring to FIGS. 36 and 37, each rear caster pivot arm 3220a, 3220b is independently coupled to the frame 3202 at a pivotal connection 3602a, 3602b. Each rear caster 3210a, 3210b is coupled to a rear caster pivot arm 3220a, 3220b, such that each rear caster can rotate around a substantially vertical axis. FIGS. 44-50 illustrates the rear caster position sensing arrangement 4400 and a rear caster suspension 4402 of the wheelchair 3200. The rear caster suspension 4402 includes the rear caster pivot arms 3220a, 3220b, the rear casters 3210a, 3210b, and biasing members 4408a, 4408b, such as a spring or other resilient member. A stop member 4413a, 4413b is attached to each pivot arm. The stop members 4413a, 4413b rotate with the pivot arms 3220a, 3220b. The rear caster position sensing arrangement 4400 includes a pair of spaced apart trigger engagement assemblies 4420a, 4420b that are coupled to the wheelchair frame at pivotal connections 4422a, 4422b. In the illustrated embodiment, each rear caster position sensing arrangement includes an elongated member 4423 pivotally coupled to the frame, and an adjustable trigger engagement member 4425 connected to the elongated member 4423.

Figure 45:
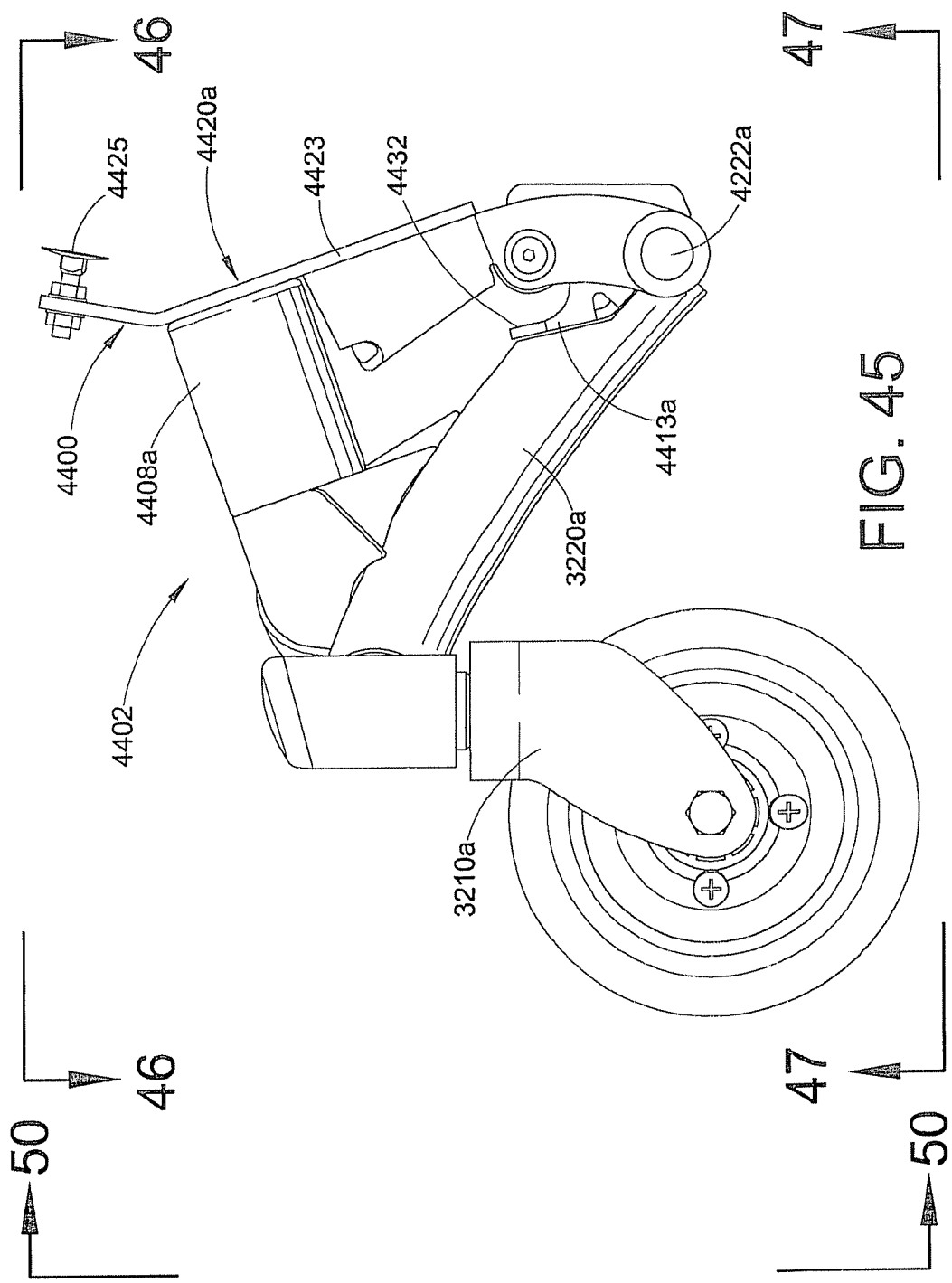
FIG. 45 is a side view of the rear caster position sensing arrangement and rear caster suspension of FIG. 44.
Figure 46:
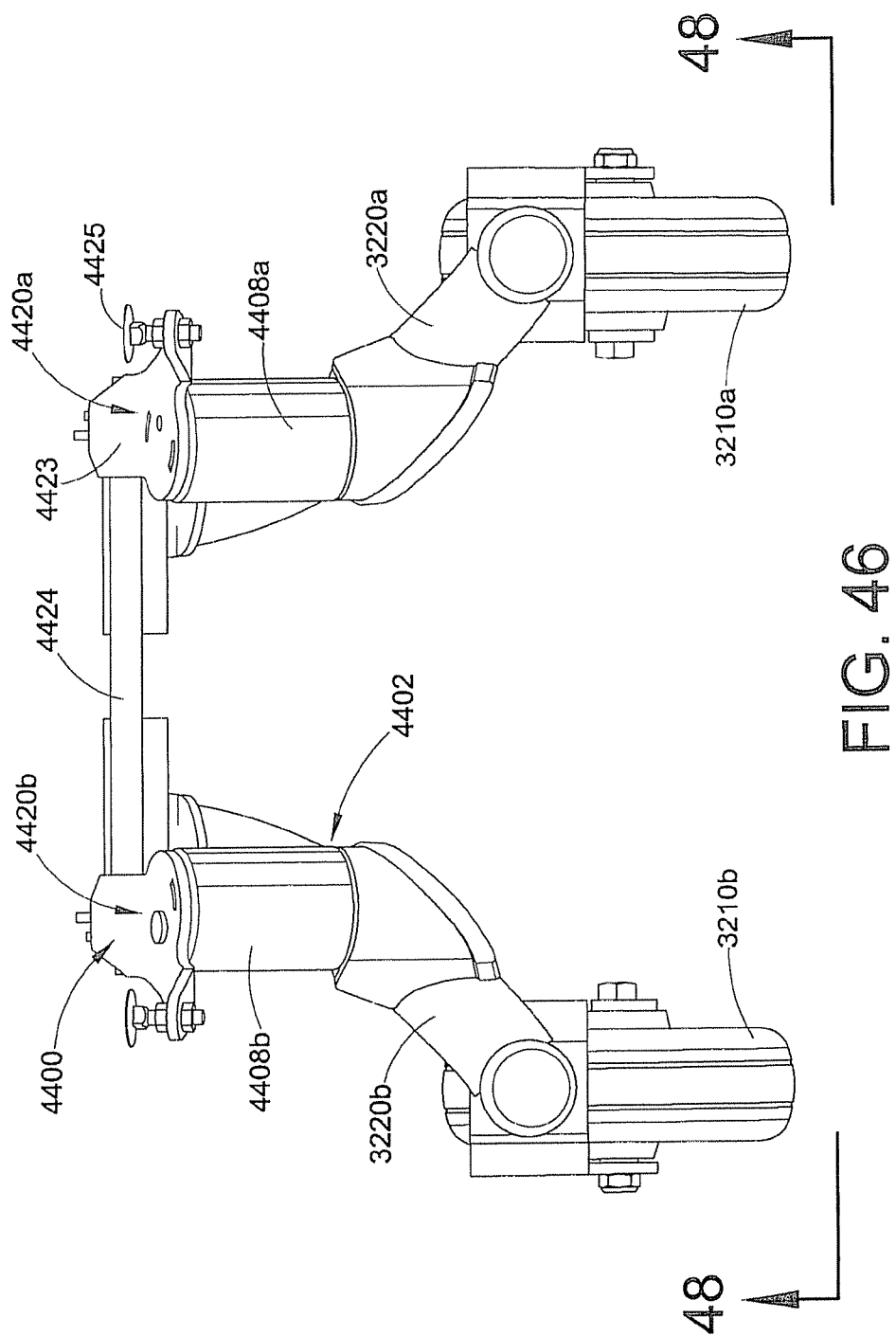
FIG. 46 is a view taken along lines 46-46 in FIG. 45.
Figure 47:
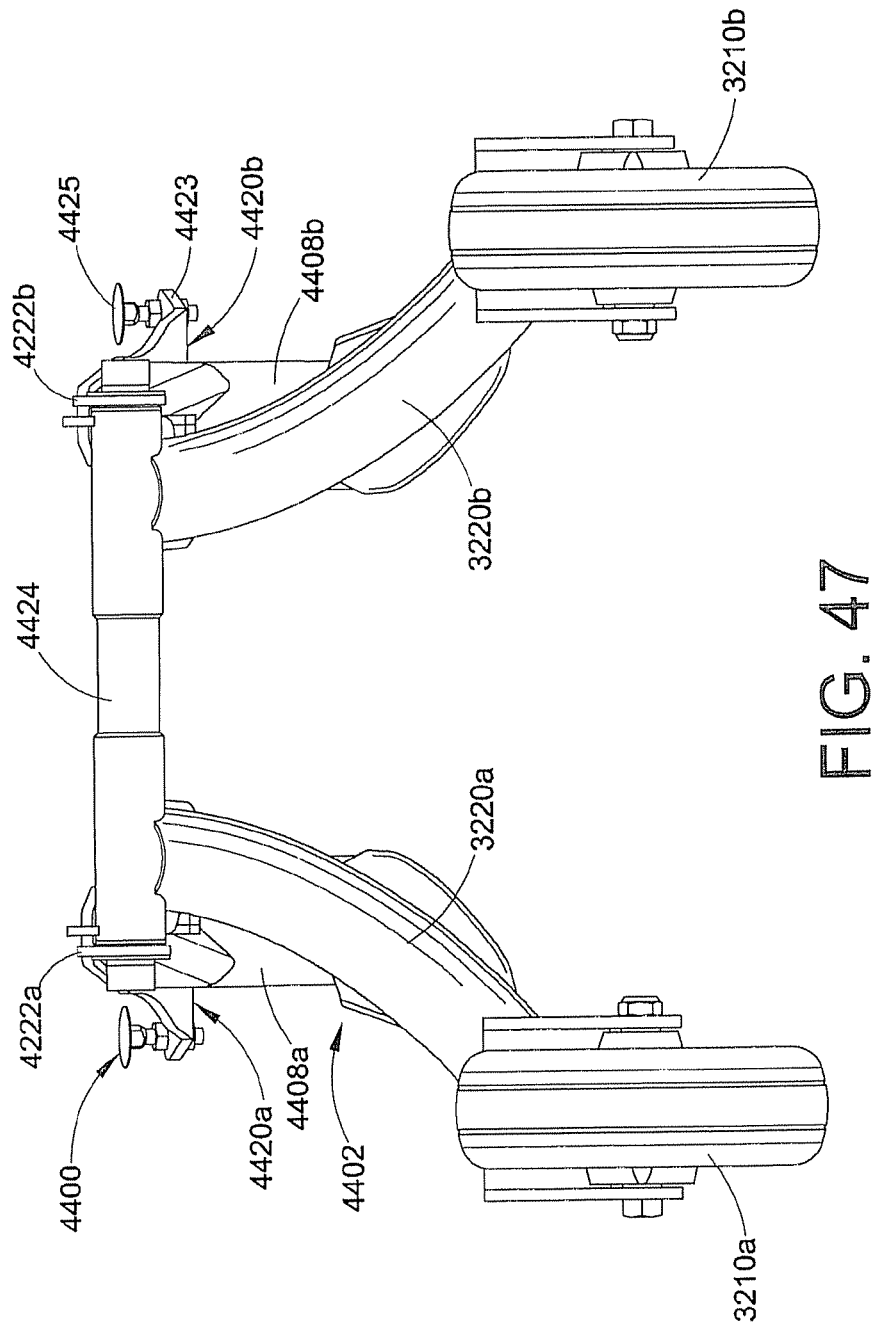
FIG. 47 is a view taken along lines 47-47 in FIG. 45.
Figure 48:
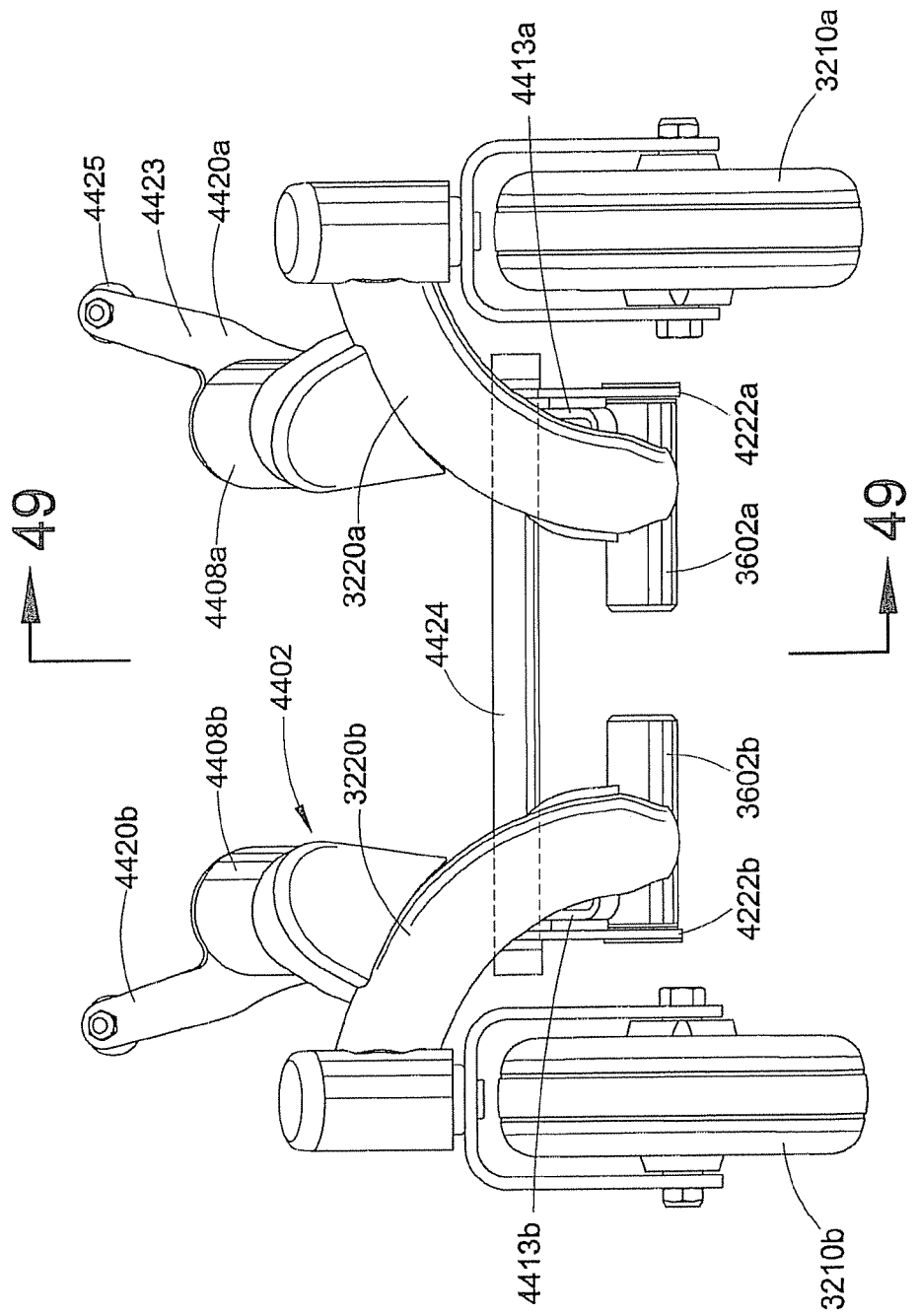
FIG. 48 is a view taken along lines 48-48 in FIG. 46.

The adjustment between the engagement member 4425 and the elongated member 4423 allows the amount of rotation of the rear caster position sensing arrangement that causes engagement of the stabilizing members to be adjusted. Referring to FIGS. 45 and 46, the distance that the engagement members 4325 extend from the elongated members 4323 is adjustable. The distance that the engagement members 4325 extend from the elongated members determines the amount of rotation of the rear caster position sensing arrangement that is required to cause the stabilizing assemblies to engage and disengage. In another embodiment, the trigger engagement assemblies 4420a, 4420b are replaced with the single piece trigger engagement members.

In the embodiment illustrated by FIGS. 44-50, the pivotal connections 4422a, 4422b are coaxial with pivotal connections 3602a, 3602b of the rear caster pivot arms. In another embodiment, the pivotal connections 4422a, 4422b are offset form the pivotal connections 3602a, 3602b. The elongated members 4420a, 4420b are connected together by a bar 4424. Referring to FIGS. 45 and 51, the bar 4424 is disposed between first and second engagement surfaces 4430, 4432 of the stop members 4413a, 4413b. The bar 4424 selectively engages the stop members 4413a, 4413b to limit relative movement between the first and second rear caster pivot arms 3220a, 3320b. The biasing members 4408a, 4408b are interposed between the rear caster pivot arms 3220a, 3220b and the elongated members 4420a, 4420b.

Figure 49:
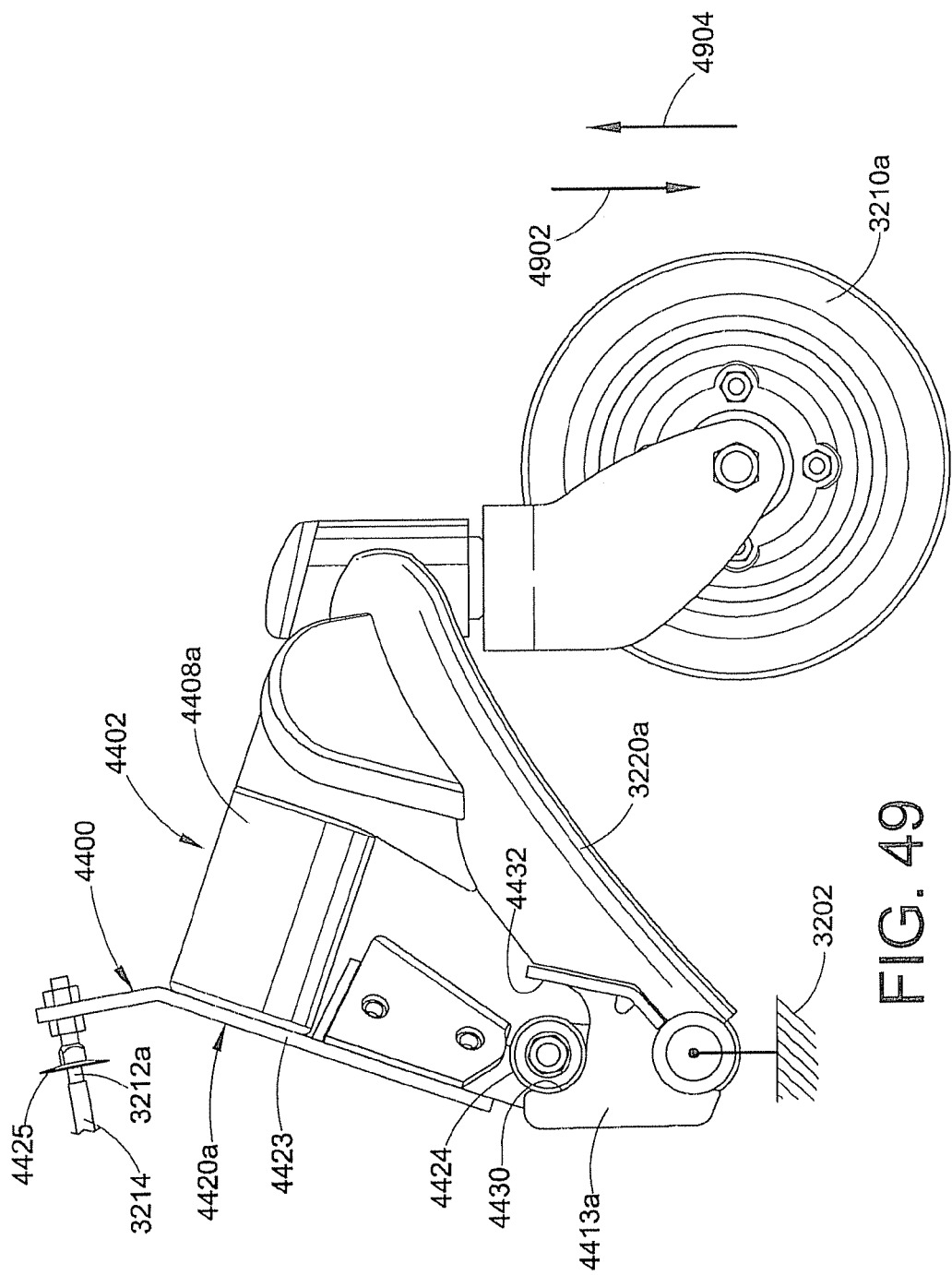
FIG. 49 is a view taken along lines 49-49 in FIG. 48.

The rear caster position sensing arrangement 4400 operates to cause both sensors or triggers to place both of the stabilizing members 3214a, 3214b in the engaged and disengaged states based on the positions of the rear caster pivot arms 3320a, 3320b. FIG. 49 illustrates rear caster pivot arm 3320a in a normal operating position. Rear caster pivot arm 3320b is not visible in FIG. 49, because it is in the same, normal operating position, as rear caster pivot arm 3320a. When (shown schematically in FIG. 49) one or both of the rear caster pivot arms 3320a, 3320b are in normal operating positions relative to the frame 3202, one or more of the biasing members 4408a, 4408b hold both of the trigger engagement assemblies 4420a, 4420b against both of the sensors or triggers 3212a, 3212b, such that both stabilizing members are disengaged. The elongated members 4420a, 4420b position the bar 4424 with respect to the stop members 4413a, 4413b. As long as force applied by one or more of the biasing members 4408a, 4408b is sufficient to maintain the elongated members 4420a, 4420b against the sensors or triggers 3212a, 3212b, the position of the bar 4424 is fixed. When there is a gap between the bar 4424 and a stop member 4413a, 4413b, the rear caster pivot arms 3320a, 3320b are free to move upwardly and downwardly with respect to one another.

Figure 44:
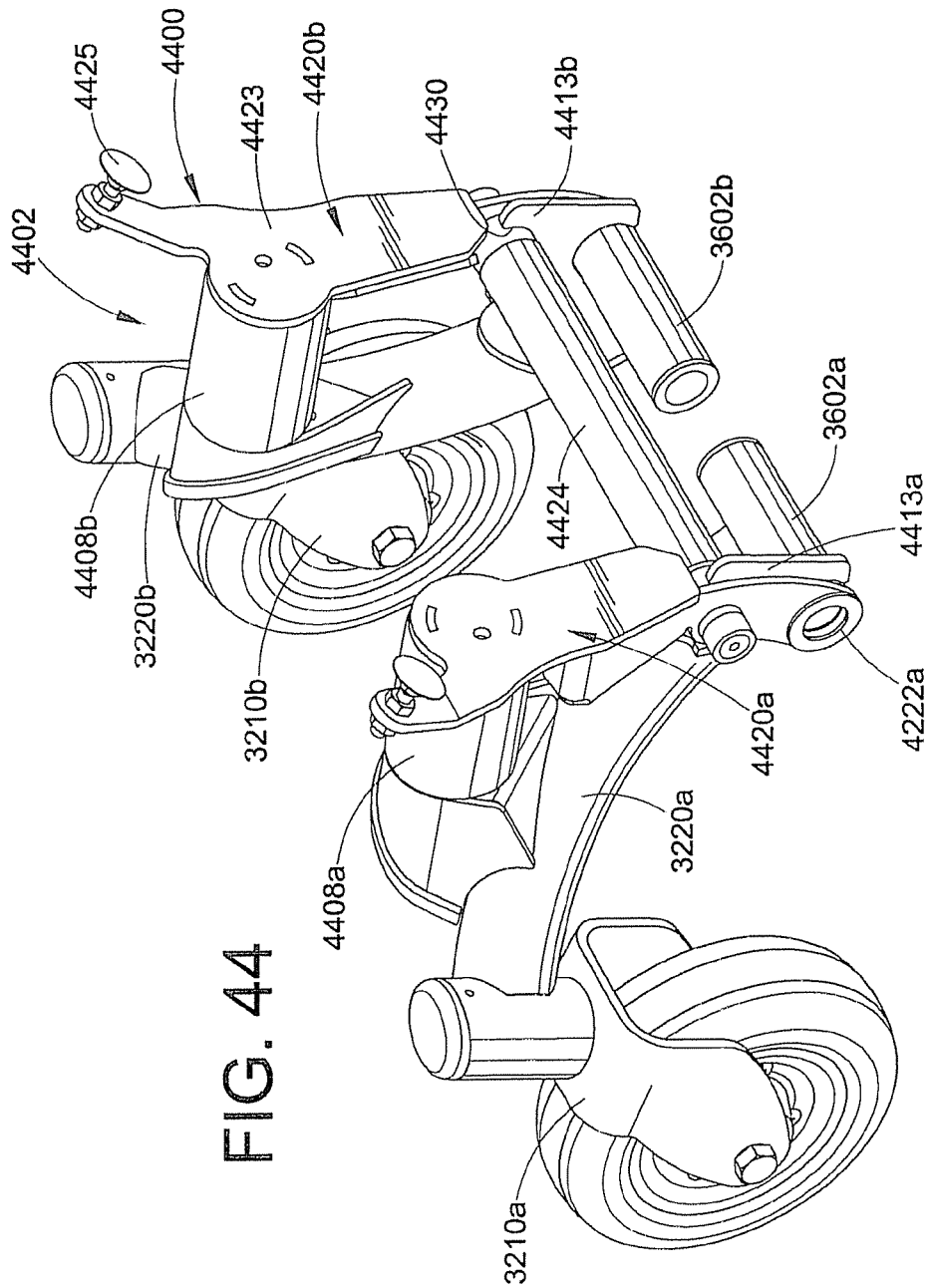
FIG. 44 illustrates a perspective view of a rear caster position sensing arrangement and rear caster suspension of the wheelchair illustrated by FIG. 32.
Figure 49A:
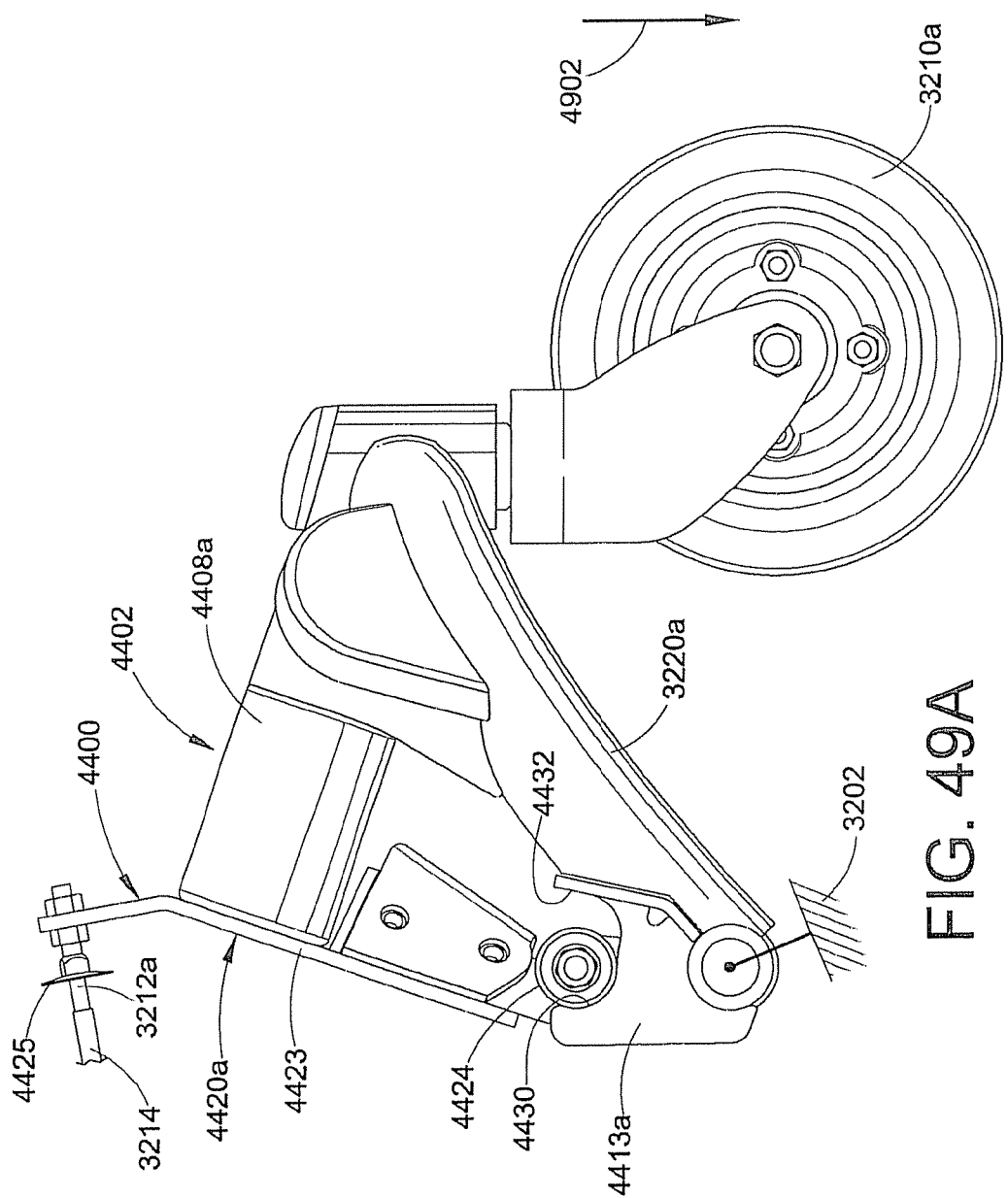
FIG. 49A is a view similar to FIG. 49, where the rear caster position sensing arrangement has moved to an engaged position.
Figure 50:
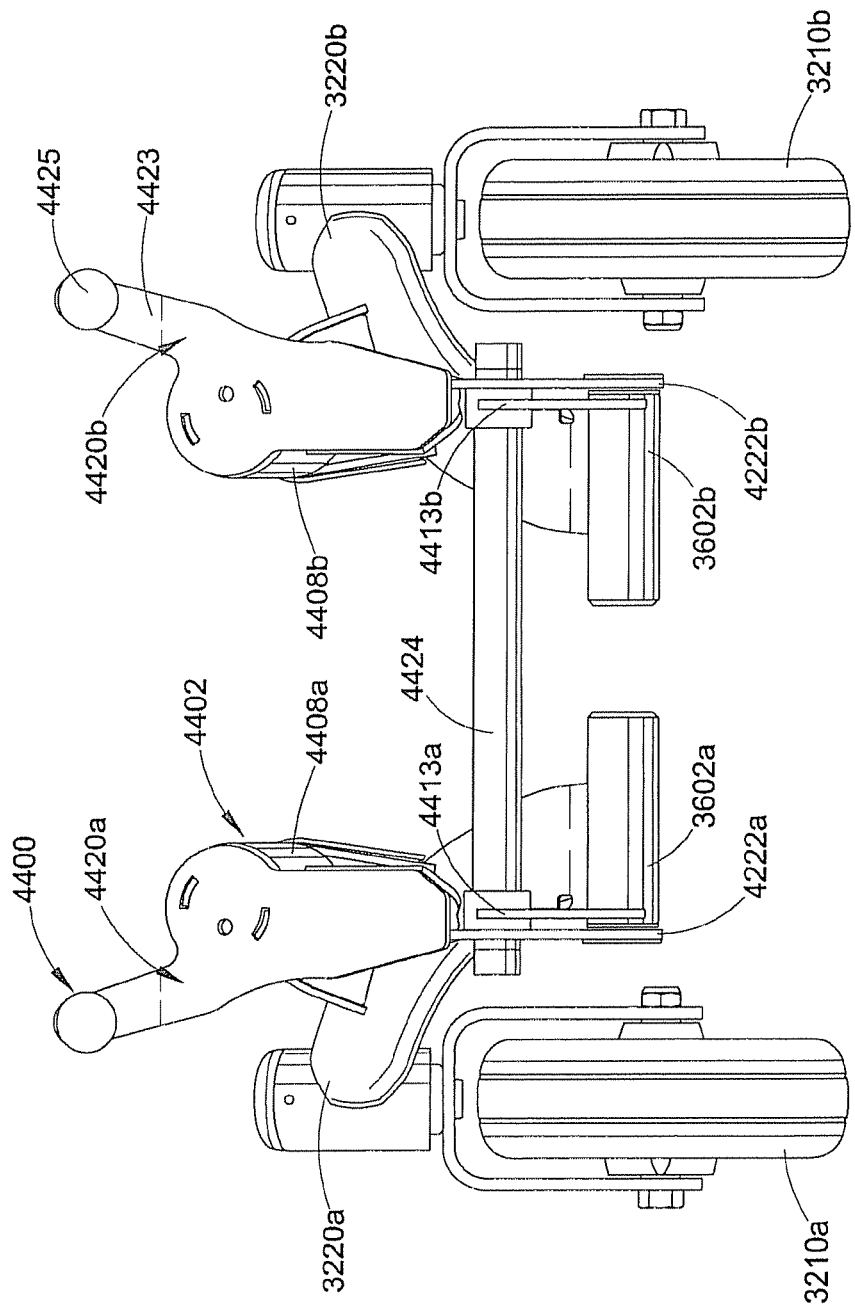
FIG. 50 is a view taken along lines 50-50 in FIG. 45.

In FIGS. 44 and 49, the stop members 4413a, 4413b are in contact with the bar 24. When the stop members 4413a, 4413b engage the bar 4424, further relative movement of the of the rear caster pivot arms is inhibited by the bar 4424. In the position shown by FIGS. 44 and 49, the bar 4424 is in engagement with the engagement surface 4430 of both of the stop members. As a result, downward movement of only one pivot arm 3320a, 3320b (with the other pivot arm remains in the position illustrated by FIGS. 44 and 49) is inhibited by the bar 4024 and the biasing member 4408a or 4408b of the other pivot arm. However, both pivot arms 3320a, 3320b can pivot downward together relative to the frame. Referring to FIG. 49A, downward movement indicated by arrow 4902 of both pivot arms 3220a (3220b is hidden) allows the rear caster position sensing arrangement 4400 to move away from both of the triggers 3212a, 3212b, allows the triggers to extend, and causes both of the locking members 3214 to disengage. As such, the rear caster pivot arms 3320a, 3320b move independently from the position shown in FIG. 49 in the direction of arrow 4904. Movement of each rear caster pivot arms 3320a, 3320b from the position shown in FIG. 49 in the direction indicated by arrow 4902 is dependent on the other rear caster pivot arm also moving in the direction indicated by arrow 4902.

Referring to FIG. 41, each stabilizing member 3214a (3214b not shown) is coupled to the frame 3202 and the front caster pivot arms 3218a, 3218b. The stabilizing members 3214a (3214b not shown) allow upward and downward movement of the first and second front caster pivot arms 3218a, 3218b relative to the frame 3202 when first and second rear casters 3210a, 3210b are each in a normal position relative to the frame shown in FIG. 41, because the rear caster position sensing arrangement 4400 engages both of the triggers 3212a, 3212b of the stabilizing members 3214a, 3214b in this position.

When the wheelchair 3200 exhibits a tipping behavior, the frame 3202 of the wheelchair is pitched slightly forward toward the front casters 3208a, 3208b. As a result, both of the rear casters 3320a, 3320b move downward relative to the frame 3202 to maintain contact with the ground. This downward movement moves the rear caster position sensing arrangement 4400 away from the triggers 3212a, 3212b, allows the triggers to move to the extended position and causes the stabilizing assemblies 3214a, 3214b to engage. In an exemplary embodiment, the stabilizing assemblies 3214a, 3214b engage to lock the first and second front casters 3208a, 3208b against upward movement relative to the frame, but allow the front casters to move downward when engaged. The stabilizing assemblies 3214a, 3214b may be configured in any manner that inhibits further tipping of the wheelchair frame when the stabilizing members are engaged. In another embodiment, the stabilizing assemblies 3214a, 3214b lock the front caster pivot arms against both upward and downward movement with respect to the pivot arm when engaged. When one or more of the rear casters return to a normal operating position relative to the frame, the triggers are depressed again to disengage and allow upward and downward movement of the front casters relative to the frame. In the wheelchair 3200, the rear caster position sensing arrangement is configured such that movement of one of the rear casters to a normal operating position moves the other rear caster up as well.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, pivotal connections can be made of any number of structures including bearing assemblies, pins, nuts and bolts, and frictionless sleeve assemblies. Additionally, springs or shock absorbers can be added between pivoting and non-pivoting components to limit, dampen, or somewhat resist the pivotal motions of these components. Also, a brake-disc locking mechanism could be integrated into any of the pivotal connections and serve as a stabilizing member or assembly that locks components coupled to the pivotal connection from rotation when actuated and freely allows pivotal motion about the connection when not actuated. Therefore, the invention, in its broader aspects, is not limited to the specific details, the representative apparatus, and illustrative examples shown and described. Accordingly, departures can be made from such details without departing from the spirit or scope of the applicant's general inventive concept.

What is claimed:

1. A wheelchair comprising:
    a frame;
    a pair of drive wheels supporting the frame;
    a first front caster coupled to the frame such that the first front caster is moveable upwardly and downwardly with respect to the frame;
    a second front caster coupled to the frame such that the second front caster is moveable upwardly and downwardly with respect to the frame;
    a first rear caster coupled to the frame such that the first rear caster is moveable upwardly and downwardly with respect to the frame;
    a second rear caster coupled to the frame such that the second rear caster is moveable upwardly and downwardly with respect to the frame;
    at least one stabilizing assembly coupled to the first and second front casters;
    a trigger that disengages the stabilizing assembly when in a first state and engages the stabilizing assembly when in a second state;
    a rear caster position sensors arrangement disposed between the trigger and the first and second rear casters such that at least one of the rear casters force the trigger actuating arrangement to place the trigger in the second state to disengage the stabilizing assembly when at least one of the rear casters are in a normal operating position, and such that the rear casters cause the trigger actuating arrangement to place the trigger in the first state to engage the stabilizing assembly when both of the rear casters move downward from normal operating positions relative to the frame.

2. The wheelchair of claim 1 wherein the rear caster position sensing arrangement presses against the trigger to place the trigger in the first state.

3. The wheelchair of claim 1 wherein the rear caster position sensing arrangement is coupled to the rear casters by one or more springs.

4. The wheelchair of claim 1 wherein the rear caster position sensing arrangement is pivotally connected to the frame.

5. The wheelchair of claim 1 wherein the rear caster position sensing arrangement limits downward movement of the first caster with respect to the second caster.

6. A wheelchair comprising:
    a frame;
    a seat supported by the frame;
    a pair of drive wheels supporting the frame;
    a first front caster coupled to the frame such that the first front caster is moveable upwardly and downwardly with respect to the frame;
    a second front caster coupled to the frame such that the second front caster is moveable upwardly and downwardly with respect to the frame;
    a first rear caster coupled to the frame such that the first rear caster is moveable upwardly and downwardly with respect to the frame;
    a second rear caster coupled to the frame such that the second rear caster is moveable upwardly and downwardly with respect to the frame;
    a stabilizing means for selectively inhibiting upward movement of the first and second front casters relative to the frame;
    wherein the stabilizing means is in a disengaged state and allows upward and downward movement of the first front caster and the second front caster relative to the frame when the first rear caster moves downward from a normal operating position relative to the frame and the second rear caster is in a normal operating position relative to the frame; and wherein the stabilizing means inhibits upward movement of the first front caster and the second front caster relative to the frame when both of the rear casters move downward from normal operating positions relative to the frame.

7. A wheelchair comprising:

a frame;

a pair of drive wheels supporting the frame;

a first front caster coupled to the frame such that the first front caster is moveable upwardly and downwardly with respect to the frame;

a second front caster coupled to the frame such that the second front caster is moveable upwardly and downwardly with respect to the frame;

a first rear caster coupled to the frame such that the first rear caster is moveable upwardly and downwardly with respect to the frame;

a second rear caster coupled to the frame such that the second rear caster is moveable upwardly and downwardly with respect to the frame;

a stabilizing means for selectively inhibiting upward movement of the first and second front casters relative to the frame;

wherein the stabilizing means inhibits upward movement of the first front caster and the second front caster relative to the frame when both of the rear casters move downward from normal operating positions relative to the frame; and wherein the stabilizing means allows upward movement of the first and second front casters relative to the frame when one or more of the rear casters return to a normal operating position relative to the frame.

* * * * *